United States Patent
Kondo

(10) Patent No.: US 6,292,591 B1
(45) Date of Patent: *Sep. 18, 2001

(54) IMAGE CODING AND DECODING USING MAPPING COEFFICIENTS CORRESPONDING TO CLASS INFORMATION OF PIXEL BLOCKS

(75) Inventor: Tetsujiro Kondo, Kanagawa (JP)

(73) Assignee: Sony Coporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

(21) Appl. No.: 08/893,022

(22) Filed: Jul. 15, 1997

(30) Foreign Application Priority Data

Jul. 17, 1996 (JP) ................................. P08-206646

(51) Int. Cl.$^7$ ............................. G06K 9/36; H03M 7/00; H04N 7/12; H04N 1/41
(52) U.S. Cl. ..................... 382/240; 382/226; 382/232; 341/79; 348/390.1; 348/415.1; 358/426; 375/240; 375/240.02; 375/240.12
(58) Field of Search ................................. 382/226, 232, 382/240; 341/79; 348/390.1, 415.1, 424, 394; 358/428, 426; 375/240, 240.02, 240.12

(56) References Cited

U.S. PATENT DOCUMENTS

| | | | |
|---|---|---|---|
| 4,703,352 | 10/1987 | Kondo | 358/135 |
| 5,122,873 | * 6/1992 | Golin | 348/390 |
| 5,193,003 | 3/1993 | Kondo | 358/136 |
| 5,200,962 | 4/1993 | Kao et al. | 371/41 |
| 5,293,230 | * 3/1994 | Golin | 348/415 |
| 5,305,103 | * 4/1994 | Golin | 348/415 |
| 5,331,414 | * 7/1994 | Golin | 348/390 |
| 5,384,869 | * 1/1995 | Wilkinson et al. | 382/240 |
| 5,469,216 | 11/1995 | Takahashi et al. | 348/441 |
| 5,488,618 | 1/1996 | Kondo et al. | 371/67.1 |
| 5,495,297 | 2/1996 | Fujimori et al. | 348/590 |

(List continued on next page.)

FOREIGN PATENT DOCUMENTS

| | | |
|---|---|---|
| 0293041 A1 | 11/1988 | (EP) . |
| 0635978 A1 | 1/1995 | (EP) . |
| 3-53778 | 3/1991 | (JP) ................................ H04N/7/13 |
| 07147681 | 6/1995 | (JP) . |
| WO 91/20159 | 12/1991 | (WO) . |
| WO 93/13624 | 7/1993 | (WO) . |

OTHER PUBLICATIONS

U.S. Application No. 09/213,460, filed Dec. 17, 1998, pending.

*Primary Examiner*—Bhavesh Mehta
*Assistant Examiner*—Daniel G. Mariam
(74) *Attorney, Agent, or Firm*—Bell, Boyd & Lloyd LLC

(57) ABSTRACT

That is, a hierarchical coding of an image data is generated. An image data of a second hierarchy is formed, having a number of pixels which is smaller than that of an image data of a first hierarchy. The image data of the second hierarchy is corrected to generate a corrected data. The image data of the first hierarchy is predicted in accordance with the corrected data and a predicted data of the first hierarchy, having a plurality of predicted pixels, is generated. Predictive error of the predicted data of the first hierarchy is calculated with respect to the image data of the first hierarchy. The suitability of the corrected data is determined in accordance with the predicted error. A difference data, between the image data of the first hierarchy and the predicted data of the first hierarchy, is generated in accordance with the determined suitability. The difference data has a plurality of difference values. The corrected data and the difference data are output as the coded image data.

76 Claims, 40 Drawing Sheets

U.S. PATENT DOCUMENTS

| | | | |
|---|---|---|---|
| 5,517,245 * | 5/1996 | Kondo et al. | 348/392 |
| 5,528,606 | 6/1996 | Kondo et al. | 371/37.4 |
| 5,553,160 | 9/1996 | Dawson | 382/166 |
| 5,598,214 * | 1/1997 | Kondo et al. | 382/240 |
| 5,610,658 * | 3/1997 | Uchida et al. | 382/240 |
| 5,625,712 | 4/1997 | Schoenzeit et al. | 382/232 |
| 5,663,764 | 9/1997 | Kondo et al. | 348/414 |
| 5,666,164 | 9/1997 | Kondo et al. | 348/441 |
| 5,680,225 | 10/1997 | Hirabayashi et al. | 358/451 |
| 5,687,257 | 11/1997 | Paik et al. | 382/239 |
| 5,734,433 | 3/1998 | Kondo et al. | 348/421 |
| 5,739,873 | 4/1998 | Kondo | 348/720 |
| 5,754,702 * | 5/1998 | Simpson | 382/240 |
| 5,812,699 | 9/1998 | Zhu et al. | 382/232 |
| 5,825,313 | 10/1998 | Kondo et al. | 341/67 |
| 5,867,593 | 2/1999 | Fukuda et al. | 382/176 |
| 5,870,434 | 2/1999 | Kondo et al. | 375/242 |
| 5,880,784 | 3/1999 | Lillevold | 348/404 |
| 5,912,708 | 6/1999 | Kondo et al. | 348/415 |
| 5,930,394 | 6/1999 | Kondo et al. | 382/232 |
| 5,960,116 | 9/1999 | Kajimara | 382/238 |
| 5,966,179 | 10/1999 | Kondo et al. | 348/408 |
| 5,969,764 | 10/1999 | Sun et al. | 348/404 |
| 6,016,164 | 1/2000 | Kawaguchi et al. | 348/424 |

* cited by examiner noted pixel class sorting processing

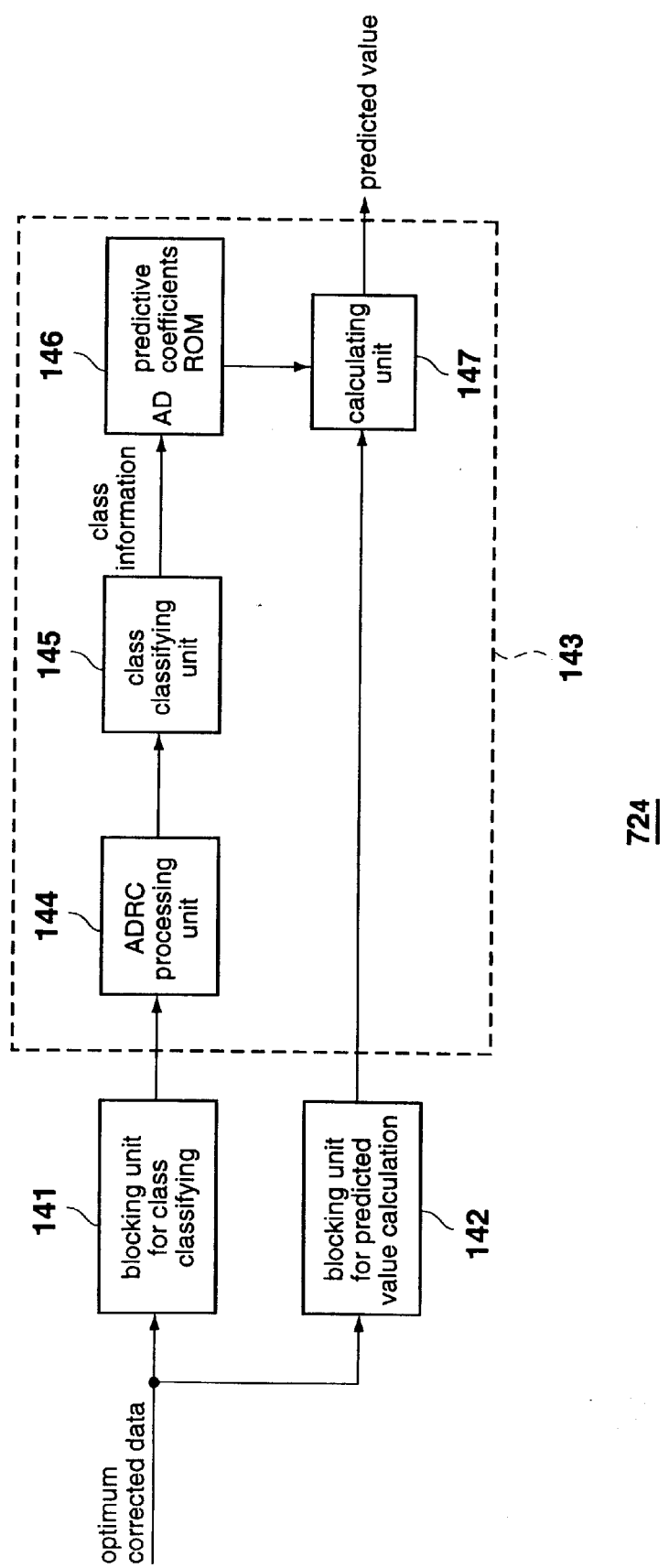

IMAGE CODING AND DECODING USING MAPPING COEFFICIENTS CORRESPONDING TO CLASS INFORMATION OF PIXEL BLOCKS

BACKGROUND OF THE INVENTION

1. Field of the Invention

The present invention relates to an image coding apparatus and image coding method, image decoding apparatus and image decoding method, recording medium, image transmitting method and image processing apparatus, and more particularly relates to the image coding apparatus and image coding method, image decoding apparatus and image decoding method, recording medium, image transmitting method and image processing apparatus capable of thinning-out (subsampling) and compression encoding an image in such a manner that a decoded image is almost identical to a source image.

2. Description of the Related Art

Conventionally, various methods have been proposed as methods for compressing images. One such method employs the original image (i.e., the image to be encoded) as an image of a "first hierarchy" (uppermost hierarchy). An image of a second hierarchy and an image of a third hierarchy are formed by reducing the number of pixels (i.e., resolution is successively lowered).

In accordance with a conventional hierarchical coding system, images of plural hierarchies are transmitted from a transmitting apparatus to a receiving apparatus. At the receiving apparatus, images of the respective hierarchies may be displayed (e.g., on a monitor) in response to each of these images of the plural hierarchies.

Moreover, in accordance with a conventional hierarchical decoding system, an error correction process operation is carried out for data about the image in the lowermost hierarchy (namely, the image with the lowest resolution) but not for the images of the other higher hierarchies. As a result, when an error happens to occur, no error correction can be made as to the images of the hierarchies other than the lowermost hierarchy. As a result, under any error condition, only the data of the image of the lowermost hierarchy can be acquired and corrected. Images of the hierarchies higher than the lowermost hierarchy do not have data for error recovery and, thus, may be obtained only by way of, for example, an interpolation process operation from the data about the image of the lowermost hierarchy on the receiver end. Therefore, the robustness characteristic with respect to the error can be improved in accordance with the hierarchical coding system.

FIG. 28 illustrates one example of a conventional image coding apparatus for performing the above-described hierarchical coding operation. Image data to be coded is supplied as data of a first hierarchy (uppermost hierarchy) to a thinning-out (sub-sampling) unit $11_1$ and an arithmetic unit $12_1$ as data for a first hierarchical layer (uppermost hierarchical layer).

At the thinning-out unit $11_1$, image data for a second hierarchical layer (one order down) is formed by thinning out the number of pixels of the image data for the first hierarchical layer and supplying the resulting pixels to a thinning-out unit $11_2$, arithmetic unit $12_2$ and an interpolator $501_1$. At the interpolator $501_1$, image data (hereinafter referred to as "first hierarchical layer interpolation data") is formed of the same number of pixels as the image data for the first hierarchical layer (one order up) and supplied to the arithmetic unit $12_1$. The first hierarchical layer interpolation data is then subtracted from the first hierarchical layer image data at the arithmetic unit $12_1$ and the resulting difference value is output to a signal processing unit 502 as coded data for the first hierarchical layer.

Similar processing is carried out at a thinning-out unit $11_2$, an arithmetic unit $12_2$ and an interpolator $501_2$; a thinning-out unit $11_3$, an arithmetic unit $12_3$ and an interpolator $501_3$; and a thinning-out unit $11_4$, an arithmetic unit $12_4$ and an interpolator $501_4$. As a result, coded data is generated for the second to fourth hierarchical layers, respectively, and output to the signal processing unit 502 from the arithmetic units $12_2$ to $12_4$, respectively.

Image data for the fifth hierarchical layer (lowermost hierarchical layer) formed at the thinning-out unit $11_4$ is output to the signal processing unit $50_2$, without modification, as coded data for the fifth hierarchical layer.

At the signal processing unit 502, error correction and other necessary signal processing is performed on the coded data for the first to fifth hierarchical layers. After this, the resulting processed data is multiplexed and outputted as the final coded data. At the signal processing unit 502, stronger error correction is performed on coded data for the fifth hierarchical layer than for other hierarchical layers.

FIG. 29 illustrates an example embodiment of an image decoding device for hierarchically decoding coded data output from the image coding device of FIG. 28.

At a signal processing unit 602, coded data is divided into coded data for the first to fifth hierarchical layers. Also, error correction processing and other necessary processing is performed, and the processed data is output. Coded data for the first to fourth hierarchical layers is supplied to arithmetic units $73_1$ to $73_4$. The coded data for the fifth hierarchical layer is provided as the decoded image for the fifth hierarchical layer, and supplied to an interpolator $601_4$.

The interpolator $601_4$ corresponds to the interpolator $501_4$ of FIG. 28. Therefore, image data of the same number of pixels as the image data for the fourth hierarchical layer (of one order up) i.e. interpolation data for the fourth hierarchical layer can be generated by performing interpolation processing on the coded data for the fifth hierarchical layer, and this data is supplied to the arithmetic unit $73_4$. The coded data for the fourth hierarchical layer (including an error value for the image data for the fourth hierarchical layer and the interpolation data for the fourth hierarchical layer) and interpolation data for the fourth hierarchical layer from the interpolator $601_4$ are added at the arithmetic unit $73_4$. The results of this addition are then output as the decoded image for the fourth hierarchical layer and also supplied to the interpolator $601^3$.

A similar process as is carried out at the arithmetic unit $73_4$ and the interpolator $601_4$ is also carried out at the arithmetic unit $73_3$ and the interpolator $601_3$; the arithmetic unit $73_2$ and the interpolator 6012; and the arithmetic unit $73_1$ and the interpolator $601_1$ so that decoded images are also generated for the third to first hierarchical layers and outputted from the arithmetic units $73_3$ to $73_1$, respectively.

When coded data for the first to fourth hierarchical layers cannot be obtained at the image decoding device for some reason, interpolation can be carried out just using the coded data for the fifth hierarchical layer if the coded data for the fifth hierarchical layer can be obtained and a decoded image for each of the hierarchical layers can be obtained.

However, the picture quality of decoded images obtained from just the coded data for the lowermost hierarchical layer is extremely inferior.

SUMMARY OF THE INVENTION

As the present invention sets out to resolve these problems, the present invention is to encode images by thinning-out (sub-sampling) in such a manner that a decoded image is obtained that is identical (or, at least, almost identical) to the original image data.

That is, a hierarchical coding of an image data is generated. An image data of a second hierarchy is formed, having a number of pixels which is smaller than that of an image data of a first hierarchy. The image data of the second hierarchy is corrected to generate a corrected data. The image data of the first hierarchy is predicted in accordance with the corrected data and a predicted data of the first hierarchy, having a plurality of predicted pixels, is generated. Predictive error of the predicted data of the first hierarchy is calculated with respect to the image data of the first hierarchy. The suitability of the corrected data is determined in accordance with the predicted error. A difference data, between the image data of the first hierarchy and the predicted data of the first hierarchy, is generated in accordance with the determined suitability. The difference data has a plurality of difference values. The corrected data and the difference data are output as the coded image data.

BRIEF DESCRIPTION OF THE DRAWINGS

FIG. 40 is a block view showing an example configuration of the predicting units $72_1$ to $72_4$ of FIG. 39.

DETAILED DESCRIPTION

In order to clarify the corresponding relationship between each of the means of the various embodiments described herein, certain characteristics of the present invention are first briefly described with reference to the Figures. It is to be understood that the term "unit" is to be interpreted in its broadest sense, including a hard-wired unit, a main frame computer loaded with appropriate software, a programmed microprocessor or microcontroller, or a combination of these.

Figure 1:
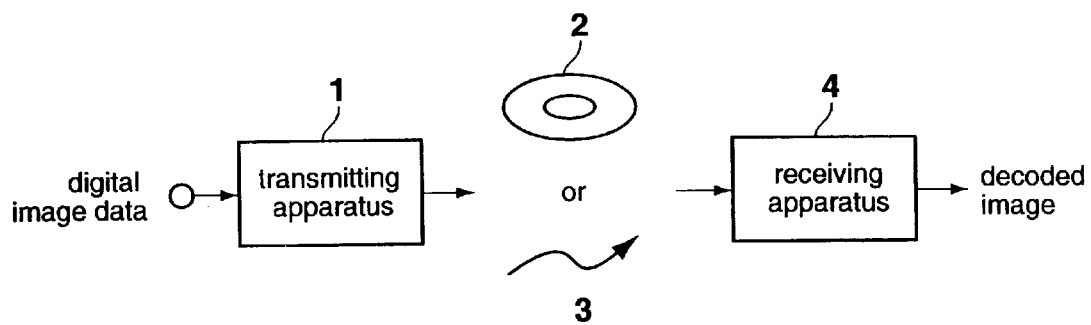
FIG. 1 is a block view showing the configuration of an embodiment of the present invention applied to an image processing system.

FIG. 1 illustrates, in block form, an embodiment of the present invention applied to an image processing system. Digitized image data is supplied to a transmitting apparatus 1. The transmitting apparatus 1 hierarchically codes inputted image data and records the resulting data on a recording medium 2 (for example, an optical disc, magneto-optical disc or magnetic tape, etc.) or transmits the resulting data via a transmission path 3 (for example, ground waves, broadcast units, telephone lines or CATV networks etc.)

Coded data recorded on the recording medium 2 is then played back at a receiving apparatus 4 or coded data transmitted via the transmission path 3 is received. This coded data is then expanded and decoded, with the resulting decoded image data being supplied to a display (not shown).

The image processing system described above can be employed by, for example, devices for recording/playing back images such as optical disc devices, magneto-optical disc devices, magnetic tape devices etc., and devices for carrying out transmission of images such as, for example, video phone devices, television broadcast systems and CATV systems, etc. Further, the image processing system of FIG. 1 can also be employed by portable terminals that can be utilized on the move and that are of a low transmission rate such as, for example, portable telephones, etc.

Figure 2:
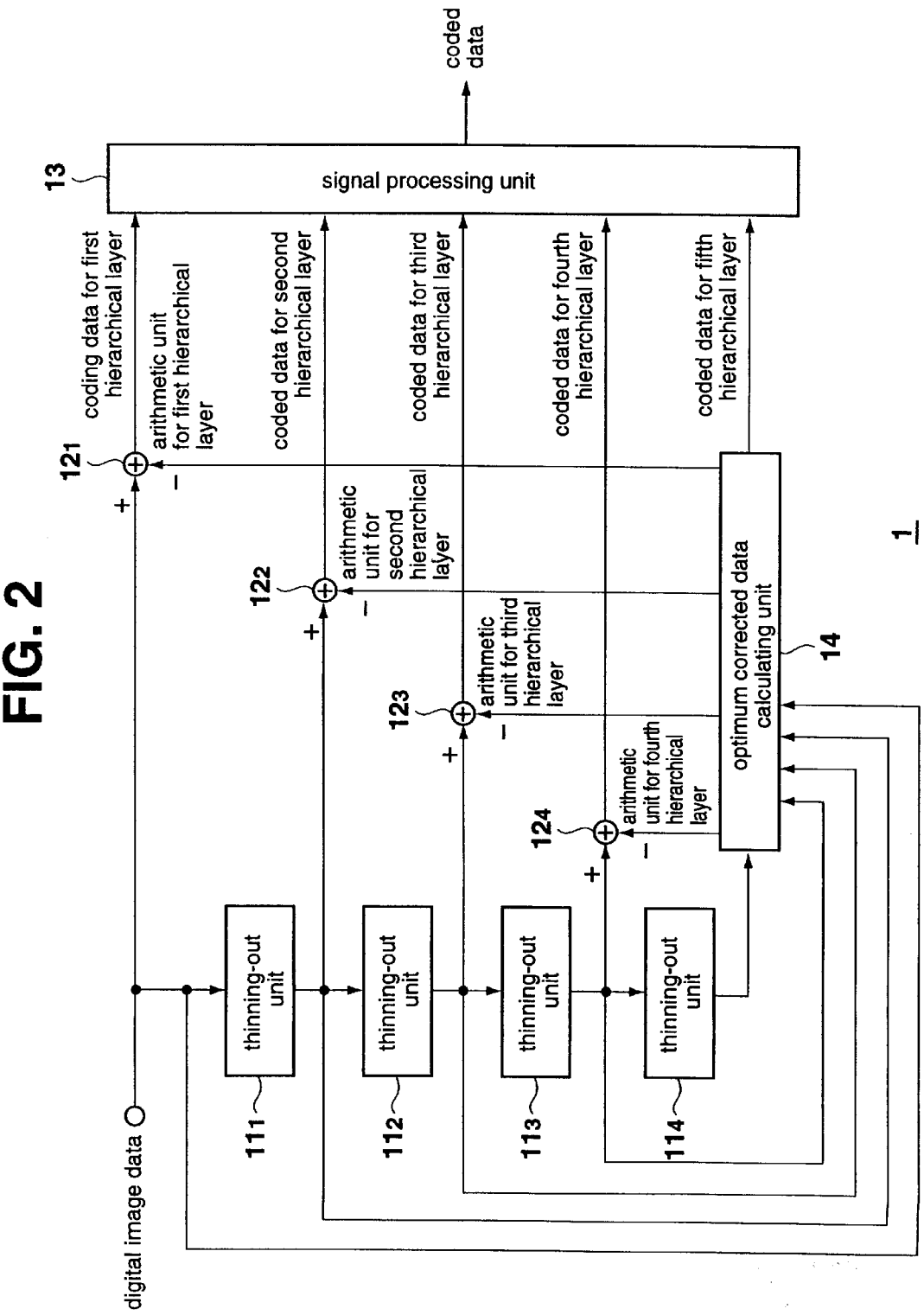
FIG. 2 is a block view showing the configuration a first embodiment of the transmitting apparatus 1 of FIG. 1.
Figure 29:
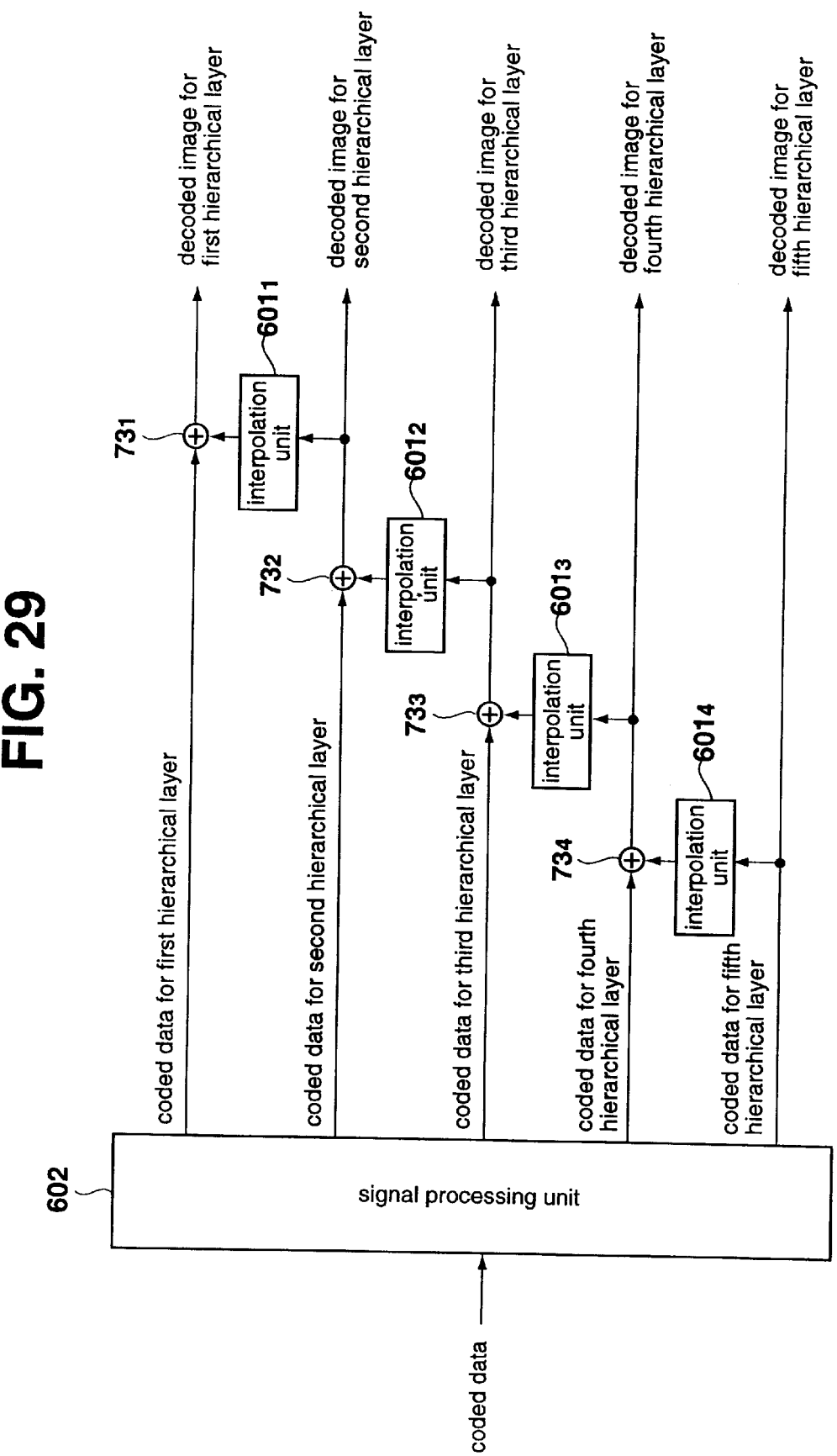
FIG. 29 is a block diagram showing an example configuration of the image decoding device for carrying out related hierarchical coding.

FIG. 2 shows an example configuration of the transmitting apparatus 1. In FIG. 2, portions corresponding to the case shown in FIG. 29 are given the same numerals.

The digital image data to be coded, i.e. the image data for the first hierarchical layer is supplied to a thinning-out unit $11_1$ and an arithmetic unit $12_1$. At the thinning-out unit $11_1$, image data for a second hierarchical layer (one layer down) is formed by thinning out the number of pixels for the image data of the first hierarchical layer. Namely, at the thinning-out unit $11_1$, as shown, for example, in FIG. 3, the image data for the first layer of image data (shown by o in FIG. 3) is simply thinned out by ⅑ (thinned out by ⅓ in the horizontal and vertical directions) so as to form a second hierarchical layer of image data (shown by Δ in FIG. 3). This second hierarchical layer of image data is then supplied to a thinning-out unit $11_2$.

Figure 3:
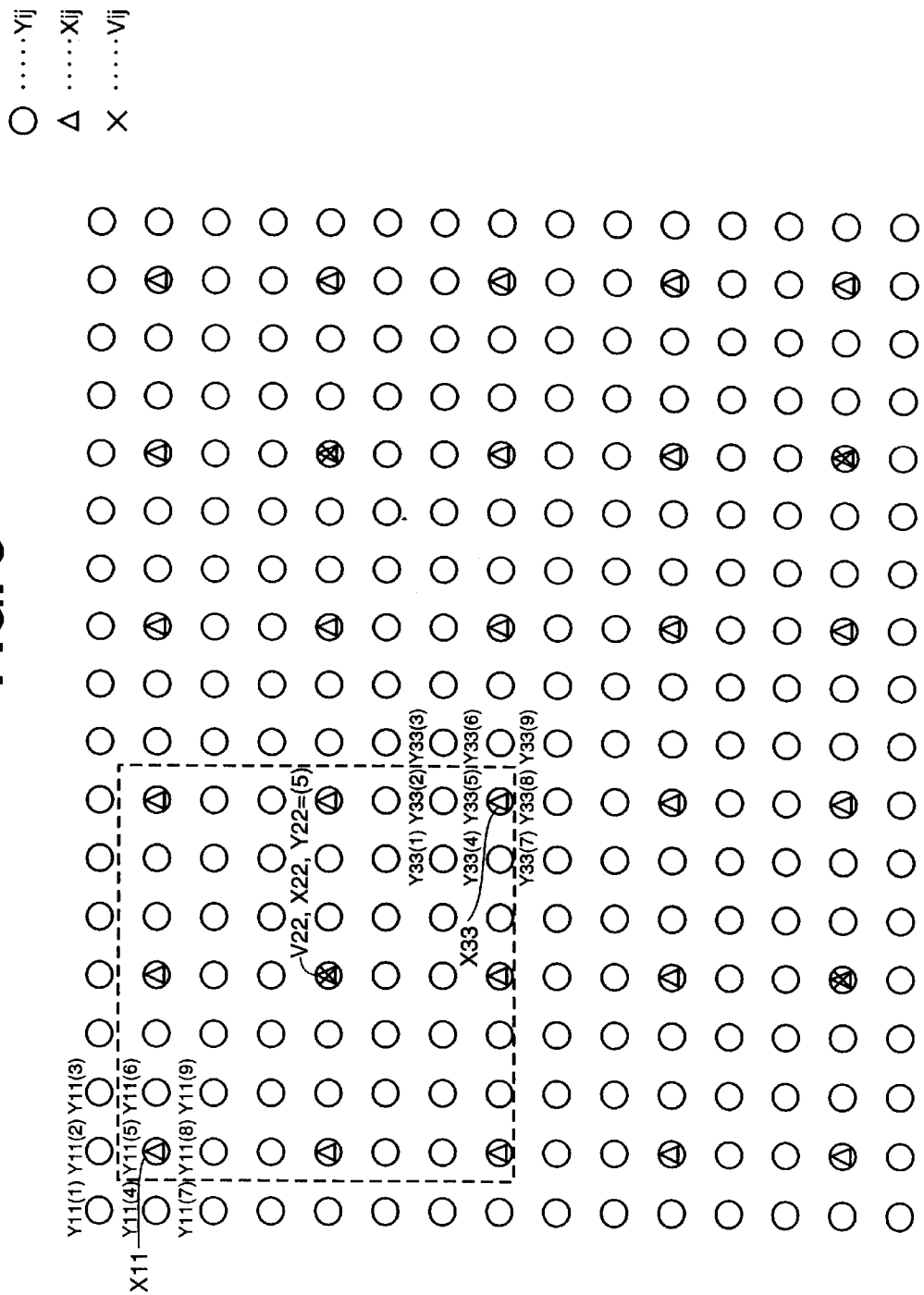
FIG. 3 is a view illustrating the process for the thinning-out units $11_1$ to $11_4$ of FIG. 2.

At the thinning-out unit $11_2$, image data for a third hierarchical layer a layer down is formed by thinning-out the number of pixels of the second layer of image data. Namely, at the thinning-out unit $11_2$, the image data for the second hierarchical layer is thinned out by ⅑ in the same way as, for example, the case for the thinning-out unit 111 so that image data for the third hierarchical layer shown by "x" in FIG. 3 is formed.

The image data for the third hierarchical layer is then supplied to a thinning-out unit $11_3$, with the output of this thinning-out unit $11_3$ then being supplied to a further thinning-out unit $11_4$. Image data for fourth and fifth hierarchical layers can then be formed by, for example, carrying out similar processing as for the case of the thinning-out unit $11_1$.

Figure 4:
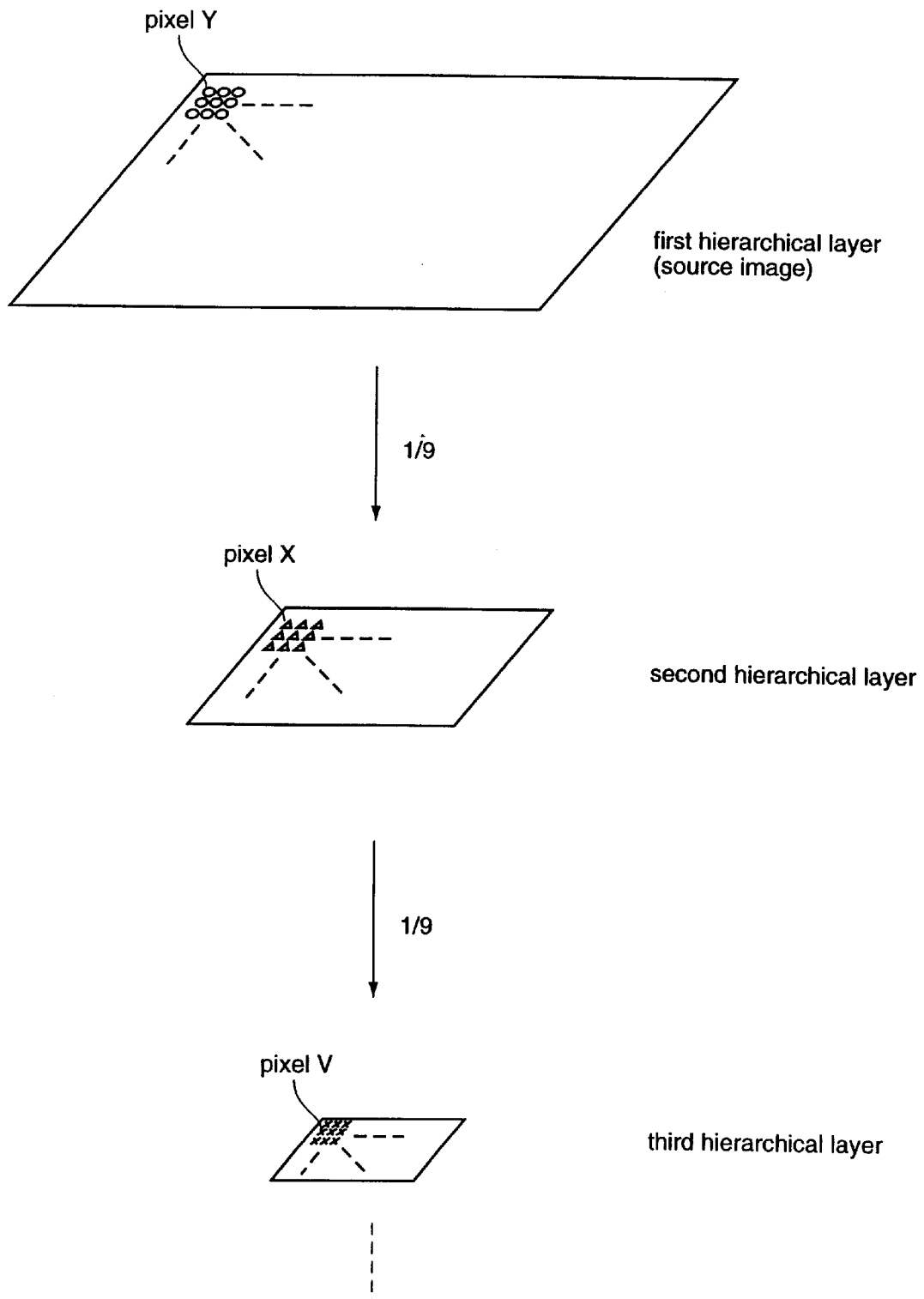
FIG. 4 is a view illustrating the process for the thinning-out units $11_1$ to $11_4$ of FIG. 2.

As described above, image data for the second to fifth hierarchical layers can be formed from the image data for the first hierarchical layers (source image) as shown in FIG. 4 at the thinning-out units $11_1$ to $11_4$.

The image data for the first to fifth hierarchical layers is supplied to a optimum corrected data calculating unit 14. The optimum corrected data calculating unit 14 then predicts predicted values for the image data of the first to fourth hierarchical layers, as well as calculating the optimum corrected data for the image for the fifth hierarchical layer and supplying this data to a signal processing unit 13.

In addition to the predicted values for the first to fourth hierarchical layers, image data for the first to fourth hierarchical layers is also supplied to the arithmetic units $12_1$ to $12_4$, respectively. At the arithmetic units $12_1$ to $12_4$, values for the differences between the predicted values for the first to fourth hierarchical layers and the image data for the first to fourth layers respectively, i.e. predicted difference values, are calculated. The difference values for the first to fourth hierarchical layers, respectively, are then supplied to the signal processing unit 13 as coded data for the first to fourth hierarchical layers.

Error correction processing and other necessary signal processing is then carried out on the coded data for the first to fifth hierarchical layers at the signal processing unit 13. This data is then multiplexed and output as final coded data. At the signal processing unit 13, more powerful error correction is carried out on the coded data for the fifth hierarchical layer (i.e, the lowermost hierarchical layer) than is carried out on coded data for other hierarchical layers.

Coded data outputted from the signal processing unit 13 is then recorded on the recording medium 2 or transmitted via the transmission path 3.

As described above, thinning out has been carried out in each of the thinning-out units $11_1$ to $11_4$ at the same ratio, but the ratio at which thinning out is carried out at the thinning-out units $11_1$ to $11_4$ does not have to be the same.

Figure 5:
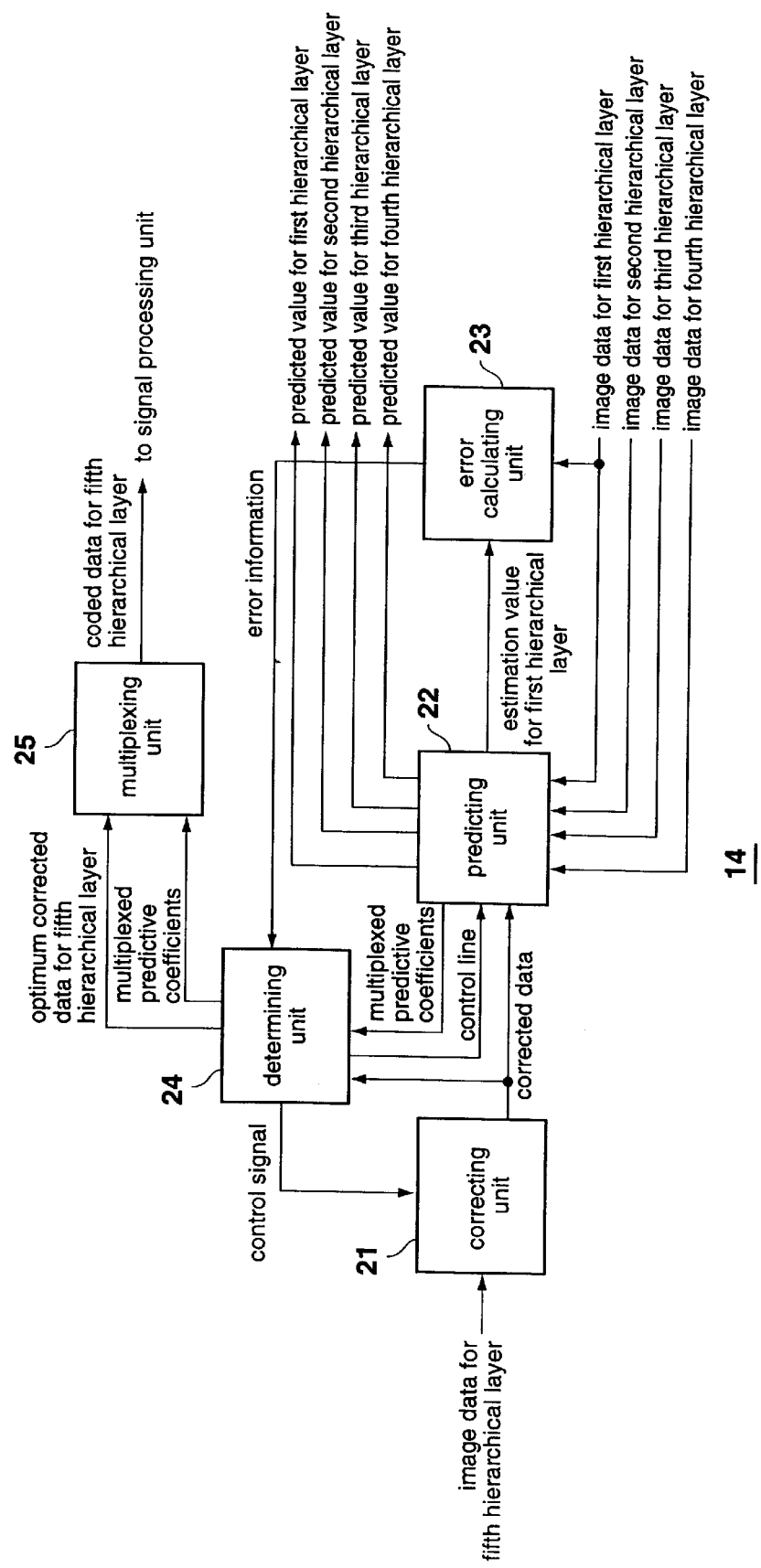
FIG. 5 is a block view showing an example configuration of the optimum corrected data calculating unit 14 of FIG. 2.

Next, FIG. 5 shows an example configuration of the optimum corrected data calculating unit 14 of FIG. 2.

The fifth hierarchical layer of image data from the thinning-out unit 114 is supplied to a correcting unit 21, with image data for the first to fourth hierarchical layers being supplied to a predicting unit 22. Image data for the first hierarchical layer is also supplied to an error calculating unit 23.

The correcting unit 21 corrects image data for the fifth hierarchical layer under the control of a determining unit 24. Correction data obtained as the results of the correction occurring at the correcting unit 21 is then supplied to the predicting unit 22 and to the determining unit 24.

The predicting unit 22 then predicts a predicted value for the fourth hierarchical layer (one layer up) based on corrected data from the correcting unit 21, i.e. based on the correction results for the image data of the fifth hierarchical layer. The predicting unit 22 then predicts the predicted value for the third hierarchical layer (one layer up) from the predicted value for the fourth hierarchical layer, and predicts predicted values for the first and second hierarchical layers in a similar manner. As described above, the predicted values for the first to fourth hierarchical layers are supplied to the arithmetic units $12_1$ to $12_4$. The estimation value for the first hierarchical layer (estimation value for the source image data) is also supplied to the error calculating unit 23.

The predicting unit 22 carries out appropriate processing to obtain prediction coefficients for each class for calculating a predicted value for the fourth hierarchical layer using the linear correction with the corrected data and the predicted value for the fourth hierarchical layer is then obtained based on this prediction coefficients. The prediction coefficients for each class obtained at this time are supplied to the determining unit 24. The prediction coefficients for each class used in obtaining these predicted values are supplied to the determining unit 24 in the same way for the third to first hierarchical layers.

The error calculating unit 23 calculates the prediction error for the predicted value from the predicting unit 22 with respect to the inputted image data for the first hierarchical layer (source image). This prediction error is then supplied to the determining unit 24 as error information.

The determining unit 24 determines the suitability of taking the corrected data outputted by the correcting unit 21 as the coding results for the original image data (image data for the first hierarchical layer) based on the error information from the error calculating unit 23. When the determining unit 24 determines that the corrected data outputted by the correcting unit 21 is not appropriate to be taken as the coding results for the original image data, the determining unit 24 controls the correcting unit 21, image data for the fifth hierarchical layer is corrected, and the resulting new corrected data is output. When the determining unit 24 determines that the corrected data output by the correcting unit 21 is suitable to be taken as the coding results for the original image data, the corrected data supplied from the correcting unit 21 is supplied to a multiplexing unit 25 as the optimum corrected data. The set of prediction coefficients for each class for first to fourth hierarchial layers supplied from the predicting unit 22 are also supplied to the multiplexing unit 25.

The multiplexing unit 25 multiplexes the optimum corrected data from the determining unit 24 and each of the prediction coefficients for each class (a set of prediction coefficients for each class for the first to fourth hierarchical layers to be described in detail later) and outputs the results of this multiplexing as coded data for the fifth hierarchical layer.

Figure 6:
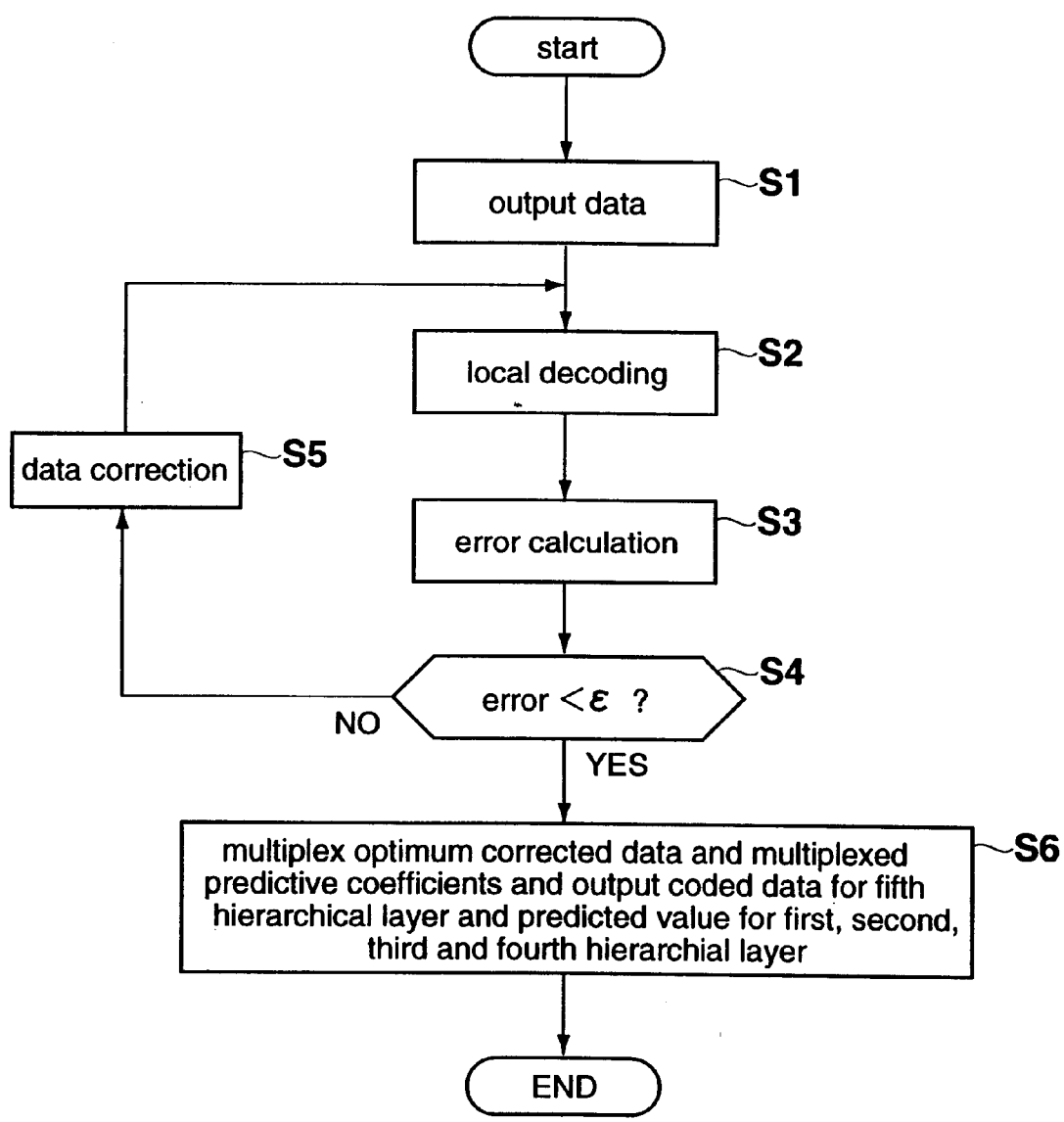
FIG. 6 is a flowchart illustrating the process for the optimum corrected data calculating unit 14 of FIG. 5.

The operation of the optimum corrected data calculating unit 14 is operation will now be described with reference to the flowchart of FIG. 6. When image data for the fifth hierarchical layer is supplied to the correcting unit 21, first, in step S1, the correcting unit 21 outputs the image data for the fifth hierarchical layer to the predicting unit 22 and to the determining unit 24 without modification, and without carrying out correction. Then, in step S2, local decoding is carried out at the predicting unit 22 on the corrected data (first, as described above, the image data for the fifth hierarchical layer) from the correcting unit 21.

In step S2, processing appropriate for obtaining prediction coefficients for each class, for calculating predicted values for the fourth hierarchical layer (one layer up) is carried out using the linear correction with the corrected data from the correcting unit 21. That is, image data of the fourth hierarchical layer is employed, with a coefficient value then being obtained based on this prediction coefficient for each class. Further, a similar process is carried out using image data for the third hierarchical layer based on the predicted value for the fourth hierarchical layer so as to obtain prediction coefficients for each class to calculate predicted value for the third hierarchial layer and predicted value for the third hierarchical layer. Prediction coefficients for each class and predicted values are then obtained for the second and first hierarchical layers in a similar way. The predicted value for the first hierarchical layer only is supplied to the error calculating unit 23 at this point in time.

When a predicted value for the first hierarchical layer is received from the predicting unit 22, in step S3, the error calculating unit 23 calculates a prediction difference value for the predicted value from the predicting unit 22 for the image data of the first hierarchical layer and supplies the calculated predication difference value to the determining unit 24 as error information. When the error information is provided from the error calculating unit 23, in step S4, the determining unit 24 determines the appropriateness of the corrected data output by the correcting unit 21 as coding results for the image of the first hierarchical layer, based on the error information.

A determination is then made in step S4 as to whether or not the error is less than a prescribed threshold value $\epsilon$. If the error information is determined in step S4 to not be less than prescribed threshold value $\epsilon$, it is confirmed that the corrected data outputted by the correcting unit 21 is not suitable as coded data for the image of the first hierarchical layer. Then, processing proceeds at Step S5, where the determining unit 24 controls the correcting unit 21 so that the image data for the fifth hierarchical layer is corrected. The correcting unit 21 then changes the correction amount (hereafter described as the correction value D), corrects the image data for the fifth hierarchical layer and outputs the resulting corrected data to the predicting unit 22 and the determining unit 24. Processing is then repeated from Step S2.

On the other hand, when it is determined in step S4 that the error information is less than the threshold value $\epsilon$, the corrected data outputted by the correcting unit 21 is deemed to be appropriate to be taken as the coding results for the image of the first hierarchical layer. The determining unit 24 then takes the corrected data when error information of less than the prescribed threshold value $\epsilon$ is obtained as the most suitable data (i.e., optimum corrected data) and this data is then outputted to the multiplexing unit 25 together with the set of prediction coefficients for each class for first to fourth hierarchal layer. At the multiplexing unit 25, in step S6, the optimum corrected data from the determining unit 24 and the set of prediction coefficients for each class for first to fourth hierarchal layer are multiplexed, these multiplexing results are outputted as the coded data for the fifth hierarchical layer and predicted values for first to fourth hierarchial are outputted from predicting units, and the processing of FIG. 6 is complete.

In the above discussion, the corrected data for the image data for the fifth hierarchical layer is taken as the image coding results when the error information is equal to or less then a prescribed threshold value $\epsilon$. Therefore, an image that is almost identical to the original image data (the image of the first hierarchical layer) can be obtained on the side of the receiving apparatus 4 based on the corrected data (most suitable data).

Figure 7:
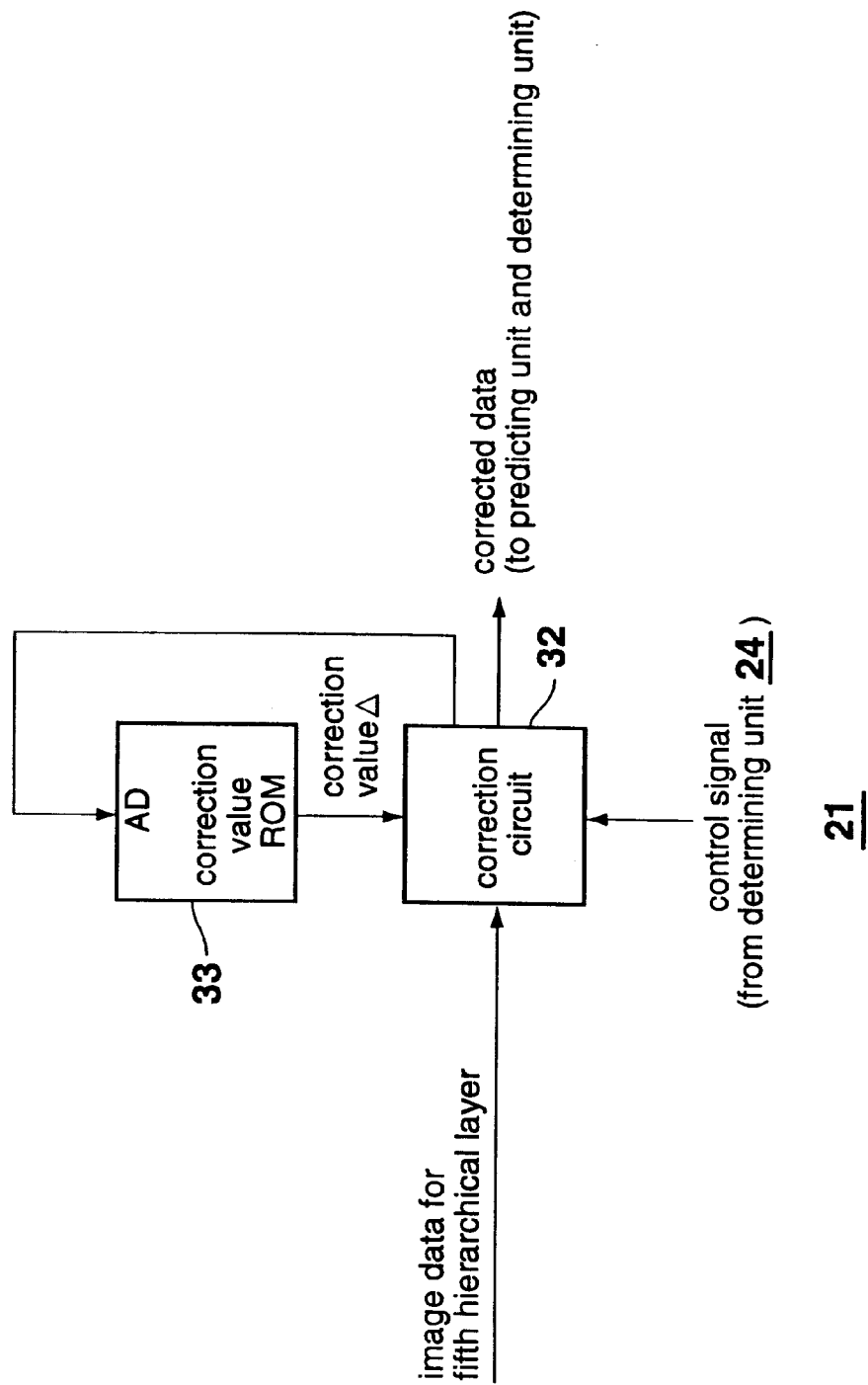
FIG. 7 is a block view showing an example configuration of the correcting unit 21 of FIG. 5.

Next, FIG. 7 shows an embodiment of the correcting unit 21 of FIG. 5.

The image data for the fifth hierarchical layer is supplied to a correcting unit 32. The correcting unit 32 then provides an address to a correction value ROM 33 in accordance with a control signal from the determining unit 24 (FIG. 5) so that the correction value $\Delta$ can be read. The correcting unit 32 then generates corrected data by, for example, adding the correction value $\Delta$ from the correction value ROM 33 to the image data of the fifth hierarchical layer and the corrected data is supplied to the predicting unit 22 and the determining unit 24. The correction value ROM 33 holds various combinations of correction values $\Delta$ (for example, combinations of correction values etc. for correcting image data for the fifth hierarchical layer of one frame portion) for correcting image data of the fifth hierarchical layer. A combination of the correction value D corresponding to the address supplied from the correcting unit 32 is then read out and supplied to the correcting unit 32.

Figure 8:
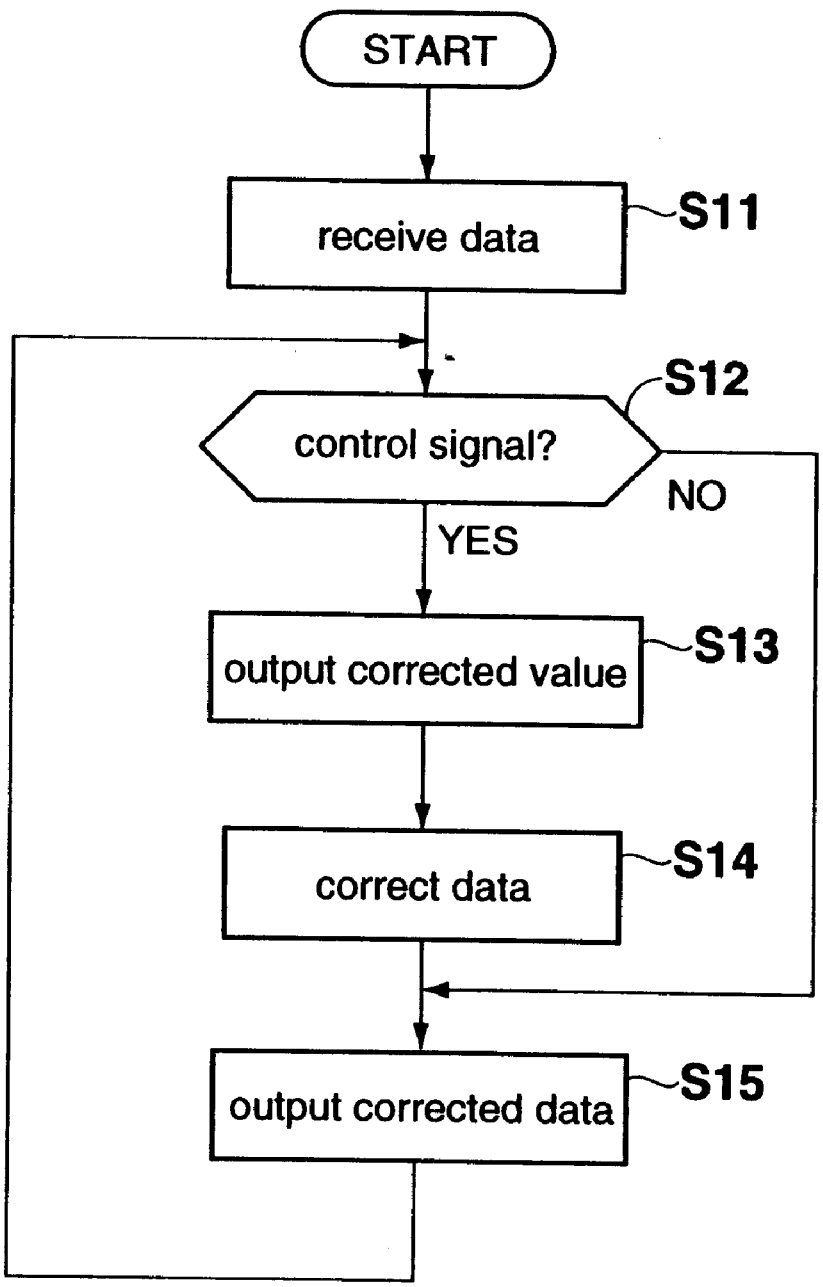
FIG. 8 is a flowchart illustrating the operation of the correcting unit 21 of FIG. 5.

Next, the process for the correcting unit 21 of FIG. 7 is described with reference to FIG. 8.

When image data for the fifth hierarchical layer for, for example, one frame portion is supplied to the correcting unit 32, the correcting unit 32 receives the image data for the fifth hierarchical layer in step S11 and a determination is made in step S12 as to whether or not a control signal has been received from the determining unit 24 (FIG. 5). When it is determined in step S12 that a control signal has not been received, step S13 and step S14 are skipped, and processing continues at step S15. The correcting unit 32 then outputs the image data for the fifth hierarchical layer, as corrected data, to the predicting unit 22 and the determining unit 24, without modification, and processing returns to step S12.

Namely, the determining unit 24 controls the correcting unit 21 (correcting unit 32) based on the error information. Then, directly after the image data for the fifth hierarchical layer has been received at the correcting unit 32, the control signal from the determining unit 24 is not output because the error information cannot be obtained (because the error information is not output from the error calculating unit 23). Because of this, directly after the image data for the fifth hierarchical layer is received, the correcting unit 32 does not correct the image data for the fifth hierarchical layer (that is, the correcting unit 32 adds a correction of 0) and the image data is output without modification to the predicting unit 22 and the determining unit 24 as the corrected data.

On the other hand, when it is determined in step S12 that a control signal has been received from the determining unit 24, in step S13, the correcting unit 32 outputs an address to the correction value ROM 33 in accordance with the control signal. As a result, in step S13, the combination (set) of correction values Δ for correcting the image data for the fifth hierarchical layer for one frame portion stored at this address is read-out and supplied to the correcting unit 32. Then, when the correcting unit 32 receives the combinations of the correction values Δ from the correction value ROM 33, in step S14, the corresponding correction values Δ are added to the image data for the fifth hierarchical layer for one frame to calculate corrected data for image data of the fifth hierarchical layer. After this, step S15 is proceeded to, the corrected data is output to the predicting unit 22 and the determining unit 24 from the correcting unit 32, processing returns to step S12.

The correcting unit 21 then repeatedly outputs the image data for the fifth hierarchical layer as corrected data corrected to various values in accordance with the control of the determining unit 24.

When coding for an image of one frame is complete, the determining unit 24 supplies a control signal indicating this to the correcting unit 21. When the correcting unit 21 receives this signal, the image for the following frame is processed in accordance with the flowchart of FIG. 8.

Figure 9:
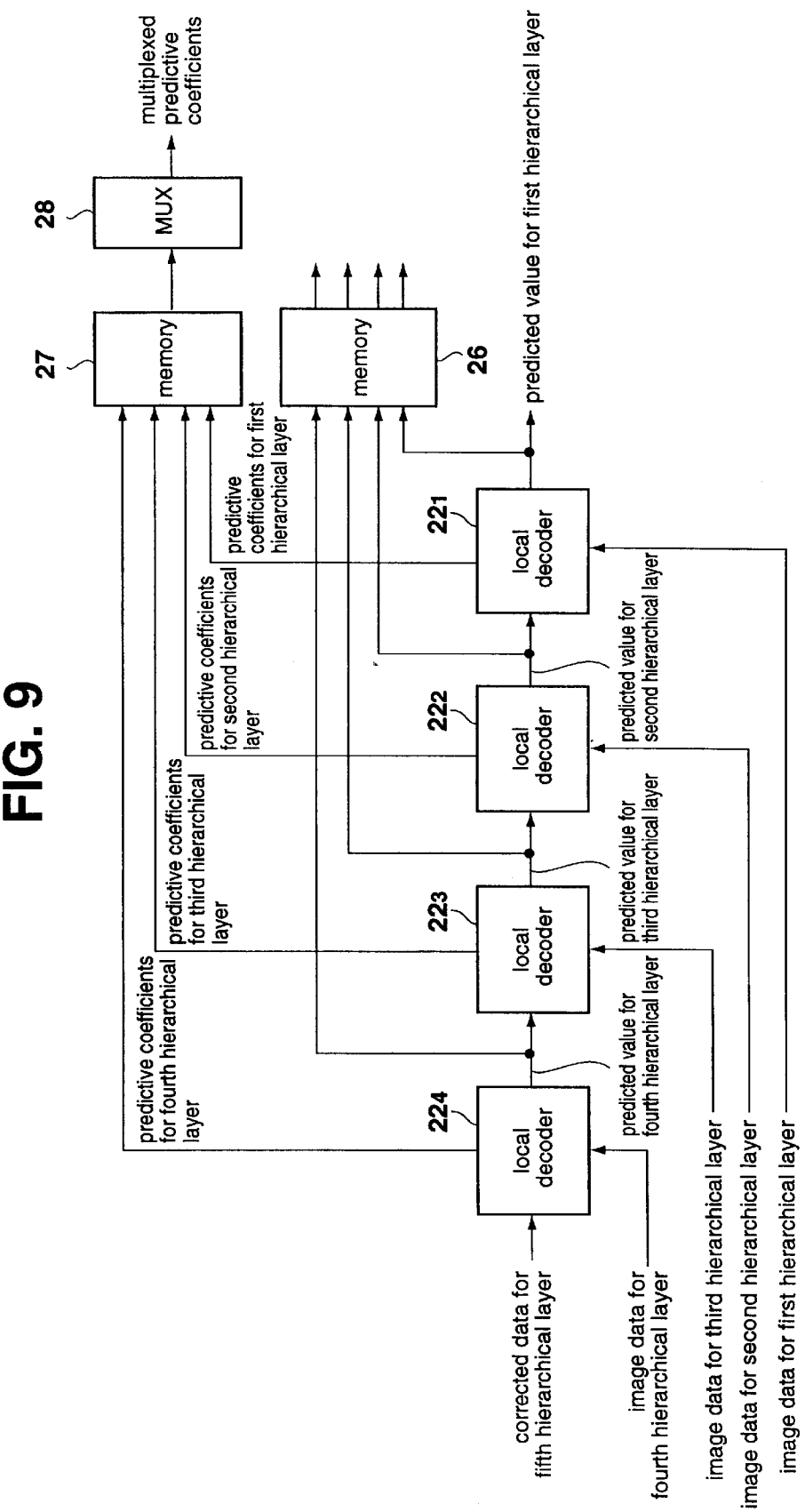
FIG. 9 is a block view showing an example configuration of the predicting unit 22 of FIG. 5.

Next, FIG. 9 shows an embodiment of the predicting unit 22 of FIG. 5.

Correction data corrected for the image data of the fifth hierarchical layer and image data for the fourth hierarchical layer are supplied to a local decoder $22_4$. The local decoder $22_4$ then uses this data to obtain prediction coefficients for each class for the image of the fourth hierarchical layer and further obtains an estimation value for the image for the fourth hierarchical layer using these prediction coefficients for each class. The predicted value for the fourth hierarchical layer is then supplied to a local decoder $22_3$ and to a memory 26, and the prediction coefficients for each class for the fourth hierarchical layer is supplied to a memory 27. The predicted value and the prediction coefficients for each class for the fourth hierarchical layer are then stored into the memories 26 and 27, respectively.

In addition to the predicted value for the fourth hierarchical layer from the local decoder $22_4$, the image data for the third hierarchical layer is supplied to the local decoder $22_3$ where this data is used to obtain the prediction coefficients for each class for the image data for the third hierarchical layer. A predicted value for the third hierarchical layer is then obtained using this prediction coefficients for each class. The predicted value for the third hierarchical layer is then supplied to a local decoder $22_2$ and the memory 26, and the prediction coefficients for each class for the third hierarchical layer is supplied to the memory 27. The predicted value for the third hierarchical layer and the prediction coefficients for each class are then stored in the memory 26 and the memory 27, respectively.

The same processing is also carried out at local decoders $22_2$ and $22_1$ so that the predicted value and the prediction coefficients for each clang for the second hierarchical layer and the predicted value and prediction coefficients for each class for the first hierarchical layer can be obtained. The predicted values for the second and first hierarchical layers are supplied to and stored in the memory 26, and each of the prediction coefficients for each class for the second and first hierarchical layers is supplied to and stored in the memory 27. The predicted value for the first hierarchical layer is supplied to the error calculating unit 23 (FIG. 5).

Data for each of the hierarchical layers is stored at independent regions of the memories 26 and 27. Further, when new data is supplied to regions of the memories 26 and 27 where data is already stored, this new data is written to the region where data is already stored. The memories 26 and 27 therefore store just the newest predicted values and prediction coefficients for each class for each hierarchical layer.

The predicted values for the fourth to first hierarchical layers stored in the memory 26 are read out under the control of the determining unit 24 (FIG. 5) and supplied to arithmetic units $12_4$ to $12_1$, respectively. Each of the prediction coefficients for each class for the fourth to first hierarchical layers stored in the memory 27 are also read out under the control of the determining unit 24 and supplied to a multiplexing unit (MUX) 28. Prediction coefficients for each class for the first to fourth hierarchical layers are multiplexed at the multiplexing unit 28 and supplied to the determining unit 24.

A description will now be given of the configuration of the local decoders $22_1$ to $22_4$ of FIG. 9 taking the local decoder $22_4$ as an example.

Figure 10:
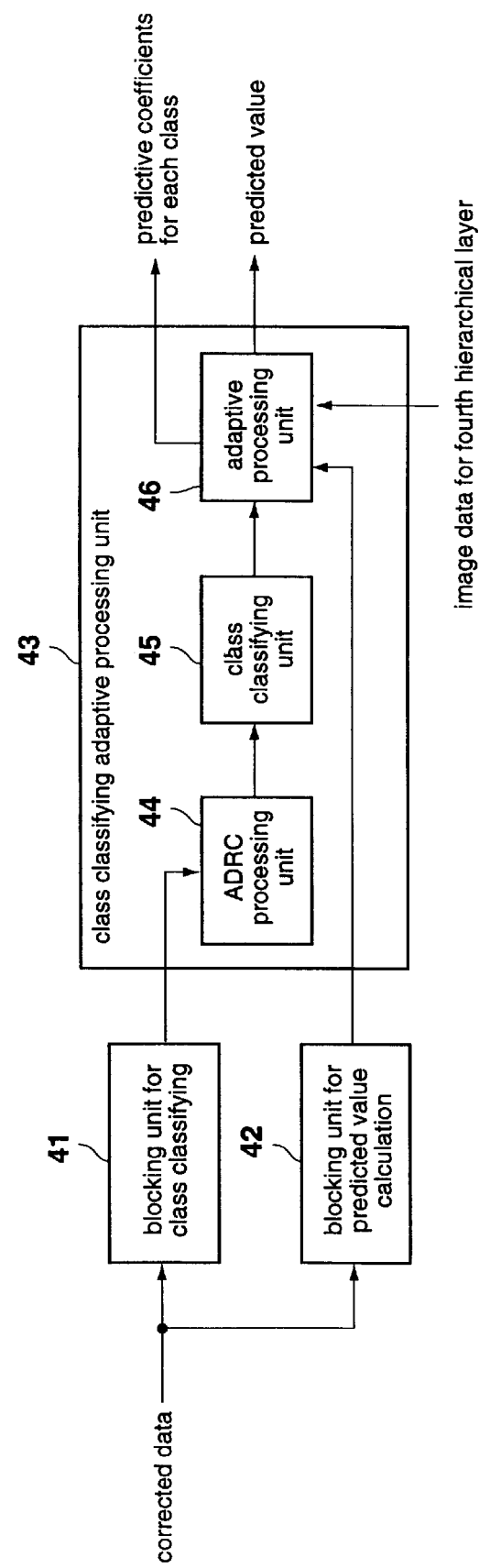
FIG. 10 is a block view showing an example configuration of the local decoders $22_1$ to $22_4$ of FIG. 9.

FIG. 10 shows an embodiment of the local decoder $22_4$ of FIG. 9.

Corrected data from the correcting unit 21 is supplied to a blocking unit for class classifying 41 and a blocking unit for predicted value calculation 42. The blocking unit for class classifying 41 puts the corrected data into class classifying blocks centered about the noted corrected data that are units for sorting the corrected data into prescribed classes in response to the properties of the corrected data.

Figure 11:
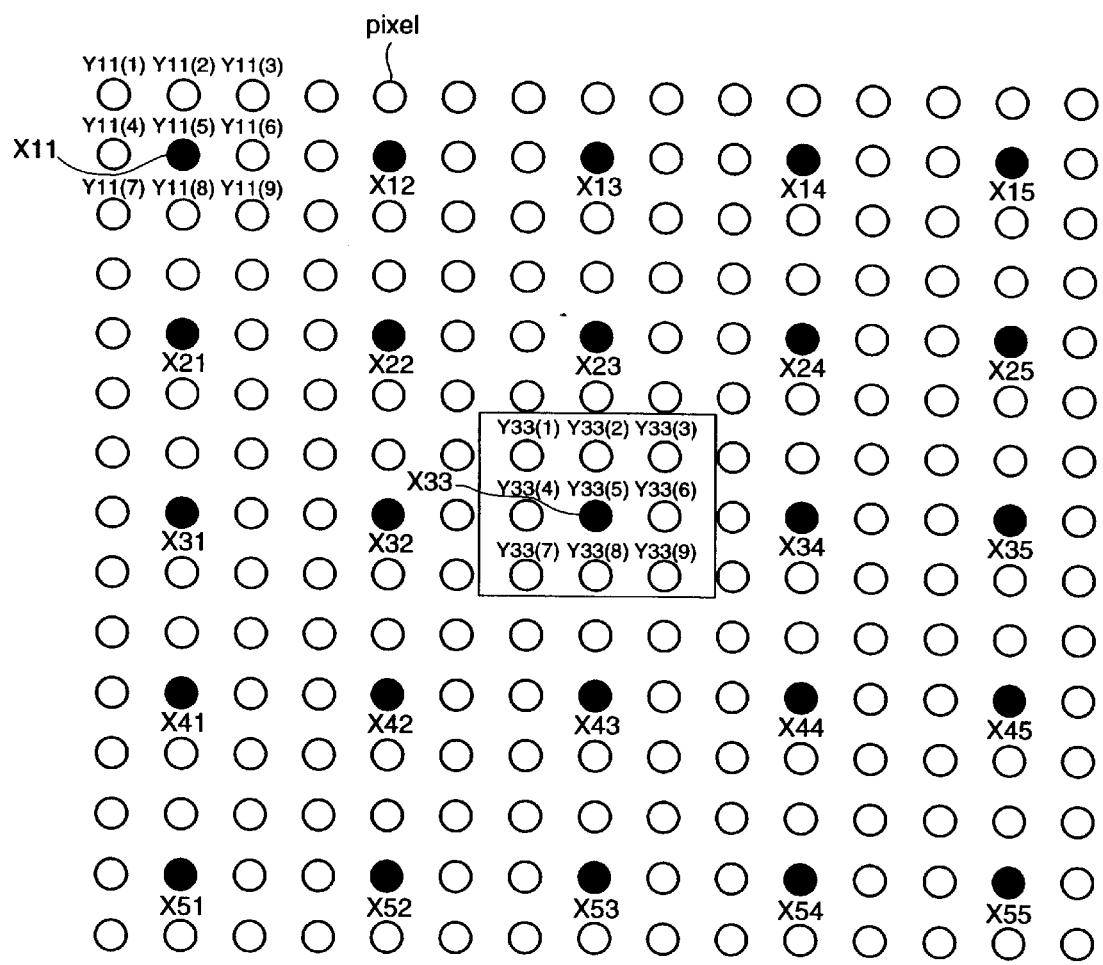
FIG. 11 is a view illustrating the process for the blocking unit for class classifying 41 of FIG. 10.

For example, in FIG. 11, pixels shown by ● comprise the image (corrected data) for the fifth hierarchical layer and pixels shown by ○ comprise the image data (corrected data) for the fourth hierarchical layer. When the corrected data (or pixel) that is the ith down from the top and jth from the left is expresses as $X_{ij}$, the blocking unit for class classifying 41 constructs a class classifying block comprising a total of nine pixels of the eight pixels $X_{(i-1)(j-1)}$, $X_{(i-1)j}$, $X_{(i-1)(j+1)}$, $X_{i(j-1)}$, $X_{i(j+1)}$, $X_{(i-1)(j-1)}$, $X_{(i-1)j}$, $X_{(i+1)(j+1)}$, to the upper left, top, upper right, left, right, lower left, bottom, and lower right of the noted pixel $X_{ij}$, plus the noted pixel itself. This class classifying block is then supplied to a class classifying adaptive processing unit 43.

In this case, the class classifying block is a square-shaped block of 3×3 pixels but the shape of the class classifying block does not have to be square, and can be, for example, rectangular, cross-shaped or another arbitrary shape. The number of pixels in the class classifying block is also by no means limited to a nine pixel of 3×3 pixels block.

The blocking unit for predicted value calculation 42 puts the corrected data into the form of blocks for predicted value centered about a noted corrected data are units for calculating the predicted value for the image data for the fourth hierarchical layer. Namely, in FIG. 11, taking the corrected data $X_{ij}$ (the portions shown by ● in FIG. 11) as the center and expressing the nine pixel values of 3×3 occurring in the image data (source picture) of the fourth hierarchical layer as $Y_{ij(1)}$, $Y_{ij(2)}$, $Y_{ij(3)}$, $Y_{ij(4)}$, $Y_{ij(5)}$, $Y_{ij(6)}$, $Y_{ij(7)}$, $Y_{ij(8)}$, $Y_{ij(9)}$, in order to calculate predicted values for the pixels $Y_{ij(1)}$ to $Y_{ij(9)}$, the blocking unit for predicted value calculation 42 configures a square block for predicted value calculating use comprising, for example, the twenty-five pixels of $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j-1)}$, $X_{(i+2)j}$, $X_{(i+2)(j+1)}$ and $X_{(i+2)(j+2)}$ centered about the pixel Xij as 5×5 martix.

Specifically, as, for example, shown in FIG. 11, a block for prediction error calculating is configured from corrected data $X_{11'}$, $X_{12'}$, $X_{13'}$, $X_{14'}$, $X_{15'}$, $X_{21'}$, $X_{22'}$, $X_{23'}$, $X_{24'}$, $X_{25'}$, $X_{31'}$, $X_{32'}$, $X_{33'}$, $X_{34'}$, $X_{35'}$, $X_{41'}$, $X_{42'}$, $X_{43'}$, $X_{44'}$, $X_{45'}$, $X_{51'}$, $X_{52'}$, $X_{53'}$, $X_{54'}$ and $X_{55'}$ in order to calculate predicted values for the pixels $Y_{33(1)}$ to $Y_{33(9)}$ occurring in the image for the fourth hierarchical layer enclosed by the quadrilateral shape in FIG. 11.

Blocks for predicted value calculation obtained at the blocking unit for predicted value calculation 42 are supplied to the class classifying adaptive processing unit 43.

The number of pixels and shape of the block for predicted value calculation, as with the case for the blocks for class classifying, is also not limited to being as described. However, it is preferable for the number of pixels comprising the block for predicted value calculation to be greater than the number of pixels comprising the block for class classifying.

When the above blocking is carried out (this is the same for processes other than blocking processes) and there is no corresponding pixel in the vicinity of the picture frame for the image, processing is carried out as though, for example, the same pixels as the pixels of the picture frame exist on the outside.

The class classifying adaptive processing unit 43 includes an ADRC (Adaptive Dynamic Range Coding) processing unit, a class classifying unit 45 and an adaptive processing unit 46 and carries out class classifying adaptive processing.

Class classifying adaptive processing sorts an input signal into a number of classes based on the characteristics of the input signal, and then executes the adaptive processing appropriate to each class. Class classifying adaptive processing can therefore be largely divided into class classifying processing and adaptive processing.

Here, a simple description is given of class classifying processing and adaptive processing.

First, class classifying processing is described.

Figure 12A:
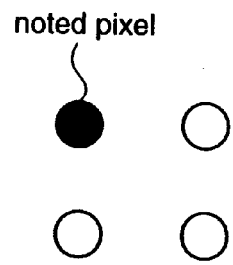
FIGS. 12A and 12B are views illustrating the class classifying process.
Figure 12B:
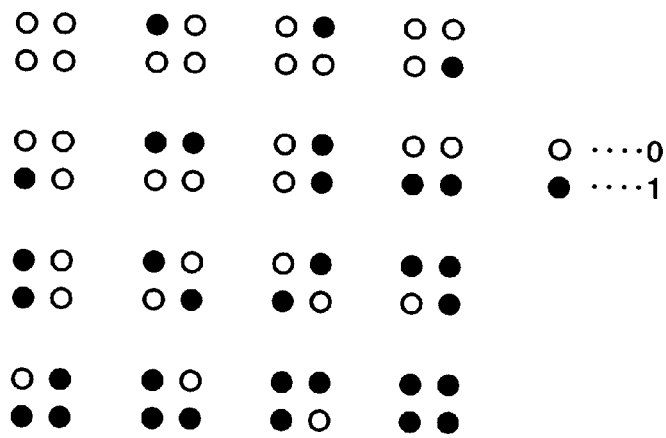

As shown, for example, in FIG. 12A, a block is configured of 2×2 pixels (a block for class classifying), including a certain noted pixel and three pixels neighboring this noted pixel. Each pixel is taken to be expressed by one bit (of a level of either 0 or 1). In this case, the 2×2 four pixel block is classified into 16 ($=(2_1)_4$) patterns as shown in FIG. 12B using the distribution of each of the pixel levels. This kind of pattern dividing is the class classifying process and is carried out at the class classifying unit 45.

The class classifying process can be carried out in such a manner as to take into consideration the activity (image complexity and/or severity of change) of the image (image within a block).

Usually, for example, about 8 bits are allotted to each pixel. Further, in this embodiment, as described above, the class classifying blocks have nine pixels of 3×3 centered about a noted pixel. Therefore, because class classifying processing is carried out targeting this kind of block for class classifying use, an enormous number of $(2_8)_9$ classes can be classified.

In this embodiment, ADRC processing is carried out on the block for class classifying use at the ADRC processing unit 44. The number of classes can then be reduced by making the number of bits for the pixels comprising the blocks for class classifying use small.

Figure 13A:
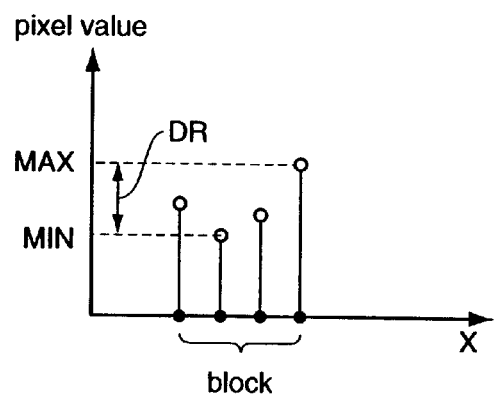
FIGS. 13A–13C are views illustrating the ADRC process.

For example, in order to simplify the description, as shown in FIG. 13A, considering the block comprising four pixels lined-up above the straight line, the maximum value MAX and the minimum value MIN for these pixels is detected in the ADRC processing. DR=MAX−MIN is then taken as the localized dynamic range of the block and the pixel values of the pixels comprising this block are quantized to K-bits based on this dynamic range DR.

Figure 13B:
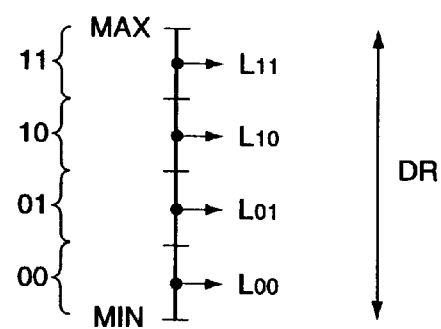

Namely, the minimum value MIN is subtracted from the values for each of the pixels within a block and this subtracted value is divided by $DR/2_K$ and converted to a code corresponding to the resulting divided value. Specifically, when, for example, K=2, as shown in FIG. 13B, the divided value divides the dynamic range DR into four ($=2_2$) equal parts and a determination is made as to which range the pixel values belong. When the divided value belongs to the range of the lowermost level, the range of the second lowermost level, the range of the third lowermost level or the range of the uppermost level, coding is carried out into two bits of, for example, 00B, 01B, 10B or 11B, respectively (B indicates a binary number). Decoding is then carried out on the decoding side by converting the ADRC code 00B, 01B, 10B and 11B to the center value $L_{00}$ of the range for the lowermost level, the center value $L_{01}$ for the range for the second lowermost level, the center value $L_{10}$ for the range for the third lowermost level and the center value $L_{11}$ for the range for the uppermost level. The minimum value MIN is then added to this value.

Figure 13C:
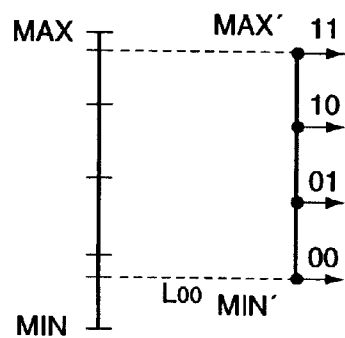

This kind of ADRC processing is referred to as non-edge matching. In this kind of non-edge matching, as shown in FIG. 13C, the dynamic range DR is divided into four equal parts and the mean value MIN' for the pixel value belonging to the range of the lowermost level and the mean value MAX' for the pixel value belonging to the range of the uppermost level are converted to ADRC codes 00B and 11B. The levels dividing the dynamic range DR' (into three equal parts) defined by MAX'−MIN' are converted to ADRC codes 01B and 10B so that ADRC decoding is carried out. This is ADRC processing, and is referred to as improved non-edge matching.

This ADRC processing is disclosed in detail in, for example, Japanese Laid-open Patent Publication Hei. 3-53778.

The class number can be reduced in the above way by performing ADRC processing by quantizing at a bit number smaller than the bit number allotted to the pixels comprising the blocks, with this kind of ADRC processing being carried out at the ADRC processing unit 44.

In this embodiment, class classifying is carried out at the class classifying unit 45 based on the ADRC code outputted from the ADRC processing unit 44. However, class classifying processing can also be carried out taking as an object data on which, for example, DPCM (estimation coding), BTC (Block Truncation Coding), VQ (Vector Quantization), DCT (Discrete Cosine Transform) and Adamar Transform coding are performed.

Next, adaptive processing will be described.

For example, the predicted value of the pixel value y for the fourth hierarchical layer can be considered to be obtained using a linear first order coupling model defined by pixel values (in this embodiment, corrected data, hereinafter referred to as learning data) $x_1, x_2, \ldots$ for several pixels in this vicinity and prescribed prediction coefficients $w_1, w_2, \ldots$. In this case, the predicted value is shown by the following equation.

$$= w_1 x_1 + w_2 x_2 + \qquad (1)$$

In order to generalize, the matrix W that is the set for the prediction coefficient w, the array X that is the set for the learning data and the array Y' that is the set for the predicted value is then defined by:

$$X = \begin{pmatrix} X_{11} & X_{12} & \ldots & X_1 n \\ X_{21} & X_{22} & \ldots & X_2 n \\ \ldots & \ldots & \ldots & \ldots \\ X_{m1} & X_{m2} & \ldots & X_{mn} \end{pmatrix}$$

$$W = \begin{pmatrix} W_1 \\ W_2 \\ \ldots \\ W_n \end{pmatrix}, Y' = \begin{pmatrix} E[y_1] \\ E[y_2] \\ \ldots \\ E[y_n] \end{pmatrix}$$

The following U equation can then be derived:

$$XW = Y' \qquad (2)$$

An predicted value near to the pixel value y of the fourth hierarchical layer can be obtained by applying the least square method to this trial equation. In this case, when the matrix Y that is the set for the pixel values (referred to in the following as "teacher data") y for the image data for the fourth hierarchical layer and the matrix E for the set for a remainder e for the predicted value with respect to the image value y for the fourth hierarchical layer are defined as $$E = \begin{pmatrix} e_1 \\ e_2 \\ \ldots \\ e_m \end{pmatrix}, Y = \begin{pmatrix} y_1 \\ y_2 \\ \ldots \\ y_n \end{pmatrix}$$

the following remainder equation can be derived from equation 2.

$$XW = Y + E \qquad (3)$$

In this case, the prediction coefficient $w_i$ for the fourth hierarchical layer for obtaining the predicted value close to the pixel value y for the image data for the fourth hierarchical layer can then be obtained in such a manner as to minimize a square error.

$$\sum_{i=1}^{m} e_i^2$$

Therefore, the square error differentiated by the prediction coefficient wi becomes zero, i.e. the prediction coefficient wi fulfilling the following equation is the most suitable value for obtaining a predicted value near to the pixel value y for the original image data.

$$e_1 \frac{\partial e_1}{\partial w_i} + e_2 \frac{\partial e_2}{\partial w_i} + \ldots + e_m \frac{\partial e_m}{\partial w_i} = 0$$

$$(1 = 1, 2, \ldots, n)$$

Here, the following equation is first derived by differentiating equation 3 by the prediction coefficient wi for the fourth hierarchical layer.

$$\frac{ae_1}{aw_i} x_{i1}, \frac{ae_i}{aw_2} = x_{i2}, \ldots, \frac{ae_i}{aw_n} = x_\epsilon, \qquad (5)$$

$$(1 = 1, 2, \ldots, m)$$

Equation (6) is then obtained from equation (4) and equation (5).

$$\sum_{i=1}^{m} e_i x_{i1} = 0, \sum_{i=1}^{m} e_i x_{i2} = 0, \ldots \sum_{=1}^{m} e_i x_{in} = 0. \qquad (6)$$

The following regular equation can then be obtained from equation (6) by considering the relationship between the learning data x of the remainder equation (3), the prediction coefficient w, the teacher data y, and the remainder e.

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \left(\sum_{i=1}^{m} x_{i2} y_i\right) \\ \left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \left(\sum_{i=1}^{m} x_{in} y_i\right) \end{cases} \qquad (7)$$

The regular equation of equation (7) can only be made to be equal to the number for the prediction coefficient w to be obtained. The most suitable prediction coefficient w can then be obtained by working out equation (7). Equation (7) can then be resolved by applying, for example, the sweep method (Gauss-Jordan elimination method).

As described above, the most suitable fourth hierarchical layer prediction coefficient w is obtained, and there is then an adaptive process for obtaining an predicted value near to a pixel value y for an image data for the fourth hierarchical layer from equation (1) using this prediction coefficient w. This adaptive process is carried out at the adaptive processing unit 46.

This adaptive processing is not included in the thinned-out image (here, this is the image data for the fifth hierarchical layer) and is different from interpolation processing at the time of reproduction of components included in the original image data (here, this is the image data for the fourth hierarchical layer). Namely, in this adaptive processing, being limited to only considering equation (1) is the same as the so-called interpolation processing employing an interpolation filter. However, components included in the original image data can be regenerated because the prediction coefficient corresponding to the tap coefficient w of this interpolation filter is obtained by so-called "learning" using the teacher data y. Because of this, the adaptive process can be seen to be a process for so-called image reproduction operation use.

Figure 14:
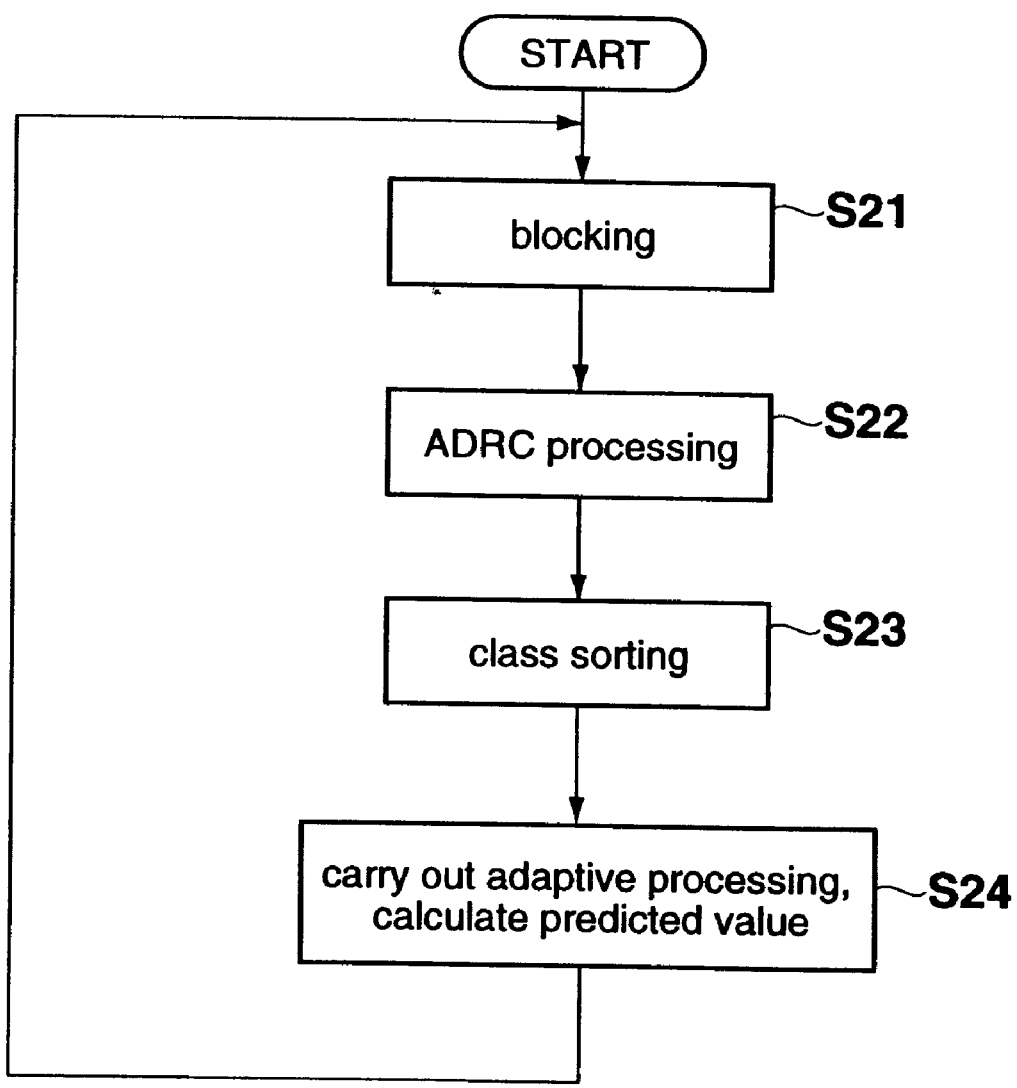
FIG. 14 is a flowchart illustrating the operation of the local decoders 221 to 224 of FIG. 10.

Next, the operation of the local decoder 22 of FIG. 10 is described with reference to the flowchart of FIG. 14.

First, in step S21, the local decoder 22 puts corrected data from the correcting unit 21 into the form of blocks. Namely, at the blocking unit for class classifying 41, the corrected data is put into the form of 3×3 pixel blocks for class classifying centered about noted corrected data and the blocks are supplied to the class classifying adaptive processing unit 43. Further, at the blocking unit for predicted value calculation 42, the corrected data is put into the form of 5×5 pixel blocks for predicted value calculation centered about a noted corrected data and supplied to the class classifying adaptive processing unit 43.

Image data for the fourth hierarchical layer is also supplied to the class classifying adaptive processing unit 43 in addition to the blocks for class classifying and the blocks for predicted value calculation. The blocks for class classifying are supplied to the ADRC processing unit 44 and the blocks for predicted value calculation and the image data for the fourth hierarchical layer are supplied to the adaptive processing unit 46.

In step S22, when the blocks for class classifying are received, the ADRC processing unit 44 subjects the blocks for class classifying to, for example, one bit ADRC (ADRC carried out using one bit quantization) processing so that the corrected data is converted (coded) into one bit and outputted to the class classifying unit 45. In step S23, the class classifying unit 45 subjects the blocks for class classifying that have been ADRC processed to class classifying processing (that is, detects a state of distribution for each of pixel levels in the block) and determines the classes to which these class classifying blocks belong. The results of this class determination are then supplied to the adaptive processing unit 46 as class information.

In this embodiment, each of the blocks for class classifying use belong to one of the 512 ($=(2_1)_9$) classes because class classifying dividing has been carried out on the blocks for class classifying comprising 9 pixels arranged as 3×3 that have undergone one-bit ADRC processing.

Then, at step S24, adaptive processing is performed by the adaptive processing unit 46 for each class based on class information from the class classifying unit 45 so that prediction coefficients for each class and predicted values for one frame for the fourth hierarchical layer can be calculated.

Namely, in this embodiment, 25×9 prediction coefficients for each class are calculated the image data of fourth hierarchial layer and the corrected data for one frame, when certain corrected data is taken as noted data, the predicted value for the original image (here, this is the image data for the fourth hierarchical layer) with respect to the total of nine pixels of the pixel corresponding to this noted corrected data and the eight pixels surrounding this pixel are calculated by carrying out adaptive processing using 25×9 prediction coefficients corresponding to the class information blocks for estimation value calculating 5×5 pixels centered about the noted corrected data in response to the class information.

Specifically, for example, when class information C for the block for class classifying comprising the 3×3 corrected data $X_{22'}$, $X_{23'}$, $X_{24'}$, $X_{32'}$, $X_{33'}$, $X_{34'}$, $X_{42'}$, $X_{43'}$, and $X_{44}$ centered about the corrected data $X_{33}$ shown in FIG. 11 is outputted from the class classifying unit 45 and a block for predicted value calculation comprising corrected data $X_{11'}$, $X_{12'}$, $X_{13'}$, $X_{14'}$, $X_{15'}$, $X_{21'}$, $X_{22'}$, $X_{23'}$, $X_{24'}$, $X_{25'}$, $X_{31'}$, $X_{32'}$, $X_{33'}$, $X_{34'}$, $X_{35'}$, $X_{41'}$, $X_{42'}$, $X_{43'}$, $X_{44'}$, $X_{45'}$, $X_{51'}$, $X_{52'}$, $X_{53'}$, $X_{54'}$ and $X_{55'}$ for the 5×5 pixels centered about the corrected data $X_{33}$ is outputted from the blocking unit for predicted value calculation 42 as a block for predicted value calculating, the corrected data comprising this block for predicted value calculating is first taken as learning data, and the 3×3 pixel (the portion surrounded by the quadrilateral in FIG. 11) values Y33(1) to Y33(9) centered about the corrected data X33 are taken as teacher data so that the regular equation shown in equation (7) is fulfilled.

For example, for one frame, when the regular equation is also fulfilled in the same way for other blocks for prediction value calculating use sorted by the class information C and the prediction coefficients w1(k) to w25(k) (in this embodiment, 25 items of learning data are used to obtain one predicted value and 25 prediction coefficients w are therefore needed) for obtaining a predicted value E for a predicted value $Y_{33}(k)$ (where k=1, 2, . . . 9) are calculated if at all possible to just the number for obtaining the regular equation (the process for fulfilling the regular equation is carried out in step S24 until a regular equation of this number is obtained), with respect to the class information C, the most suitable prediction coefficients $w_1(k)$ to $w_{25}(k)$ for obtaining the predicted value E for the pixel value $Y_{33}(k)$ is calculated by resolving this regular equation. This process is carried out for each class, 25×9 prediction coefficients are calculated for each class. The predicted value is then obtained in accordance with the following equation corresponding to the equation (1) using 25×9 prediction coefficients corresponding to class information adn 25 pixels in block for predicted values calculation.

$$=w_1(k)X_{11}+w_2(k)X_{12}+w_3(k)X_{13}+w_4(k)X_{14}+w_5(k)X_{15}+w_6(k)X_{21}$$

$$+w_7(k)X_{22}+w_8(k)X_{23}+w_9(k)X_{24}+w_{10}(k)X_{25}+w_{11}(k)X_{31}$$

$$+w_{12}(k)X_{32}+w_{13}(k)X_{33}+w_{14}(k)X_{34}+w_{15}(k)X_{35}$$

$$+w_{16}(k)X_{41}+w_{17}(k)X_{42}+w_{18}(k)X_{43}+w_{19}(k)X_{44}$$

$$+w_{20}(k)X_{45}+w_{21}(k)X_{51}+w_{22}(k)X_{52}+w_{23}(k)X_{53}$$

$$+w_{24}(k)X_{54}+w_{25}(k)X_{55} \qquad (8)$$

In step S23, after 25×9 predictive coefficients for each class are calculated, 3×3 predicted values are calculated in units of 3×3 pixels centered about the noted corrected data. Thereafter, in step S24, the 25×9 predictive coefficients for each class are provided to the determining unit 24 and the predicted values are provided to the error calculating unit for each 3×3 pixels. Processing then returns to step S21 and the process is repeated for each one frame.

The above processing is also carried out at the local decoders $2_{21}$ to $2_{23}$. In this way, the predicted values for the first to third hierarchical layers can be obtained using nine pixel units and prediction coefficients for each class can be obtained for each layer. The predicted values and prediction coefficients for each class for the first to fourth hierarchical layers are stored in the memories 26 and 27 and the predicted values for the first hierarchical layer is supplied to the error calculating unit 23 (FIG. 5).

Figure 15:
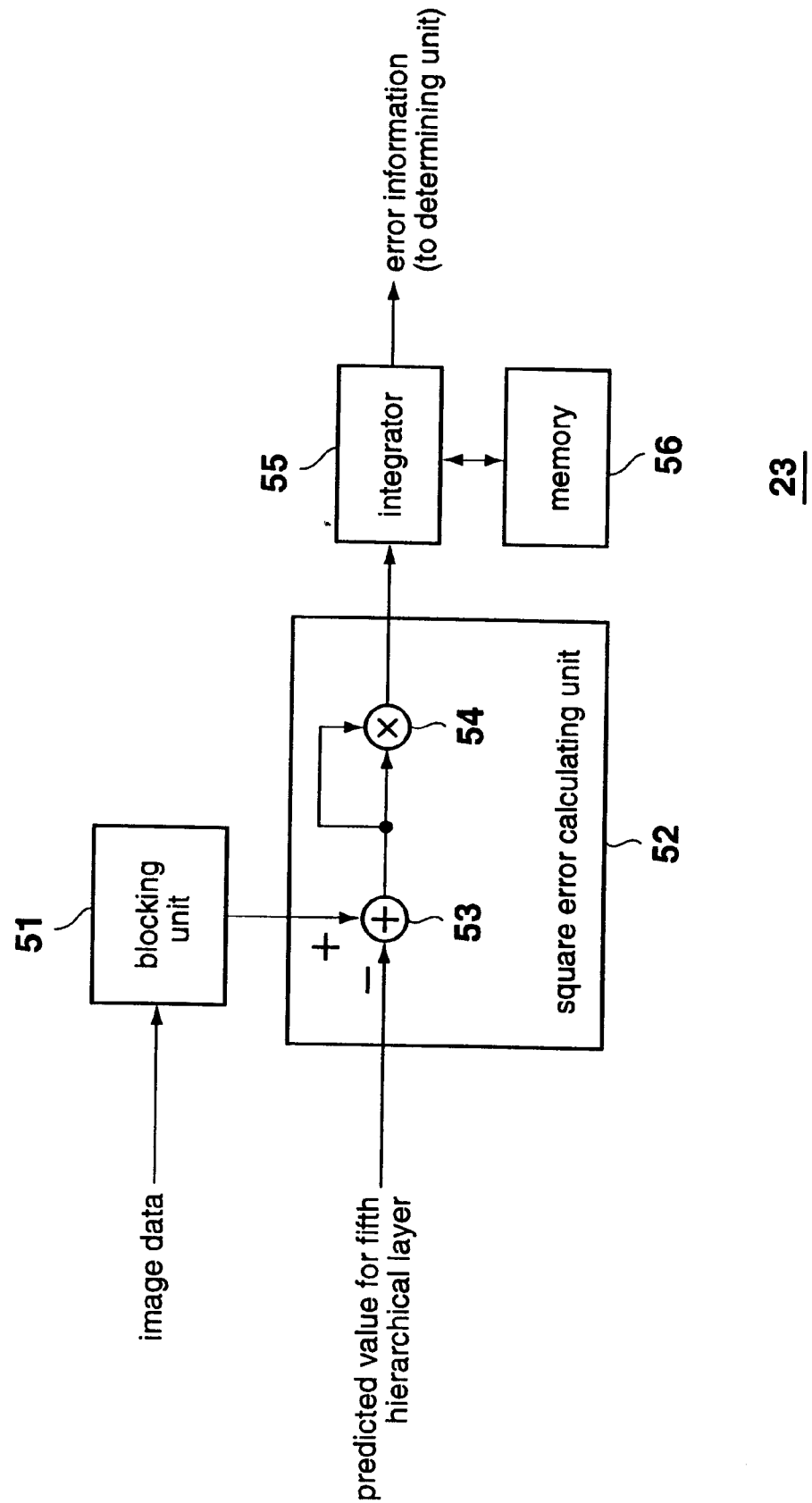
FIG. 15 is a view showing an example configuration of the error calculating unit 23 of FIG. 5.

Next, FIG. 15 shows an example configuration of the error calculating unit 23 of FIG. 5.

The original image data (i.e., the image data for the first hierarchical layer) is supplied to a block coding unit 51. The block coding unit 51 then puts this image data into the form of nine blocks corresponding to the predicted values for the first hierarchical layers outputted from the predicting unit 22. The resulting 3×3 pixel blocks obtained as a result are then outputted to a square error calculating unit 52. Predicted values for the first hierarchical layer from the predicting unit 22 are also supplied to the square error calculating unit 52 in nine units (block units of 3×3 pixels) in addition to the blocks supplied from the block coding unit 51. The square error calculating unit 52 then calculates a square error as the predicted error for the predicted value with respect to the image data for the first hierarchical layer, and supplies this to an integrator 55.

The square error calculating unit 52 includes arithmetic units 53 and 54. The arithmetic unit 53 subtracts corresponding predicted values from image data from the block coding unit 51 that has been put into block form and these subtracted values are supplied to the arithmetic unit 54. The arithmetic unit 54 then squares the output (the image data for the first hierarchical layer, together with the predicted value and difference) of the arithmetic unit 53 and supplies this to the integrator 55.

When the square error is received from the square error calculating unit 52, the integrator 55 reads the values stored in the memory 56. These stored values and the squared errors are then added, again supplied to the memory 56 and stored, with this process being repeated. The integrated value (error dispersion) of the square error is therefore obtained. When the integrator 55 then finishes integrating square errors for a prescribed amount (for example, one frame portion, etc.), this integrated value is read from the memory 56 and supplied to the determining unit 24 (FIG. 5) as error information. When the processing for one frame is complete, the memory 56 clears the stored values while storing anew the values outputted by the integrator 55.

Figure 16:
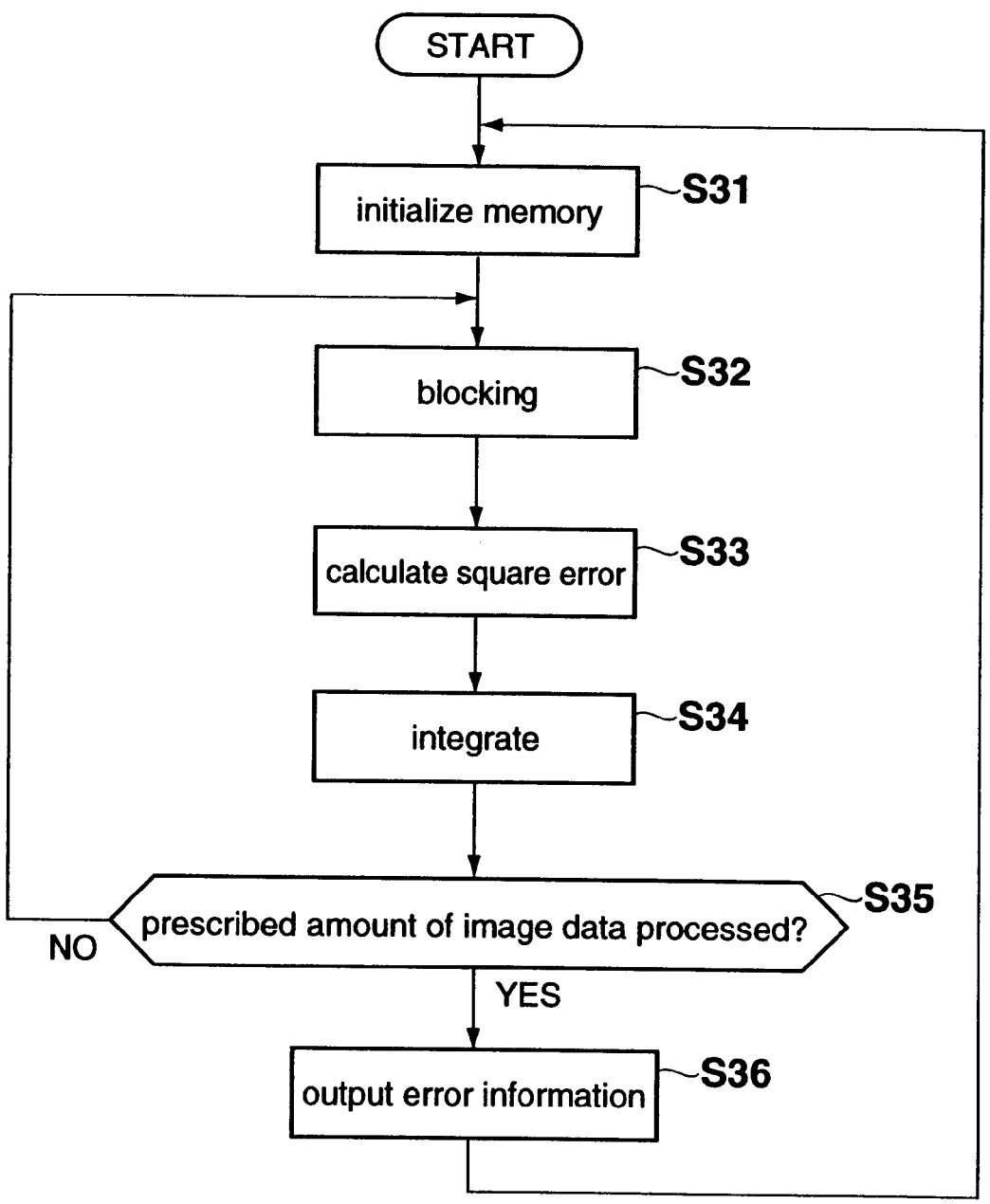
FIG. 16 is a flowchart illustrating the operation of the error calculating unit 23 of FIG. 15.

Next, the operation of the error calculating unit 23 is described with reference to the flowchart of FIG. 16. At the error calculating unit 23, the value stored in the memory 56 is first, for example, cleared to 0 in step S31. At step S32, at the block coding unit 51, the image data for the first hierarchical layer is put into the form of blocks and the resulting blocks are supplied to the square error calculating unit 52. The square error for the image data for the first hierarchical layer including the blocks supplied from the block coding unit 51 and the predicted values for the first hierarchical layer supplied from the predicting unit 22 is then calculated in step S33 at the square error calculating unit 52.

Namely, in step S33, at the arithmetic unit 53, corresponding predicted values are subtracted from the respective image data for the first hierarchical layer supplied in block form by the block coding unit 51 and the resulting data is supplied to the arithmetic unit 54. Further, in step S33, the output of the arithmetic unit 53 is squared at the arithmetic unit 54 and supplied to the integrator 55.

When the square error from the square error calculating unit 52 is received, in step S34, the integrator 55 reads the values stored in the memory 56 and obtains integrated values for the square error by adding these stored values and the square errors. The integrated values for the squared errors calculated at the integrator 55 are then supplied to the memory 56 and stored by overwriting the values stored for the previous time.

Next, in step S35, the integrator 55 makes a determination as to whether or not integration of the square errors for a prescribed amount of, for example, one frame portion, is complete. When it is determined in step S35 that integration of the square errors for one frame portion is not complete, processing returns to step S32 and the process from step S32 onwards is repeated. Further, when it is determined in step S35 that integration of the square errors for one frame portion is complete, processing proceeds at step S36. The integrator 55 then reads out integration values for square errors for one frame portion stored in the memory 56 and outputs these to the determining unit 24 as error information. Processing returns to step S31 and the procedure is repeated from step S31.

The error information Q is then calculated at the error calculating unit 23 by carrying out arithmetic operations in accordance with the following equation when the image data for the first hierarchical layer is taken to be $Y_{ij(k)}$ and the predicted value for the first hierarchical layer generated from corrected data at the predicting unit 22 is taken to be.

$Q=\Sigma(Y_{ij}(k)-)^2$

Here, $\Sigma$ means a summation with respect to one frame portion.

Figure 17:
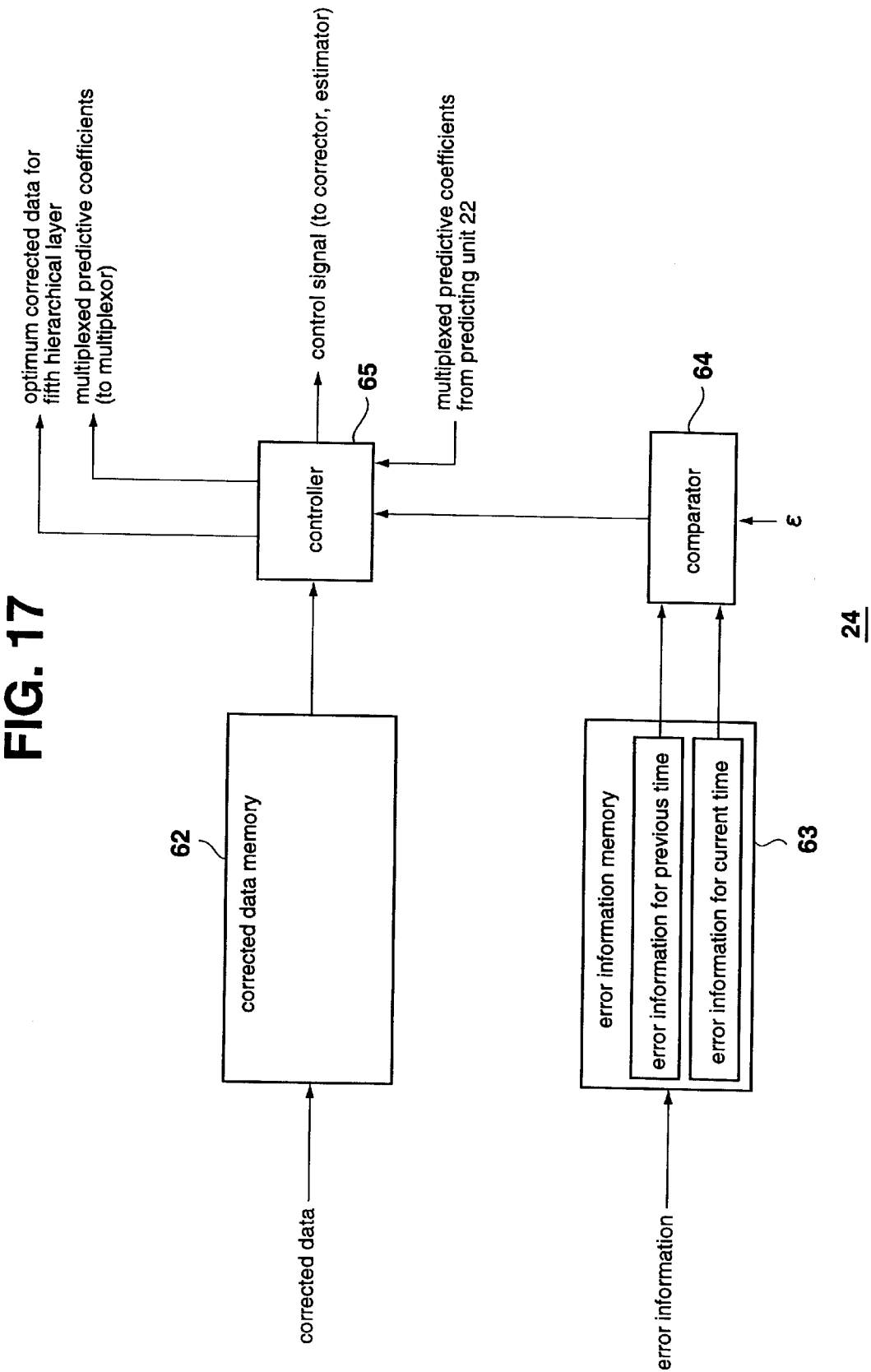
FIG. 17 is a block view showing an example configuration of the determining unit 24 of FIG. 5.

FIG. 17 shows an example configuration of the determining unit 24 of FIG. 5.

A corrected data memory 62 stores corrected data supplied from the correcting unit 21.

When newly corrected data is supplied by the image data for the fifth hierarchical layer being newly corrected at the correcting unit 21, the corrected data memory 62 stores the newly corrected data in place of the corrected data (data corrected the previous time) already stored.

An error information memory 63 stores error information supplied from the error calculating unit 23. As well as storing the error information currently provided from the error calculating unit 23, the error information memory 63 stores error information supplied the previous time (already stored error information is held until new error information is supplied even if new error information is supplied). The error information memory 63 is then cleared every time processing of new frames commences.

A comparator 64 compares error information for the current time stored in the error information memory 63 and a prescribed threshold value $\vartheta$, as well as comparing error information for the current time and error information for the previous time if necessary. The comparison results of the comparator 64 are then supplied to a control unit 65.

The control unit 65 determines whether corrected data stored in the corrected data memory 62 is suitable (optimally suited) to be taken as image coding results based on the comparison results of the comparator 64. When the corrected data is confirmed (determined) not to be the most appropriate, a control signal requesting outputting of new corrected data is supplied to the correcting unit 21 (correcting unit 32) (FIG. 5). Further, when the corrected data stored in the corrected data memory 62 is confirmed to be the most suited to be taken as coding results for the image, the control unit 65 reads out corrected data stored in the corrected data memory 62, outputs this data to the multiplexing unit 25 and controls the predicting unit 22 (FIG. 9) so that the predicted values and prediction coefficients for each class for first to fourth hierarchial layers stored in the memories 26 and 27 respectively are read out. Further, in this case, the control unit 65 outputs a control signal indicating completion of coding for one frame of image to the correcting unit 21 so that processing starts at the correcting unit 21 for the following frame as described above.

Figure 18:
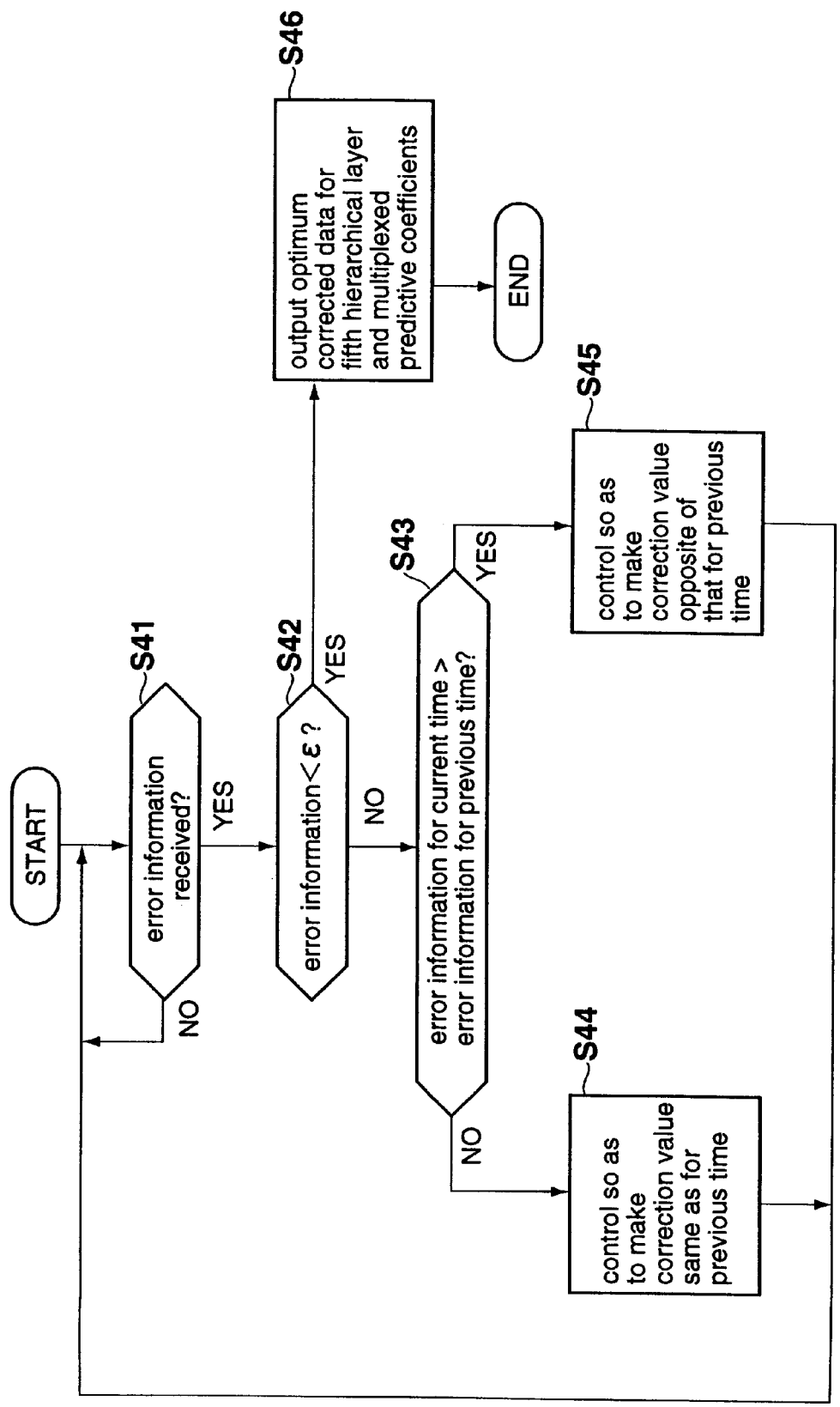
FIG. 18 is a flowchart illustrating the operation of the determining unit 24 of FIG. 17.

Next, a description of the operation of the determining unit 24 is given with reference to FIG. 18. At the determining unit 24, whether or not error information has been received from the error calculating unit 23 is determined in step S41 by the comparator 64. When it is determined that error information has not been received, processing returns to step S41. When it is determined in step S41 that error information has been received, i.e. that error information is stored at the error information memory 63, processing proceeds to step S42. The comparator 64 then compares the error information currently stored in the error information memory 63 (the current error information) and the prescribed threshold value $\epsilon$ and determines which is larger.

When it is determined in step S42 that the error information for the current time is equal to or greater than the prescribed threshold value $\epsilon$, the comparator 64 reads out error information for the previous time stored in the error information memory 63. The comparator 64 then compares the error information for the previous time and the error information for the current time in step S43 and determines which is the larger.

When processing is started for one frame and error information is first provided, the error information for the previous time is not stored in the error information memory 63. Therefore, in this case, the processing from step S43 onwards is not carried out at the determining unit 24. A control signal for controlling the correcting unit 32 (FIG. 5) is then outputted and a prescribed initial address is outputted.

When it is determined in step S43 that the current error information is less than or equal to the error information for the previous time, i.e. when the error information is reduced by carrying out correction of image data of the fifth hierarchical layer, processing proceeds to step S44. The control unit 65 then outputs a control signal indicating that a correction value $\Delta$ is to be changed in the same way as for the previous time to the correcting unit 32 and processing returns to step S41. Further, when it is determined in step S43 that the error information for the current time is larger than the error information for the previous time i.e. when the error information is increased by carrying out correction of image data for the fifth hierarchical layer, processing proceeds to step S45, where the control unit 65 outputs, to the correcting unit 32, a control signal indicating that the correction value $\Delta$ has been changed in a way that is the opposite that of the previous time. Processing returns to step S41.

When error information that continues to be reduced rises with a certain timing, the control unit 65 outputs a control signal indicating that the corrected value $\Delta$ is to be changed in a manner opposite to that of the previous time to, for example, ½ the size of the change up until that point in time.

The error information is then reduced by repeating the process of step S41 to S45. In this way, when the error information of the current time is determined in step S42 to be smaller than the prescribed threshold value, processing proceeds to step S46. The control unit 65 then reads corrected data stored in the corrected data memory 62 and the predicted value for the first hierarchical layer is supplied to the multiplexing unit 25 as the optimum corrected data present in the most suitable data. In step S46, the control unit 65 causes the predicted values for the first to fourth hierarchical layers to be read-out from the memory 26 of the predicting unit 22 (FIG. 9) and each of the prediction coefficients for each class for the first to fourth hierarchical layers to be read out from the memory 27.

The predicted values for the first to fourth hierarchical layers read-out from the memory 26, i.e. the predicted values for the first to fourth hierarchical layers when the error information is less than the threshold value $\epsilon$ are supplied to the arithmetic units 121 to 124 as described above. A set of the prediction coefficients for each class for the first to fourth hierarchical layers read out from the memory 27 are multiplexed at the multiplexing unit 28 (FIG. 9). The set of prediction coefficients for each class obtained as a result are then supplied to the multiplexing unit 25 via the control unit 65.

After this, processing waits for the error information for the following frame and the process is repeated in accordance with the flowchart shown in FIG. 18.

At the correcting unit 32, the correction for the image data for the fifth hierarchical layer may also be carried out for all of the image data for the fifth hierarchical layers of one frame and may also be carried out just with respect to data for this one portion. When correction is carried out only with respect to this one portion, for example, pixels that strongly influence the error information are detected by the control unit 65, with correction then only being carried out for these pixels. Pixels that strongly influence the error information can be detected, for example, in the following way. Namely, first, error information can be obtained by carrying out processing using the image data for the fifth hierarchical layer as is. Then, a control signal which causes processing for correcting the every pixel of the image data for the fifth hierarchical layer by the same correction value $\Delta$ is outputted from the control unit 65 to the correcting unit 32. The resultant error information is compared with the error information obtained when the image data for the fifth hierarchical layer is used with any modification, and pixels with which the difference obtained from the comparison is equal to or greater than a prescribed value can then be detected as those pixels that strongly influence the error information.

Correction of the image data for the fifth hierarchical layer is then repeated until the error information becomes smaller than the prescribed threshold value $\epsilon$. The corrected data when the error information becomes smaller than the prescribed threshold value $\epsilon$ is then outputted as the optimum corrected data. It is therefore possible to obtain a decoded image at the receiving apparatus 4 (FIG. 1) that is the substantially the same as the source image using this optimum corrected data, i.e. just the corrected data for the value that is the most suited to decoding the image for the first hierarchical layer.

The above coding processing of the transmitting apparatus 1 achieves highly efficient compression by so-called organic integration of compression processing using thinning out and class classifying adaptive processing and integrated code processing can therefore be carried out.

Figure 19:
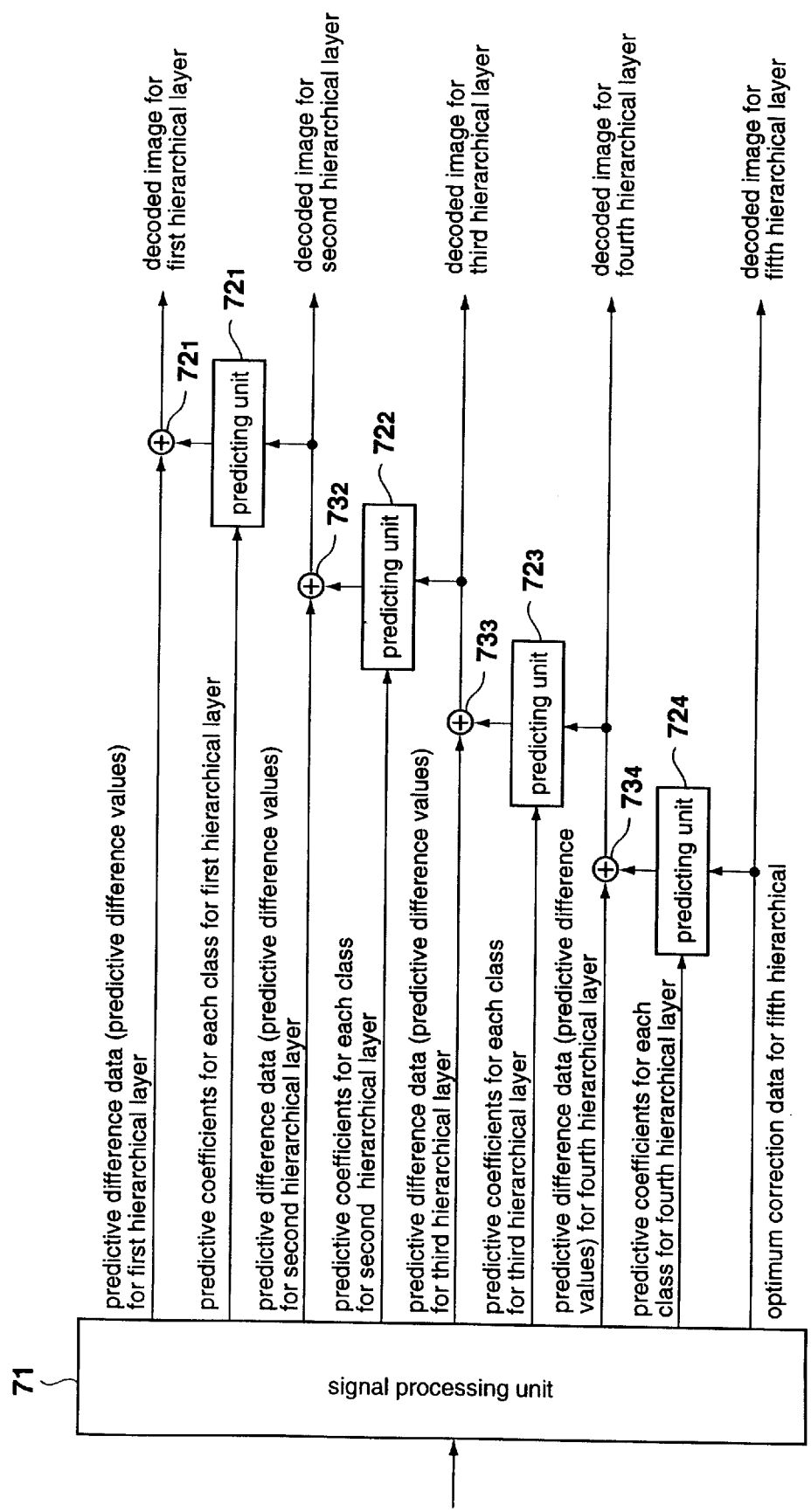
FIG. 19 is a block view showing the configuration of a first embodiment of the receiving apparatus 4 of FIG. 1.

FIG. 19 shows an embodiment of the receiving apparatus 4 of FIG. 1.

Coded data played back from the recording medium 2 or coded data transmitted via a transmission path 3 is supplied to a signal processing unit 71. This coded data is then divided into coded data for the first to fifth hierarchical layers at the signal processing unit 71 and is subjected to error correction processing and other necessary processing. The signal processing unit 71 then further separates the most appropriate data and each of the prediction coefficients for each class for the first to fourth hierarchical layers from the coded data for the fifth hierarchical layer. The signal processing unit 71 then supplies the coded data (different data having a plurality of predictive difference values for the first to fourth hierarchical layers) for the first to fourth hierarchical layers to arithmetic units $73_1$ to $73_4$ and supplies the prediction coefficients for each class for the first to fourth hierarchical layers to predicting units $73_1$ to $73_4$. The signal processing unit 71 also outputs the most appropriate corrected data without modification as the decoded image for the fifth hierarchical layer as well as supplying this data to a predicting unit $72_4$.

The predicting unit $72_4$ then calculates the predicted value for the fourth hierarchical layer using the most appropriate corrected data and the prediction coefficients for each class for the fourth hierarchical layer and supplies this data to the arithmetic unit $73_4$. The predicted values for the fourth hierarchical layer and the predictive difference values (coded data for the fourth hierarchical layer) are added at the arithmetic unit 734. The addition result is then output without modification as the decoded image for the fourth hierarchical layer and supplied to the predicting unit $72_3$.

The predicted value for the third hierarchical layer is calculated at the predicting unit $72_3$ using the decoded image for the fourth hierarchical layer from the arithmetic unit $73_4$ and the prediction coefficients for each class for the third hierarchical layer and supplied to the arithmetic unit $73_3$. The predicted value for the third hierarchical layer and the difference values (coded data for the third hierarchical layer) are added at the arithmetic unit $73_3$. The results of this addition are then output without modification as the decoded image for the third hierarchical layer and supplied to the predicting unit $72_2$.

The same process is also carried out at the predicting unit $72_2$ and the arithmetic unit $73_2$, and the predicting unit $72_1$ and arithmetic unit $73_1$, so that decoded images can be outputted from the arithmetic unit $73_2$ and $73_1$ for the second hierarchical layer and the first hierarchical layer, respectively.

Next, the predicting units $72_1$ to $72_4$ will be described taking the predicting unit $72_4$ as an example.

Figure 20:
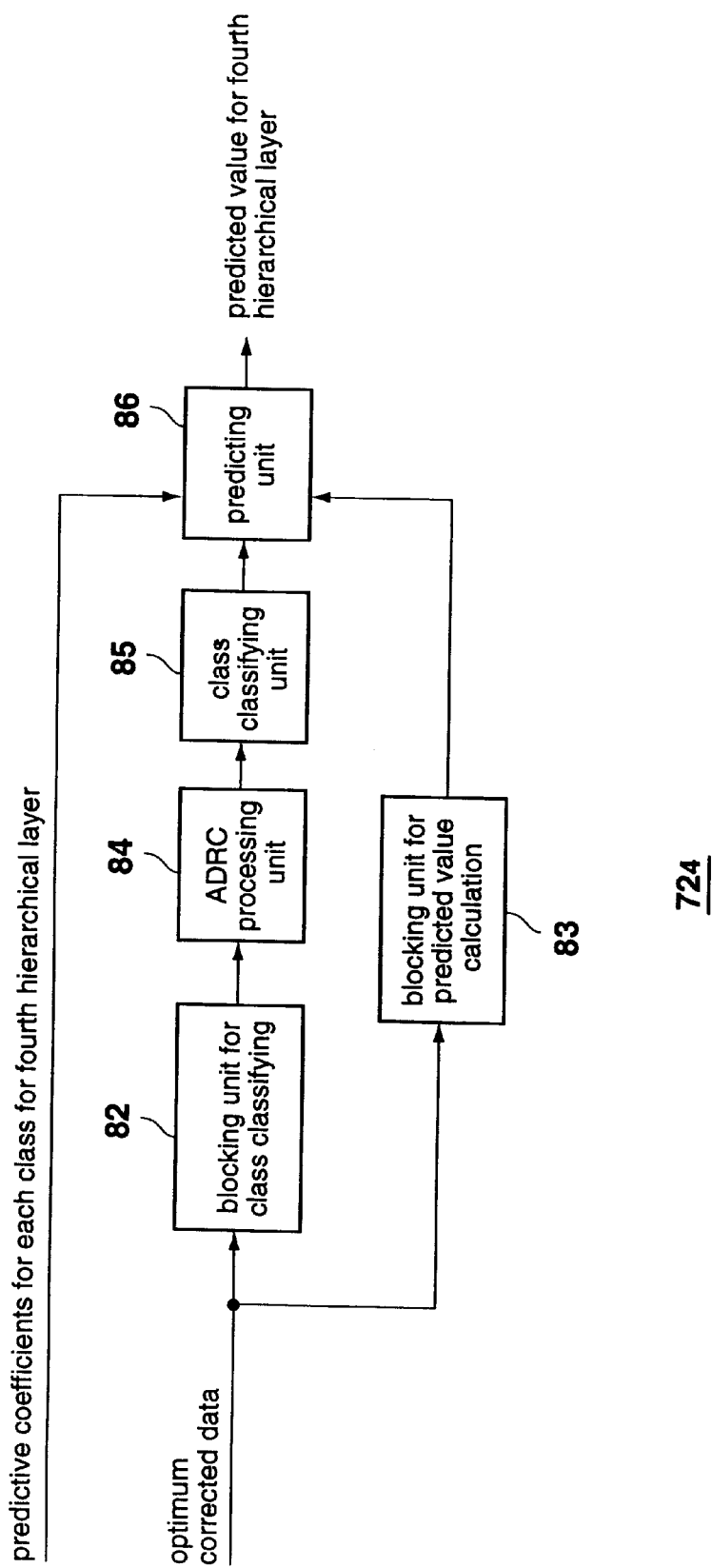
FIG. 20 is a block view showing an example configuration of the predicting units $72_1$ to $72_4$ of FIG. 19.

FIG. 20 shows an example configuration of the predicting unit $72_4$.

The most suitable (optimum) corrected data from the signal processing unit 71 (FIG. 19) is supplied to blocking unit for class classifying 82 and blocking unit for predicted value calculation 83, with the prediction coefficients for each class for the fourth hierarchical layer being supplied to a predicting unit 86 and then the prediction coefficients for each class are stored a memory as not shown.

The blocking unit for class classifying 82, the blocking unit for predicted value calculation 83, an ADRC processing unit 84 and a class classifying unit 85 have a similar configuration as the blocking unit for class classifying 41 in FIG. 10, the blocking unit for predicted value calculation 42, the ADRC processing unit 44 and the class classifying unit 45 in FIG. 10. Similar processes as for the case in FIG. 10 are therefore carried out on these blocks so that blocks for predicted value calculating are outputted from the blocking unit for predicted value calculation 83 and class information is output from the class classifying unit 85. The blocks for predicted value calculating and the class information is then supplied to the predicting unit 86.

The 3×3 predicted values for the fourth hierarchical layer are calculated at the predicting unit 86 in accordance with equation (1) using read prediction coefficients read from the memory as not shown, of the prediction coefficients for each class supplied for the fourth hierarchical stored the memory as not shown layer corresponding to class information and the optimum 5×5 corrected data comprising blocks for predicted value calculating use supplied from the blocking unit for predicted value calculation 83, with these predicted values being supplied to the arithmetic unit 734.

The predicted values for the first to third hierarchical layers are also obtained at the other predicting units 723 to 721 in a similar manner.

Therefore, at the receiving apparatus 4 shown in FIG. 19, predicted values for each of the hierarchical layers are obtained and the predicted difference values for these hierarchical layers are added so as to obtain pixel values that are closer to the original image data, with this then being used to obtain predicted values for the upper order hierarchical layers. Images are then obtained as decoded images for each of the hierarchical layers that are almost identical to the original images for the respective hierarchical layers.

Further, the most appropriate corrected data is such that the error for the predicted value for the first hierarchical layer obtained by sequentially carrying out the above-described process and the image for the first hierarchical layer is less than the threshold value $\epsilon$. Therefore, if part or all of the coded data (predictive difference data) for the first to fourth hierarchical layers is lost for whatever reason, a decoded image of a high resolution can be obtained using the coded data for the fifth hierarchical layer i.e. the optimum corrected data and each of the prediction coefficients for each class for the first to fourth hierarchical layers.

Also, for example, in the case of a receiving apparatus which can receive only the coded data of a third hierarchy (that is, optimum corrected data of the third hierarchy and each of prediction coefficients for each class of the first and second hierarchy), it is possible to decode a decoded image having high resolution. Furthermore, in the case of a receiving apparatus which can receive only the coded data of the second hierarchy and the coded data of the third hierarchy (that is, the optimum corrected data of the second and third hierarchies and each of the prediction coefficients for each class of the first and second hierarchy), it is possible to decode an image having high resolution.

Figure 30:
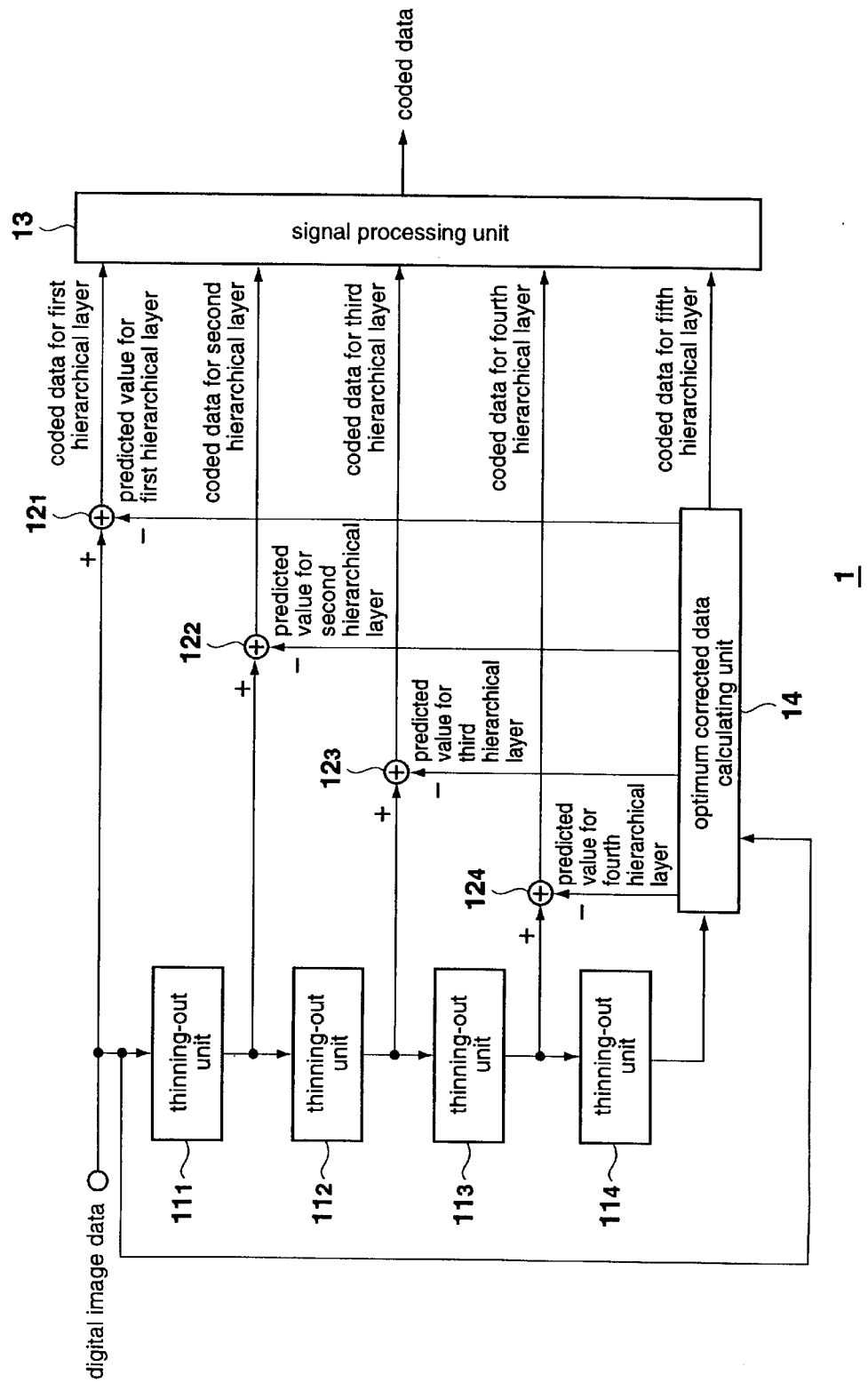
FIG. 30 is a block view showing the configuration of an alternate embodiment of the transmitting apparatus 1 of FIG. 1.

In accordance with another embodiment of an image transmitting apparatus, as shown in FIG. 30, only the image data for the first hierarchical layer (i.e., the original image data) is supplied to the optimum corrected data calculating unit 14. The optimum corrected data calculating unit 14 then predicts predicted values for the image data of the first to fourth hierarchical layers, as well as calculating the optimum corrected data for the image for the fifth hierarchical layer and supplies this data to the signal processing unit 13.

Figure 31:
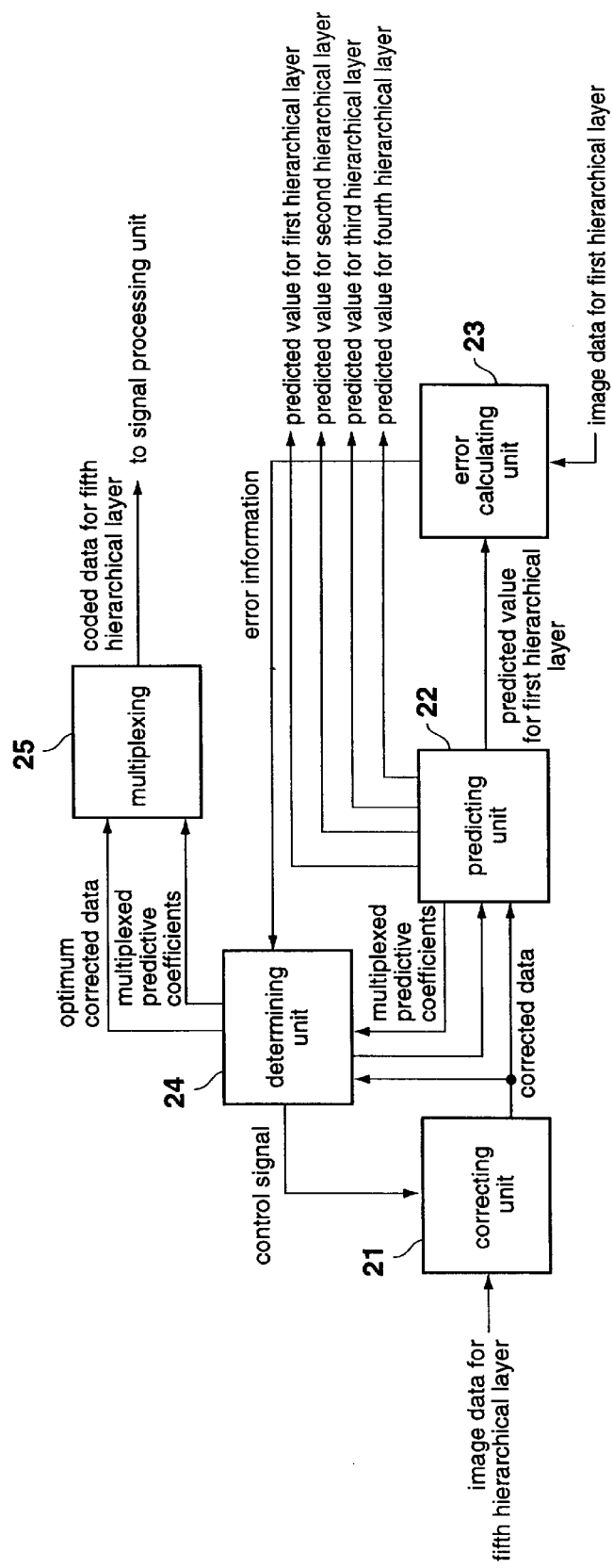
FIG. 31 is a block view showing an embodiment of the optimum corrected data calculating unit 14 of FIG. 30.

An embodiment of the optimum corrected data calculating unit 14 of the FIG. 30 transmitting apparatus is shown in FIG. 31. The FIG. 31 optimum corrected data calculating unit 14 is similar to the FIG. 5 optimum corrected data calculating unit 14, except that the predicting unit 22 determines the predicted values for the first through fourth hierarchical layers without the image data from the first through fourth hierarchical layers.

Figure 32:
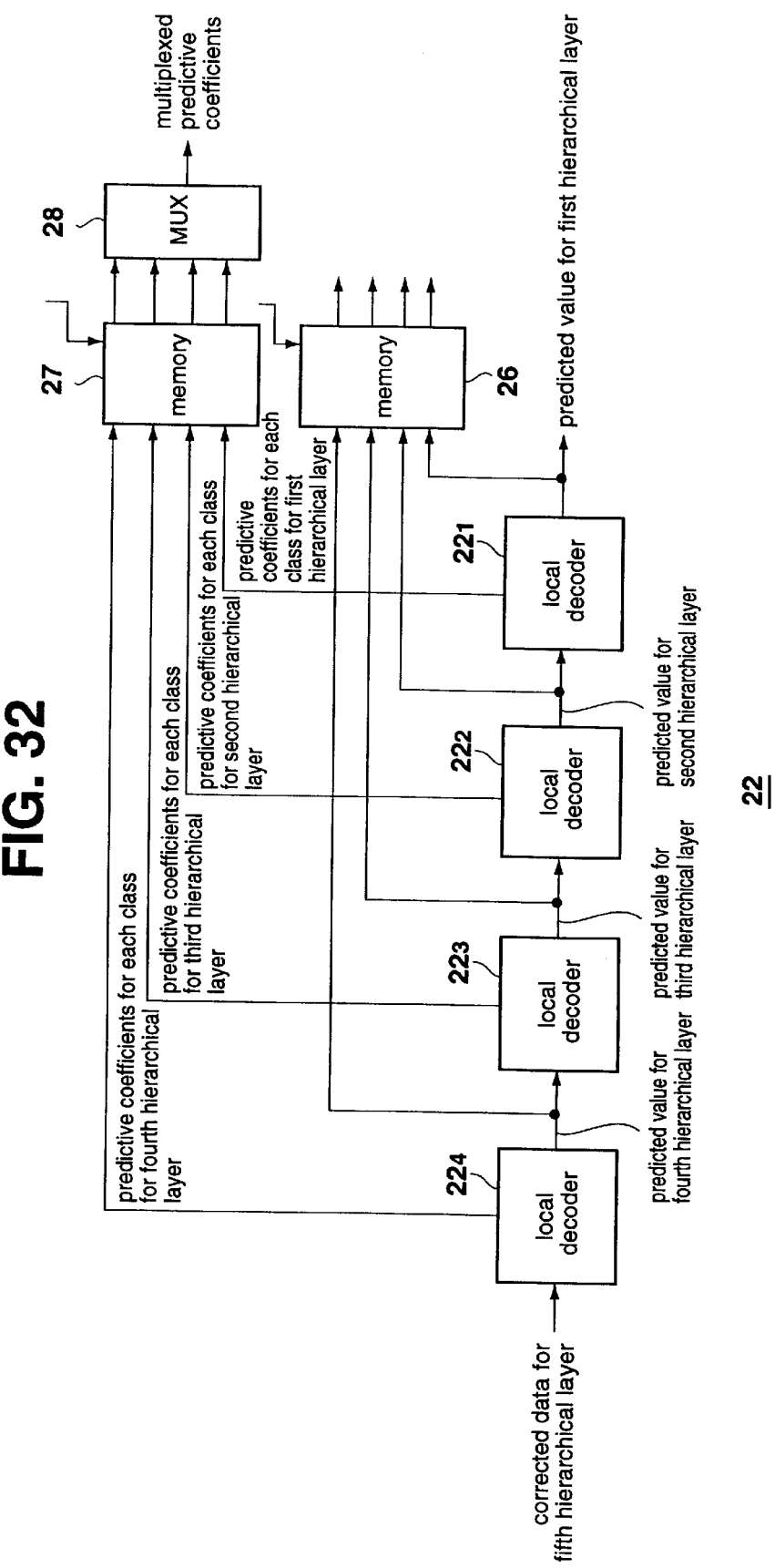
FIG. 32 is a block view showing an example embodiment of the predicting unit 22 of FIG. 31.

In particular, as shown in FIG. 32, each of local decoder $22_4$ through local decoder $22_1$ of the FIG. 31 predicting unit 22 generate the predicted values for the fourth through first hierarchical layer and each of the prediction coefficients or each class for the fourth through first hierarchical layer without the image data for the fourth through first hierarchical layers, respectively.

That is, in the first embodiment, each of prediction coefficients for each class for the first to fourth hierarchical layers is obtained at the local decoders $22_1$ to $22_4$ and are then used to calculate predicted values for the first to fourth hierarchical layers. However, as in the second embodiment, when prediction coefficients for each class cannot be obtained at the local decoders $22_1$ to $22_4$, the predicted values for the first to fourth hierarchical layers can be calculated respectively.

Figure 21:
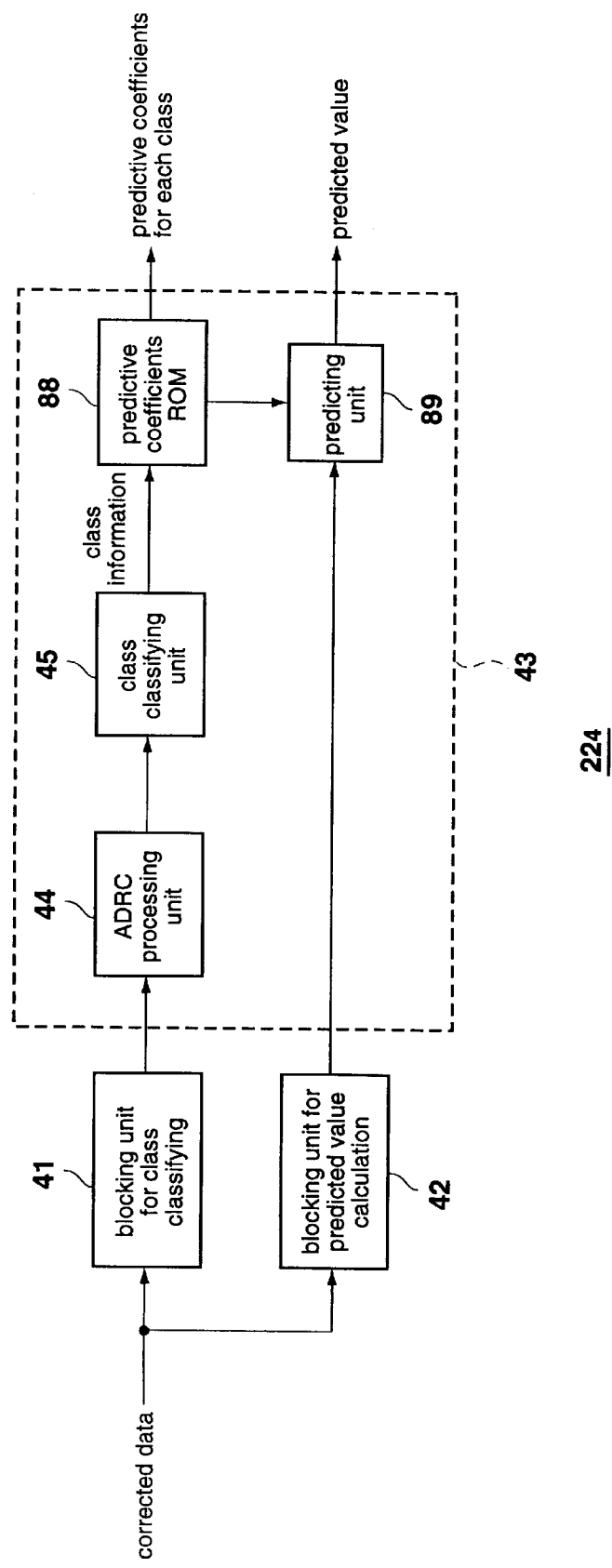
FIG. 21 is a block view showing a further example configuration of the local decoders $22_1$ to $22_4$ of FIG. 9.

FIG. 21 shows an embodiment of the local decoders $22_1$ to $22_4$ of FIG. 32. In FIG. 21, portions that correspond to portions in FIG. 10 are given the same numerals. This is to say that other than an prediction coefficient ROM 88 and a predicting unit 89 being provided in place of the adaptive processing unit 46, the configuration of the local decoders $22_1$ to $22_4$ is similar to the configuration illustrated in FIG. 10. The image data of fourth hierarchical layer is not provided not to calculate prediction coefficients.

A description is given taking the local decoder $22_4$ as an example, as with the description of FIG. 10.

The prediction coefficient ROM 88 stores prediction coefficients for each class that have already been obtained by learning (to be described later), receives class information outputted by the ADRC processing unit 44, reads (generates) prediction coefficients for each class stored in addresses corresponding to this class information, and supplies this data to the predicting unit 89.

At the predicting unit 89, the linear first-order equation shown in equation (1) (specifically, for example, equation (8) using blocks (5×5) for predicted value calculation from the blocking unit for 25×9 predicted value calculation 42 and prediction coefficients from the prediction coefficient ROM 88 so that 3×3 predicted stimation values for the original image data can be calculated.

Therefore, according to the class classifying adaptive processing unit 43 of FIG. 21, these predicted values can be calculated without using original image data for each of the hierarchical layers. 25×9 prediction coefficients for each class stored in the prediction coefficients ROM 88 are outputted to determining unit in the same way as the above embodiments.

Figure 33:
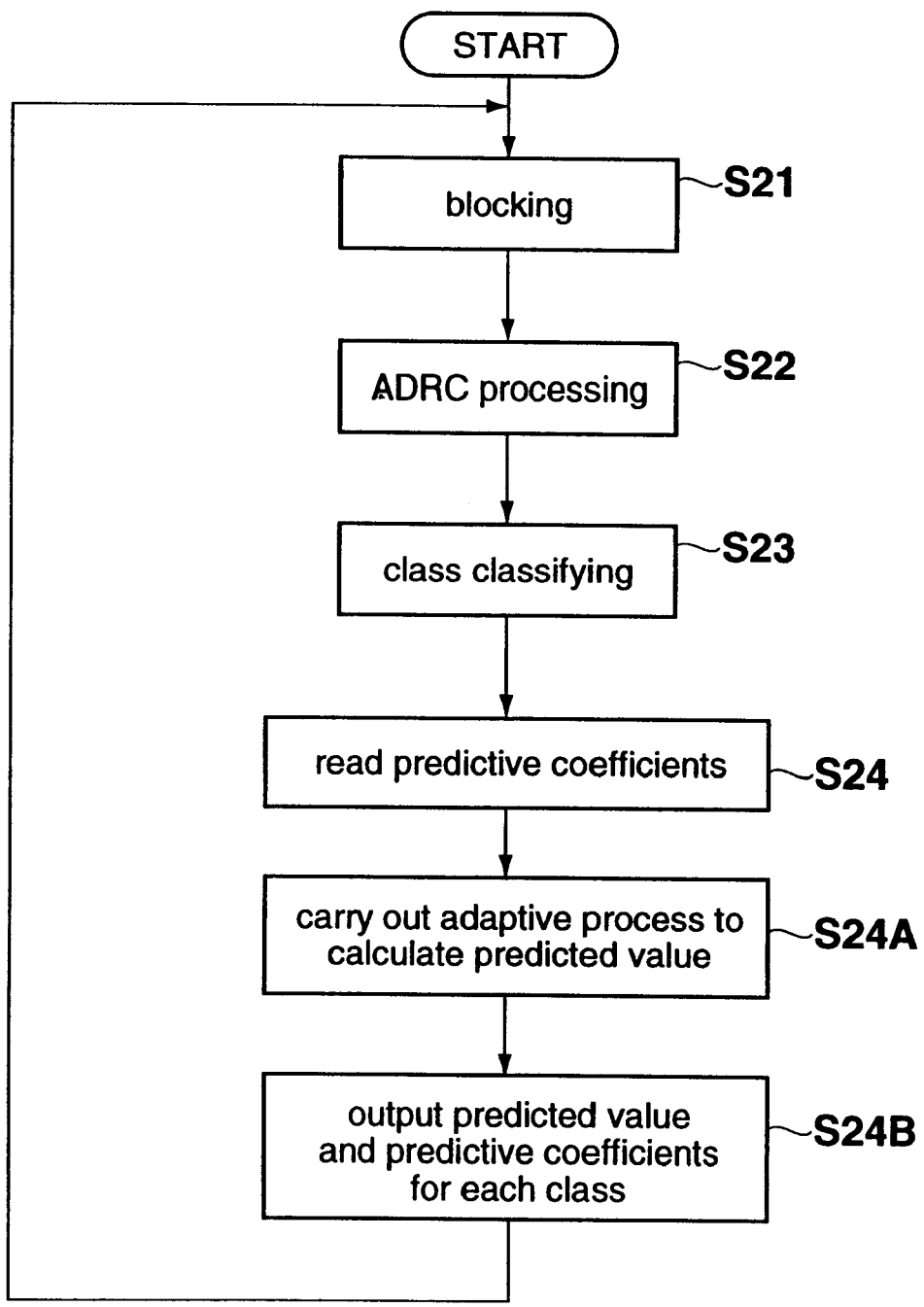
FIG. 33 is a flowchart illustrating the operation of the predicting unit 22 shown in FIG. 32.

FIG. 33 is a flowchart illustrating the operation of the FIG. 21 local decoder $22_4$. The flowchart is similar to the FIG. 14 flowchart (illustrating the operation of the FIG. 10 local decoder 22. Referring to FIG. 33, steps S21 through S23 are similar to those described with reference to the FIG. 14 flowchart. However, at step S24, the predictive coefficients are read from the predictive coefficient ROM 88. At step S24A, adaptive processing is carried out by the prediction unit 89, to calculate predicted values. Finally, at step S24B, predicted values are output and prediction coefficients for each class are output. Then, processing returns to step S21 and the procedure is repeated.

Figure 22:
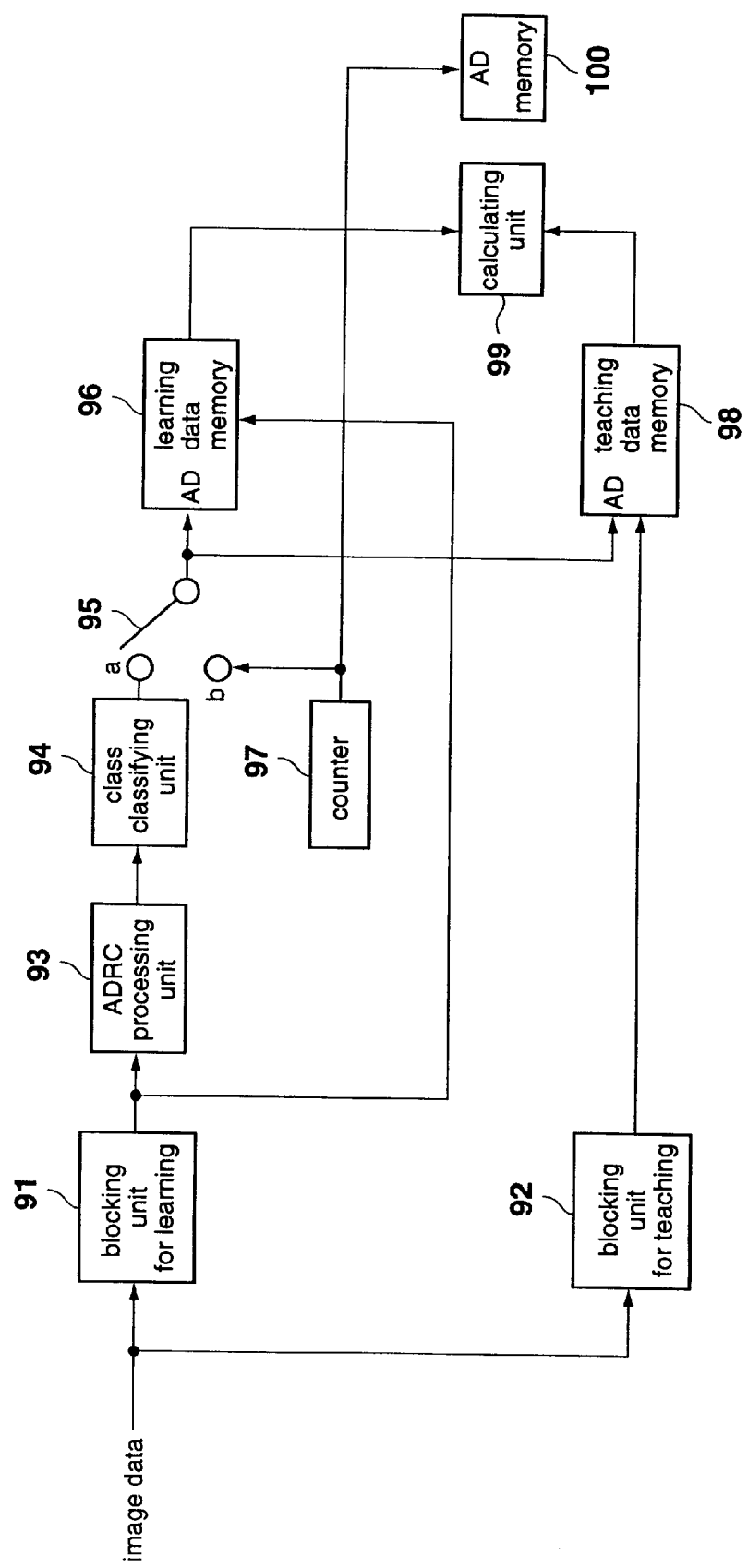
FIG. 22 is a block view showing a configuration for an embodiment of the image processing device for calculating prediction coefficients stored in the prediction coefficient ROM 81 of FIG. 21.

Next, FIG. 22 shows an embodiment of an image processing device for carrying out learning for obtaining prediction coefficients stored in the prediction coefficient ROM 88 of FIG. 21.

Image data (learning images) for learning use for obtaining prediction coefficients suitable for all images are supplied to a blocking unit for learning use 91 and a blocking unit for teaching use 92. When prediction coefficients are to be obtained for the fourth hierarchical layer, image data for the fourth hierarchical layer is supplied to the blocking unit for learning use 91 and the blocking unit for teaching use 92 as learning image data.

The blocking unit for learning use 91 extracts 25 pixels (5×5 pixels) of the positional relationship shown, for example, by the mark • in FIG. 11 from the inputted image data. The blocks having these 25 pixels are then supplied to an ADRC processor 93 and a learning data memory 96.

At the blocking unit for teaching use 92 a block having, for example, nine pixels arranged as 3×3 is generated from the inputted image data. The block having these 9 pixels is then supplied to a teaching data memory 98 as a block for teaching use.

When a block for learning use having 25 pixels of the positional relationship shown, for example, by the mark • in FIG. 11 is generated at the blocking unit for learning use 91, a 3×3 pixel block for learning use shown as being surrounded by the quadrilateral in FIG. 11 is generated at the blocking unit for teaching use 92.

The ADRC processor 93 extracts the center 9 pixels (3×3 pixels) from the 25 pixels comprising the block for learning, with one-bit ADRC processing then being performed on this nine pixel block in a manner similar to that described for the ADRC processing unit 44 of FIG. 21. The ADRC-processed 3×3 pixel block is then supplied to a class classifying unit 94. Blocks from the ADRC processor 93 are class-sorted at the class classifying unit 94, with the class information obtained being sent to the learning data memory 96 and the teaching data memory 98 via terminal a of switch 95.

Blocks for learning from the blocking unit for learning 91 and blocks for teaching from the blocking unit for teaching 92 are stored at addresses corresponding to the provided class information at the learning data memory 96 and the teaching data memory 98, respectively.

At the learning data memory 96, when, for example, the block comprising 5×5 pixels shown by the mark • in FIG. 11 is taken as the block for learning and stored at a certain address, the 3×3 pixel block shown to be surrounded by the quadrilateral in FIG. 11 is stored as the block for teaching at the same address as the address at the teaching data memory 98.

The same process is then repeated for all of the images for learning prepared beforehand. In this way, the block for learning and the block for teaching use having 9 pixels for which predicted values are obtained at the local decoder $22_4$ of FIG. 21, using blocks for predicted value calculating having 25 items of corrected data having positional relationships that are the same as the 25 pixels of the block for learning, stored at the same (i.e., corresponding) addresses of the learning data memory 96 and the teaching data memory 98.

A plurality of information can be stored at the same address in the learning data memory 96 and the teaching data memory 98. In this way, it is possible to store a plurality of blocks for learning and blocks for teaching at the same address.

When the blocks for learning and blocks for teaching for all of the images data for learning are stored in the learning data memory 96 and in the teaching data memory 98, the switch 95 selecting terminal a is switched over to terminal b. The output of a counter 97 is then supplied to the learning data memory 96 and the teaching data memory 98 as the address. The counter 97 counts in response to a clock and outputs a count value. The blocks for learning and the blocks for teaching use stored at the addresses corresponding to the count value are then read from the learning data memory 96 and from the teaching data memory 98 and are supplied to an arithmetic unit 99.

A set for the block for learning corresponding to the count value of the counter 97 and a set for the block for teaching are then supplied to the arithmetic unit 99.

The arithmetic unit 99 receives the set for the block for learning for a certain class and the set for the block for teaching and calculates an prediction coefficient that makes the error a minimum using the least square method.

For example, when the pixel values of the pixels of the blocks for learning use are taken to be x1, x2, x3, . . . and the prediction coefficients to be obtained are taken to be w1, w2, w3, . . . blocks for learning use are configured using linear first order combination. In order to obtain a pixel value y for a certain pixel, it is necessary for the prediction coefficients w1, w2, w3, . . . to fulfill the following equation.

$$y = w1 \times 1 + w2 \times 2 + w3 \times 3 +$$

At the arithmetic unit 99, prediction coefficients w1, w2, w3, . . . that make the square error for the predicted values w1×1+w2×2+w3×3+ . . . from blocks for learning of the same class and corresponding blocks for teaching a minimum with respect to the true value y by resolving the regular equation shown in equation (7). Therefore, 25×9 prediction coefficients for each class are calculated by carried out the above process for each class.

The prediction coefficients obtained at the arithmetic unit 99 each class are supplied to the memory 100. In addition to the prediction coefficients from the arithmetic unit 99, count values are also supplied to the memory 100 so that prediction coefficients from the arithmetic unit 99 can be stored at addresses corresponding to count values from the counter 97.

The most appropriate prediction coefficients for each class (here, this is the 25×9 prediction coefficients for the fourth hierarchical layer) for 3×3 predictive pixels blocks of this class are stored at addresses corresponding to each class at the memory 100.

The prediction coefficients for each class stored at the memory 100 are stored at the prediction coefficient ROM 88 of FIG. 21.

Figure 34:
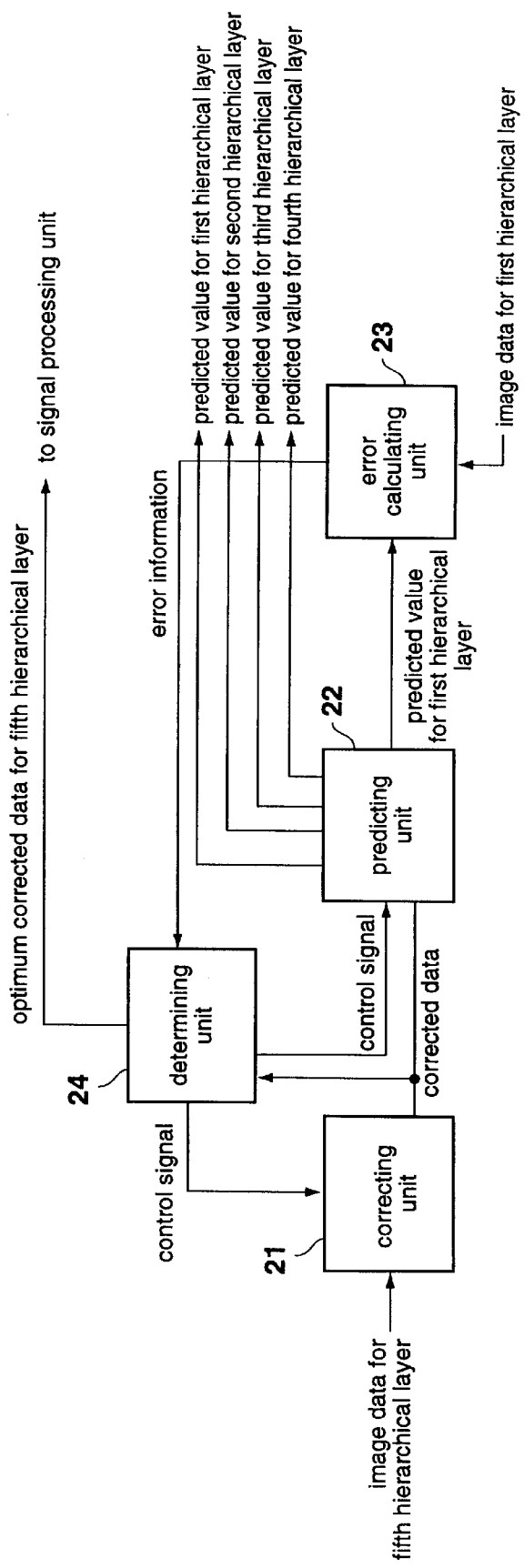
FIG. 34 is a block view showing an alternate embodiment of the optimum corrected data calculating unit 14 of FIG. 30.

Another embodiment of the optimum data calculating unit 14 of FIG. 30 is shown in FIG. 34. Unlike the FIG. 31 optimum correction data calculating unit 14, the FIG. 34 embodiment does not transmit the prediction coefficients to the signal processing unit.

Figure 35:
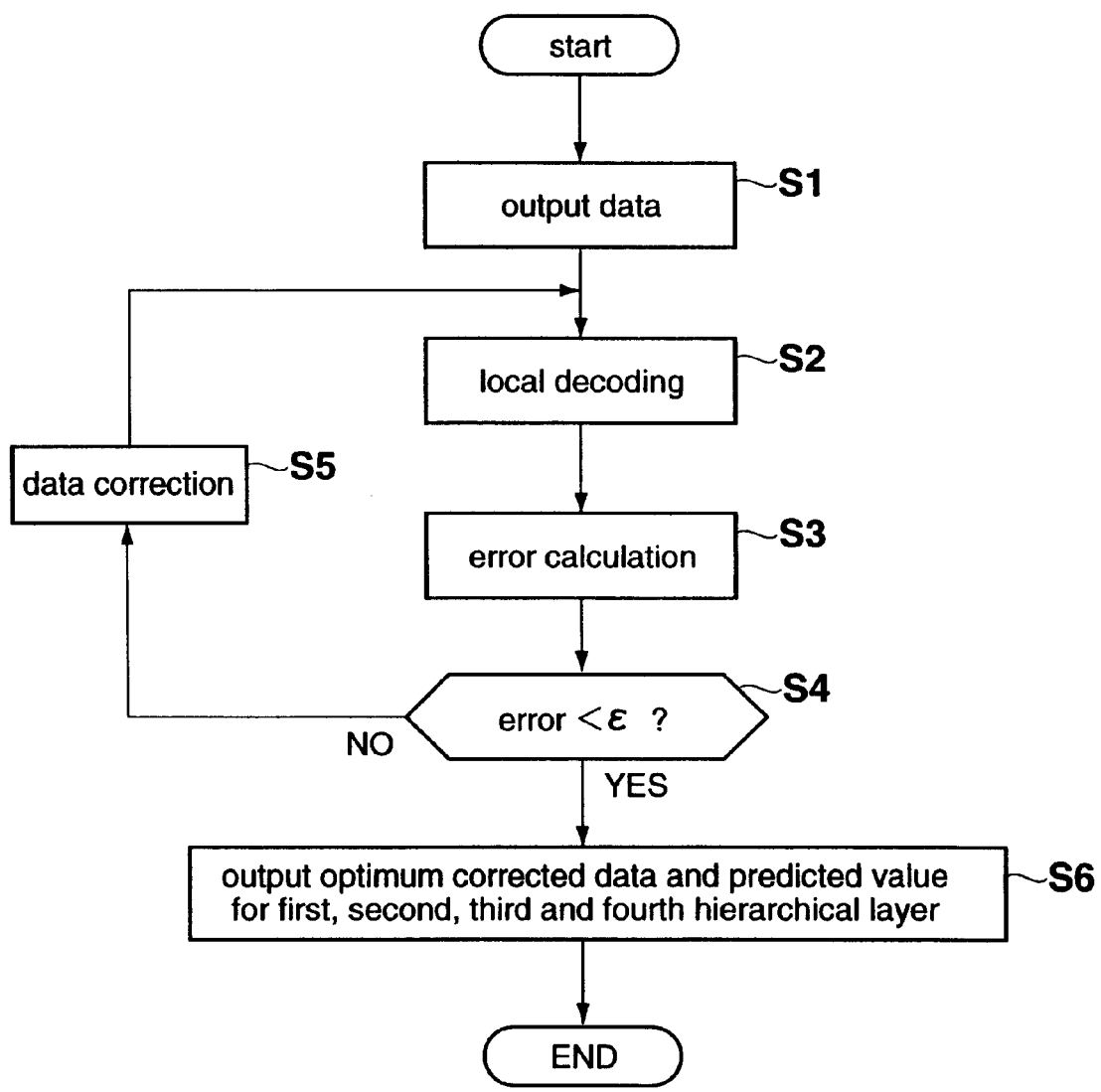
FIG. 35 is a flowchart illustrating the operation of the optimum corrected data calculating unit 14 of FIG. 34.

FIG. 35 illustrates the operation of the FIG. 34 embodiment of the optimum corrected data calculating unit 14. The flowchart of FIG. 35 is similar to the flowchart of FIG. 6, except that at step S6 of the FIG. 35 flowchart, the optimum corrected data and each of the predicted values for each class for the first through fourth hierarchical layers are output. The prediction coefficients are not output.

Figure 36:
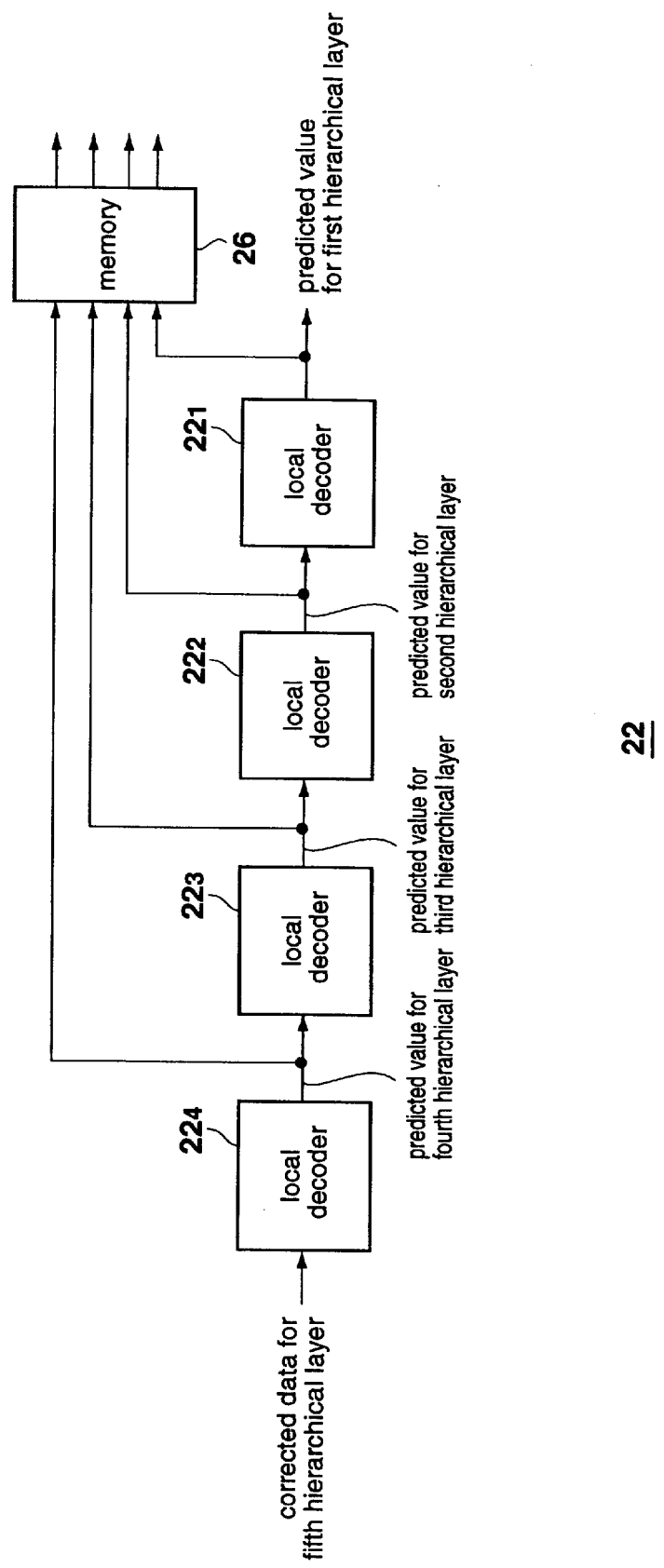
FIG. 36 is a block view showing an example configuration of the predicting unit 22 of FIG. 34.

FIG. 36 illustrates an embodiment of the predicting unit 22 of the FIG. 34 embodiment of the optimum corrected data calculating unit 14. The main difference between the FIG. 36 embodiment and the FIG. 32 embodiment is that the prediction coefficients for each class are not output from each local decoder $22_4$ through $22_1$, the memory 27 for storing the prediction coefficients for each class is not provided, and the multiplexing unit 28 is not provided for outputting the prediction coefficients for each class.

Figure 37:
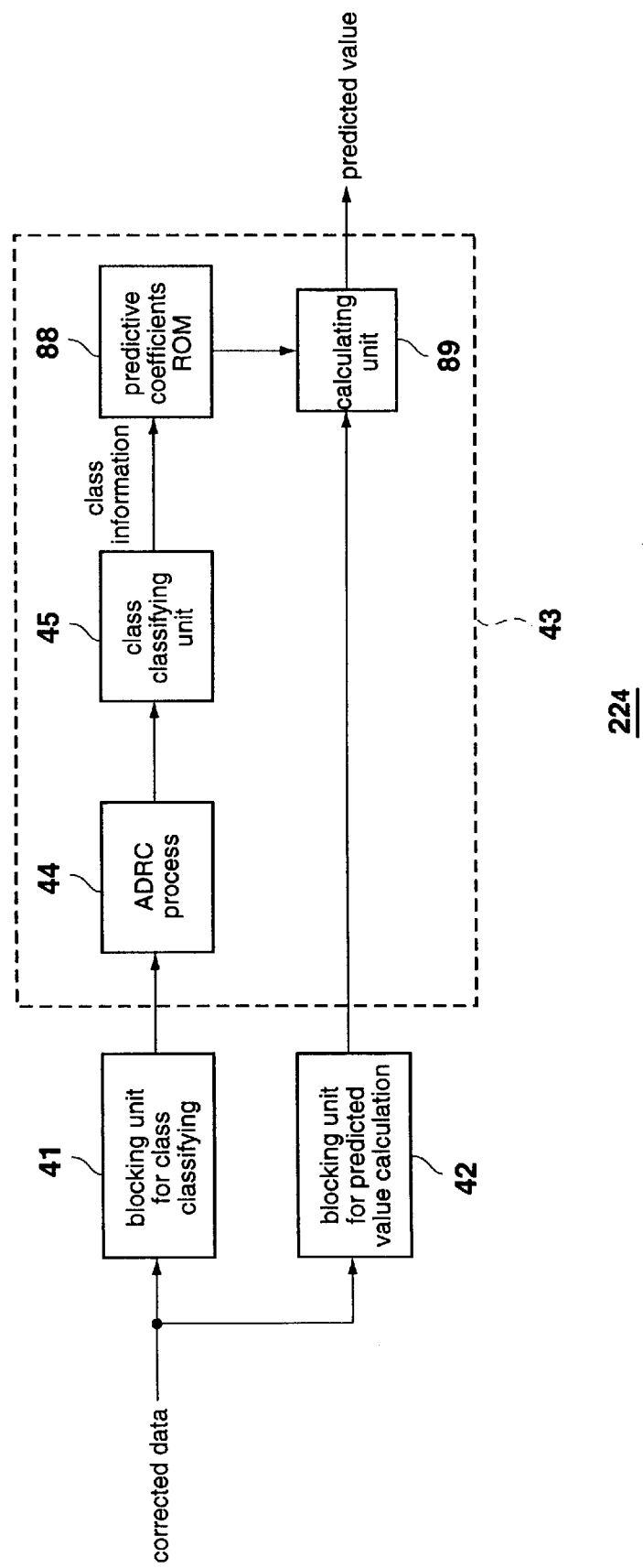
FIG. 37 is a block view showing a further example configuration of the local decoders 22to $22_4$ of FIG. 36.

FIG. 37 illustrates the local decoder $22_4$ (as a representative one of the local decoders $22_4$ through $22_1$) of the FIG. 36 predicting unit 22. The FIG. 37 local decoder $22_4$ is similar to the FIG. 21 local decoder $22_4$, except that the prediction coefficients, are not provided from the ROM 88 to outside the local decoder $22_4$ of FIG. 37.

Figure 38:
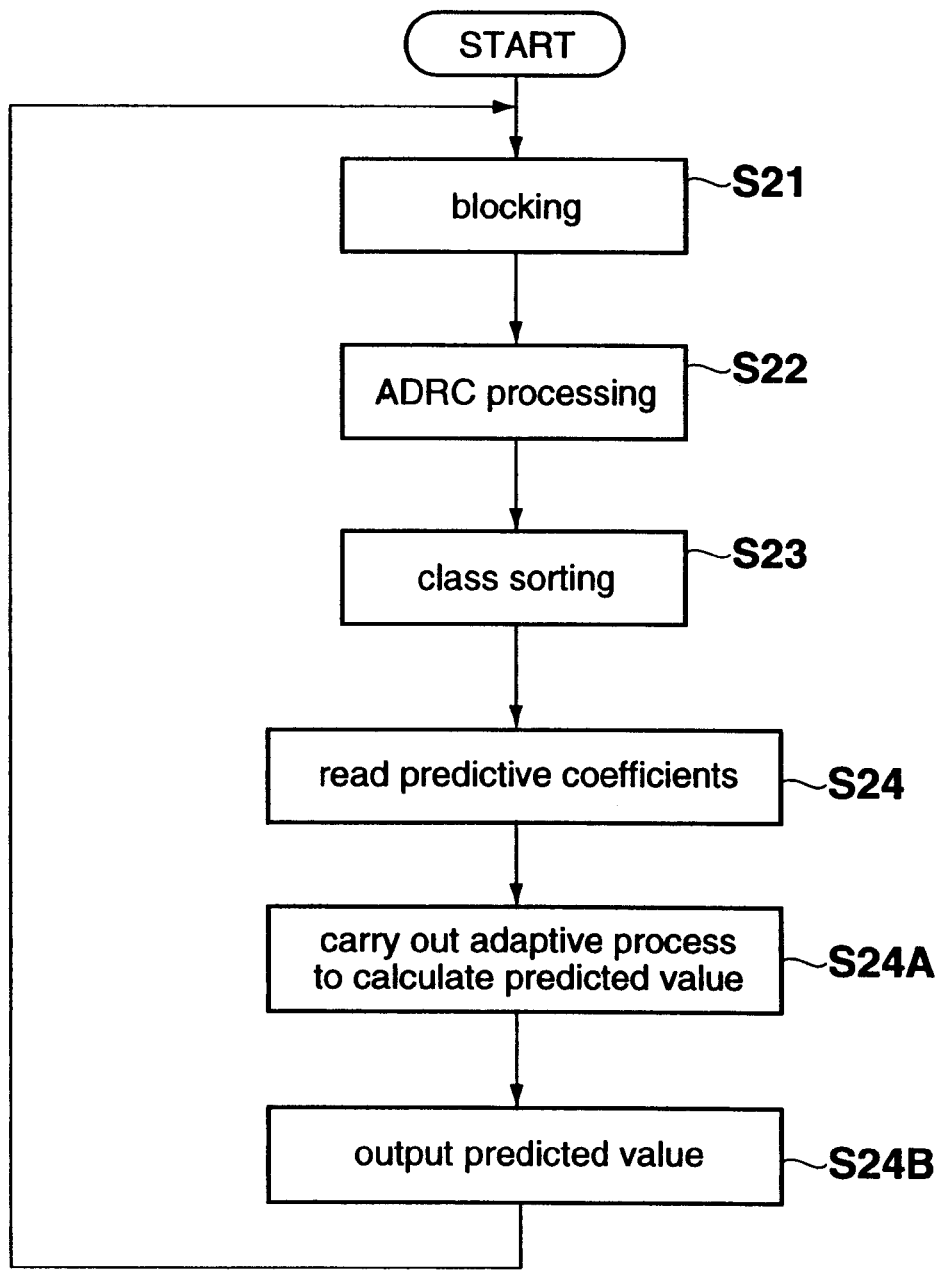
FIG. 38 is a flowchart that illustrates the operation of the local decoders $22_1$ to $22_4$ of FIG. 37.

FIG. 38 s a flow chart that illustrates the operation of the FIG. 37 local decoder $22_4$. Similar to the flowchart of FIG. 14, blocking takes place at step S21; ADRC processing takes place at step S22, and class classifying takes place at step S23. At step S24, predictive coefficients are read by the calculating unit 89 from the predictive coefficient ROM 88 in response to the class information. At step S24A, adaptive processing is carried out within the calculating unit 89 to calculate predicted values. At step S24B, the predicted values are output from the calculating unit 89.

It is possible to store the mean values of the pixel values of the teaching blocks at addresses corresponding to each class at the prediction coefficient ROM 88 rather than storing the actual prediction coefficients. In this case, when the class information is considered, pixel values corresponding to this class are output. The local decoder $22_4$ of FIG. 21 in such a situation would therefore be complete without providing the blocking unit for predicted value calculation 42 and the predicting unit 89.

Figure 23:
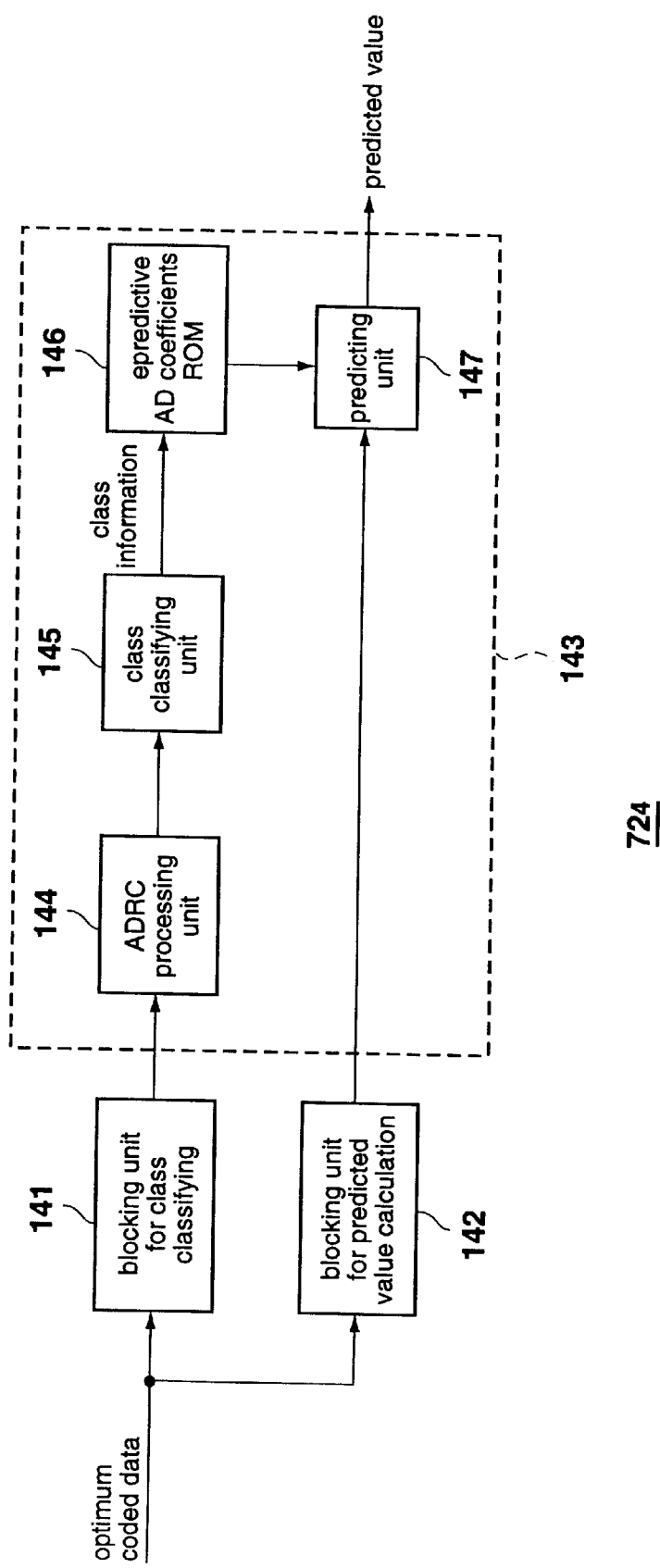
FIG. 23 is a block view showing a further example configuration for the predicting units $72_1$ to $72_4$ of FIG. 19.

With the receiving apparatus 4 of FIG. 18, a configuration is adopted where coded data (estimation remainders) for the first to fourth hierarchical layers are not supplied from the signal processing unit 71 of the predicting units $72_1$ to $72_4$ and the configuration shown, for example, in FIG. 23 is necessary for the predicting units $72_1$ to $72_4$. In this case, the predicting unit $72_4$ (similar to the predicting units $72_1$ to $72_3$) includes a blocking unit for class classifying 141, blocking unit for predicted value calculation 142, ADRC processing unit 144, class classifying unit 145, prediction coefficient ROM 146 and predicting unit 147 corresponding to the blocking unit for class classifying 41, blocking unit for predicted value calculation 42, ADRC processing unit 44, class classifying unit 45, prediction coefficient ROM 88 and predicting unit 89 of the local decoder 224 shown in FIG. 21. Predicted values for each of the hierarchical layers can then be obtained at the predicting units 721 to 724 in the same way as the case for FIG. 21.

In the following, the method for obtaining estimation values for sequentially obtaining prediction coefficients described in FIG. 10 is referred to as the sequential method and the method for obtaining estimation values using prediction coefficients pre-stored in the prediction coefficient ROM 88 as described in FIG. 21 and FIG. 37 is referred to as the ROM method.

Figure 39:
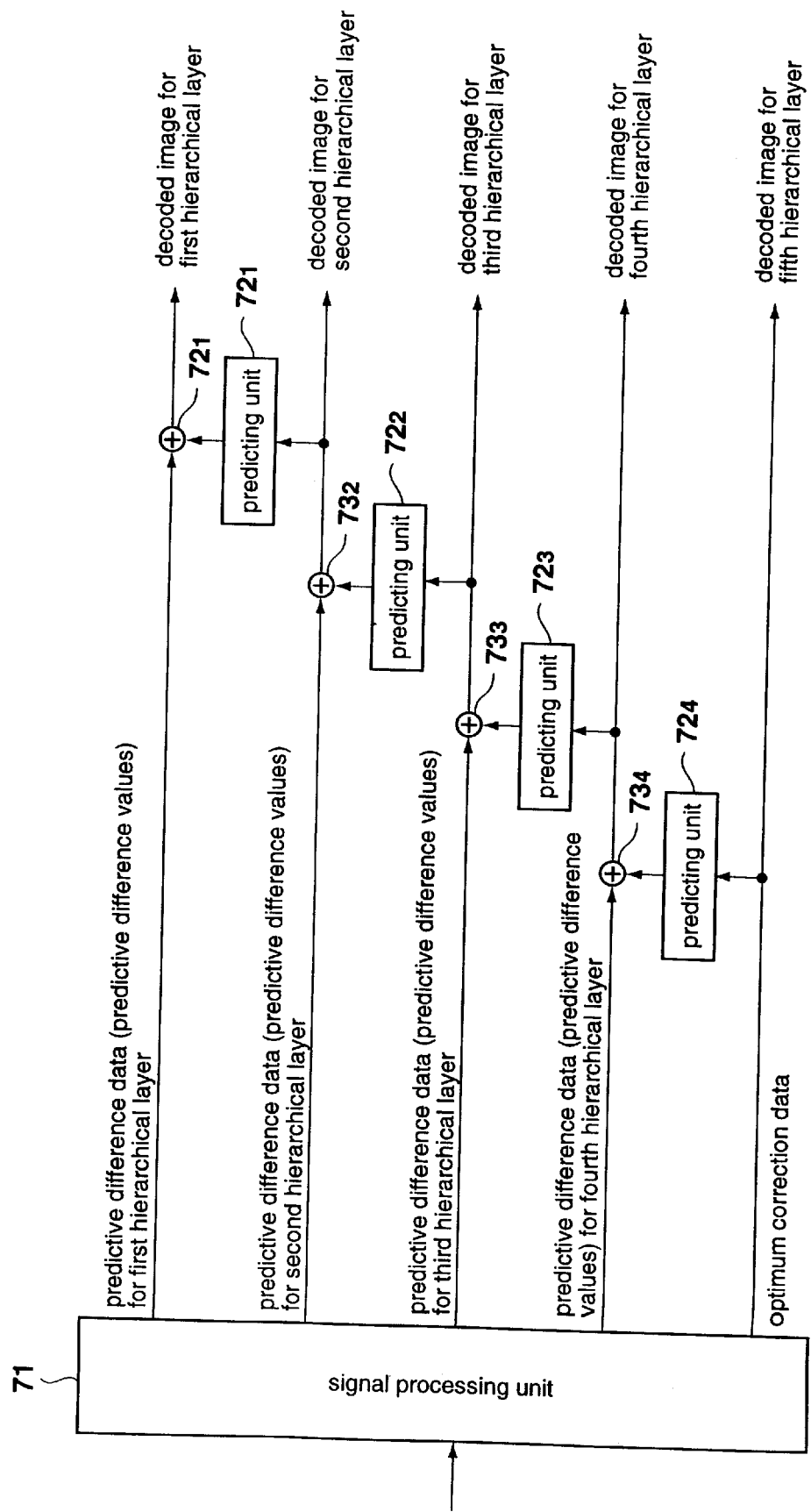
FIG. 39 is a block view showing the configuration of an alternate embodiment of the receiving apparatus 4 of FIG. 1.

FIG. 39 is a block diagram illustrating an alternate embodiment of a receiving apparatus for receiving coded data encoded by the transmitting apparatus of FIG. 30. The FIG. 39 receiving apparatus is similar to the FIG. 19 receiving apparatus, except that it reconstructs the decoded images of the first through fourth hierarchical layers without each of predictive coefficients for each class for the first through fourth hierarchical layers, since each of predictive coefficients for each classss for the first through fourth hierarchical layers are not included in the encoded data provided to the signal processing unit 71.

FIG. 40 is a block diagram illustrating the predicting unit $72_4$ of the FIG. 39 receiving apparatus. A detailed explanation of FIG. 40 is omitted because the predicting unit $72_4$ illustrated therein is complementary to the predicting unit $22_4$ shown in FIG. 37 (of the FIG. 36 predicting unit).

Figure 24:
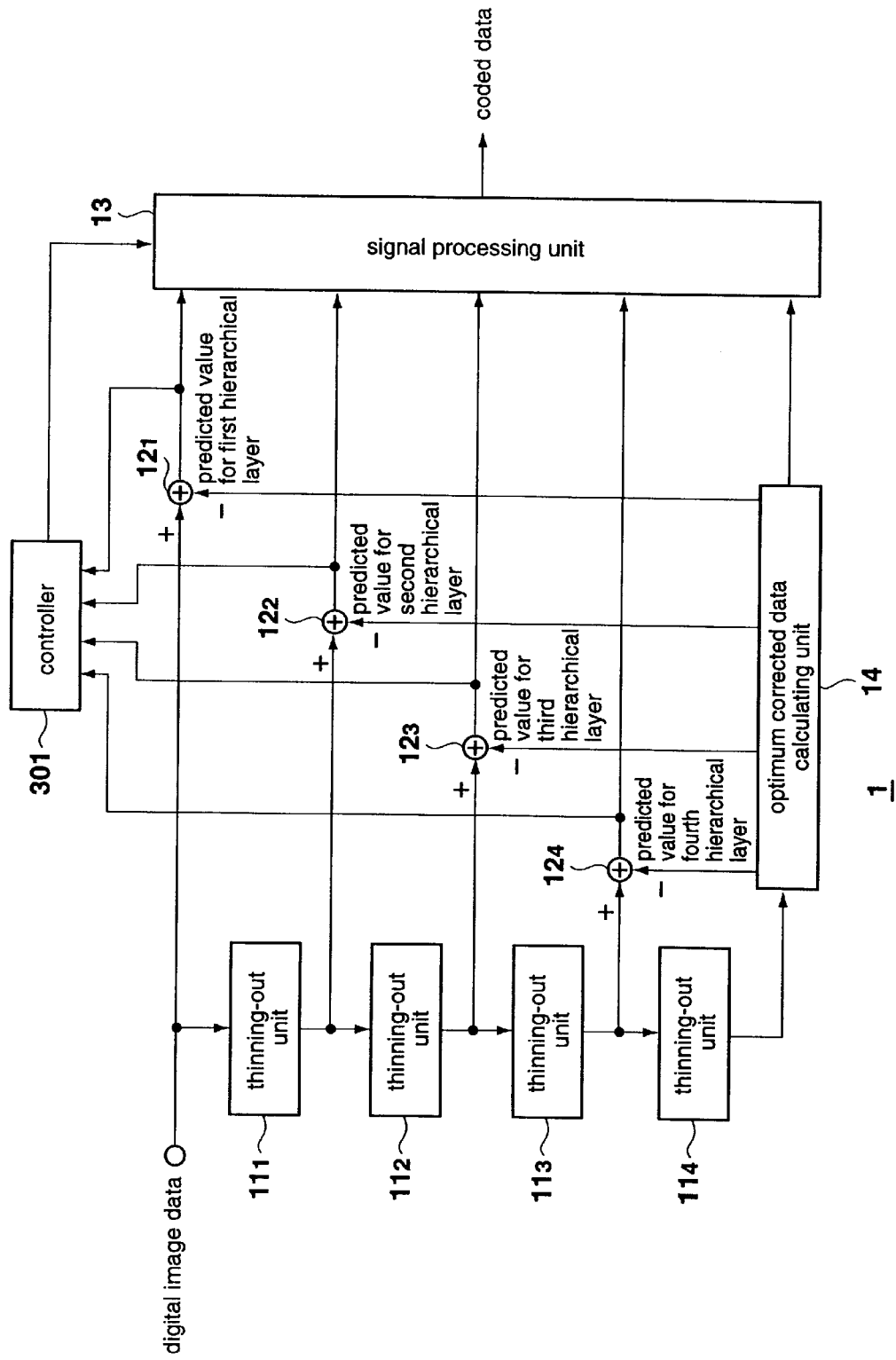
FIG. 24 is a block view showing the configuration of a third embodiment of the transmitting apparatus 1 of FIG. 1.

FIG. 24 shows an example of a further embodiment of the transmitting apparatus 1 of FIG. 1. In FIG. 24, portions corresponding to portions in FIG. 22 are given the same numerals. Namely, the configuration of the transmitting apparatus 1 is similar to the transmitting apparatus 1 of FIG. 22, except that a control unit 301 is provided. In the embodiment in FIG. 24, a predicted value can be obtained using the ROM method. It is also possible in this embodiment, however, for the predicted value to be obtained using the sequential method. In the case of the sequential method, the image data of second to fourth hierarchical layer are also provided optimal corrected data, calculating unit.

Difference values (coded data) for the first to fourth hierarchical layers calculated at the arithmetic units 121 to 124 are supplied to the control unit 301. The control unit 301 then compares the predictive differenc values for the first to fourth hierarchical layers with a prescribed threshold value $\epsilon'$, with the signal processing unit 13 then being controlled in such a manner that only predictive difference values greater than or equal to this threshold value $\epsilon'$ are included in the final coded data.

Predictive difference values for the first to fourth hierarchical layers (coded data for the first to fourth hierarchical layers) are calculated at the arithmetic units $12_1$ to $12_4$ of the transmitting apparatus 1 of the above configuration in the same way as described with reference to FIG. 2 and are supplied to the signal processing unit 13 and the control unit 301. When the predictive difference values for the first to fourth hierarchical layers are received, the control unit 301 compares the predictive difference values for the first to fourth hierarchical layers with a prescribed threshold value $\epsilon'$ in the way shown in the flowchart in FIG. 25 so as to determine the magnitude of the errors.

Figure 25:
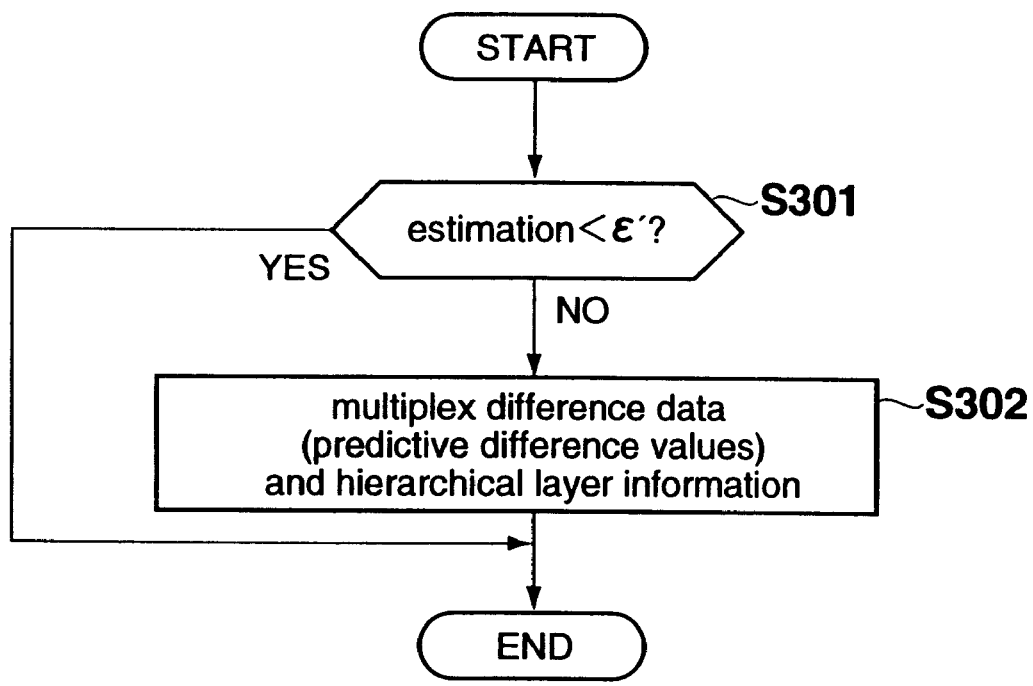
FIG. 25 is a flowchart illustrating the process for the control unit 301 of FIG. 24.

When it is determined in step S301 that the predictive difference value for a certain hierarchical layer is greater than or equal to a prescribed threshold value $\epsilon'$, processing proceeds to step S302. The control unit 301 then controls the signal processing unit 13 so that the hierarchical layer information exhibited by this hierarchical layer and the predictive difference value are included in the finally coded data, and the process is complete. When it is determined in step S301 that the predictive difference value for a certain hierarchical layer is smaller than the prescribed threshold value $\vartheta$, step S302 is skipped and the process is complete. At the control unit 301, the process described with reference to the flowchart of FIG. 25 is carried out for each hierarchical layer.

The coded data finally output from the signal processing unit 13 then includes predictive difference values of the predictive difference values for the first to fourth hierarchical layers that exceed the prescribed threshold value $\vartheta$.

Even if decoding uses predictive difference values smaller than the prescribed threshold value $\vartheta$, this will not have much effect with regard to the picture quality of the decoded image when compared with the case of decoding not using the predictive difference values. It is therefore possible in this case to reduce the amount of data for the coded data without causing much deterioration in the picture quality of the decoded image.

Figure 26:
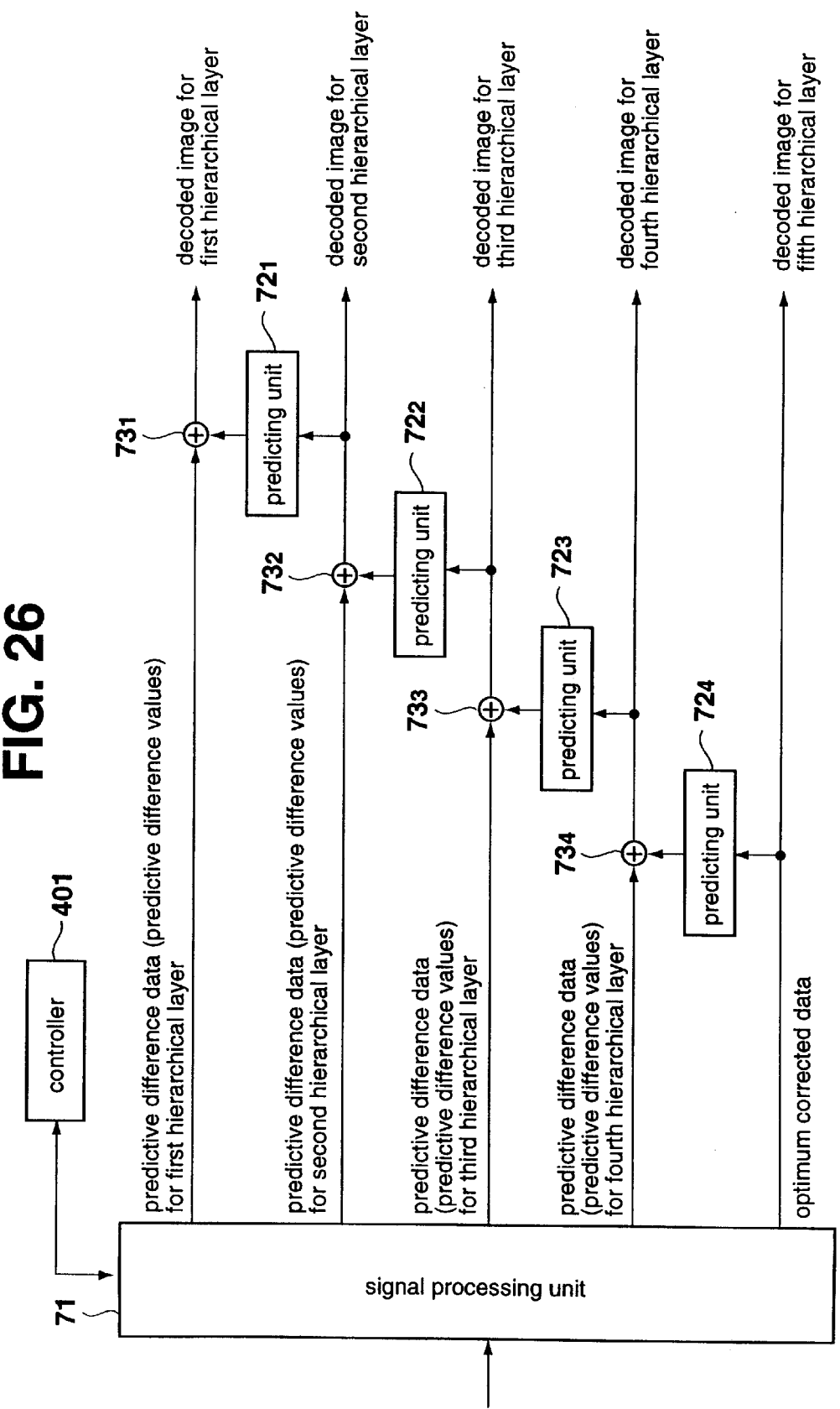
FIG. 26 is a block view showing the configuration of a second embodiment of the receiving apparatus 4 of FIG. 1.

FIG. 26 shows an embodiment of the receiving apparatus 4 for decoding coded data obtained at the transmitting apparatus 1 of FIG. 24. In FIG. 26, portions corresponding to FIG. 19 are given the same numerals, i.e. the configuration of the receiving apparatus 4 is similar to that shown in FIG. 19, except that a control unit 401 is provided. Further, predictive difference values are obtained at the receiving apparatus 4 using the ROM method (but the sequential method can also be used. In the case of sequential method, each of prediction coefficients for each class for first to fourth hierarchical layer are transmitted).

The control unit 401 supplies predictive difference values included in the coded data to the corresponding arithmetic units (any one of arithmetic units 731 to 734) by using the control of the signal processing unit 71.

Figure 27:
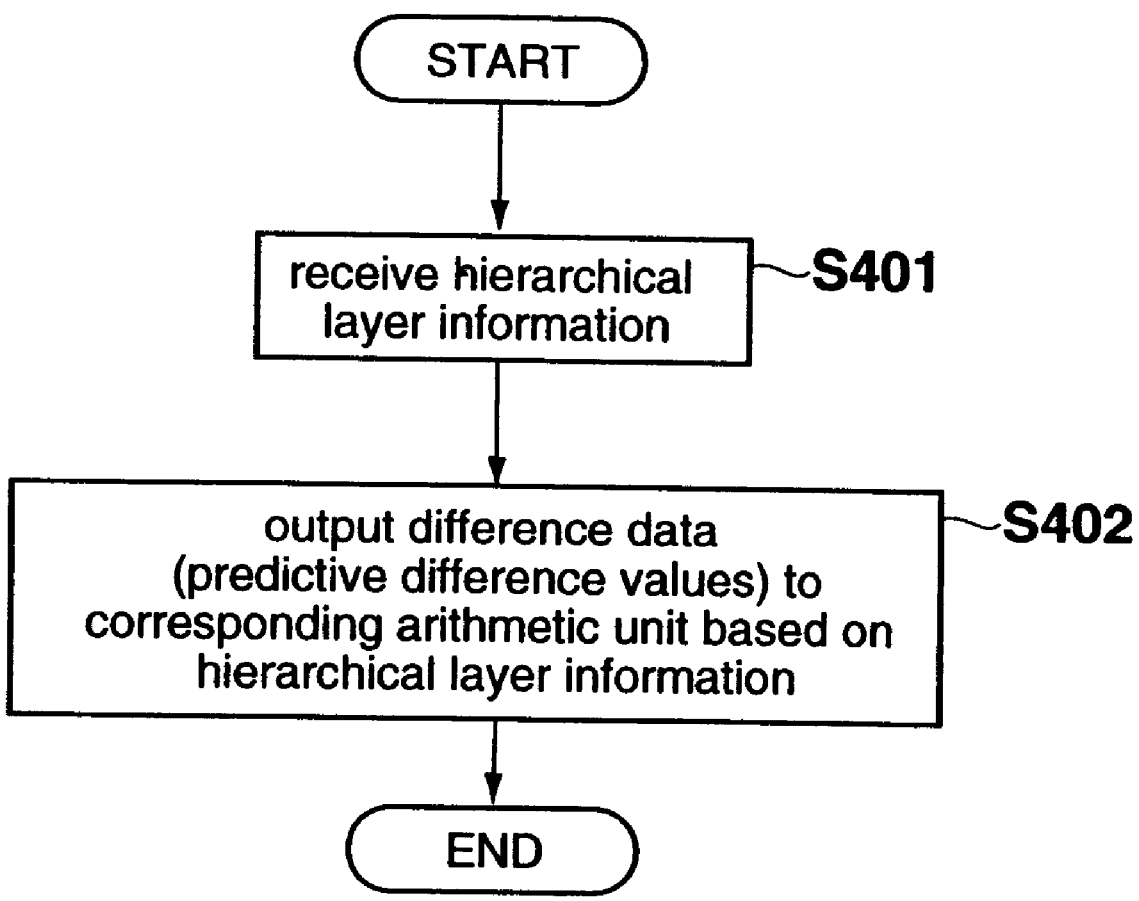
FIG. 27 is a flowchart illustrating the process for the control unit 401 of FIG. 26.
Figure 28:
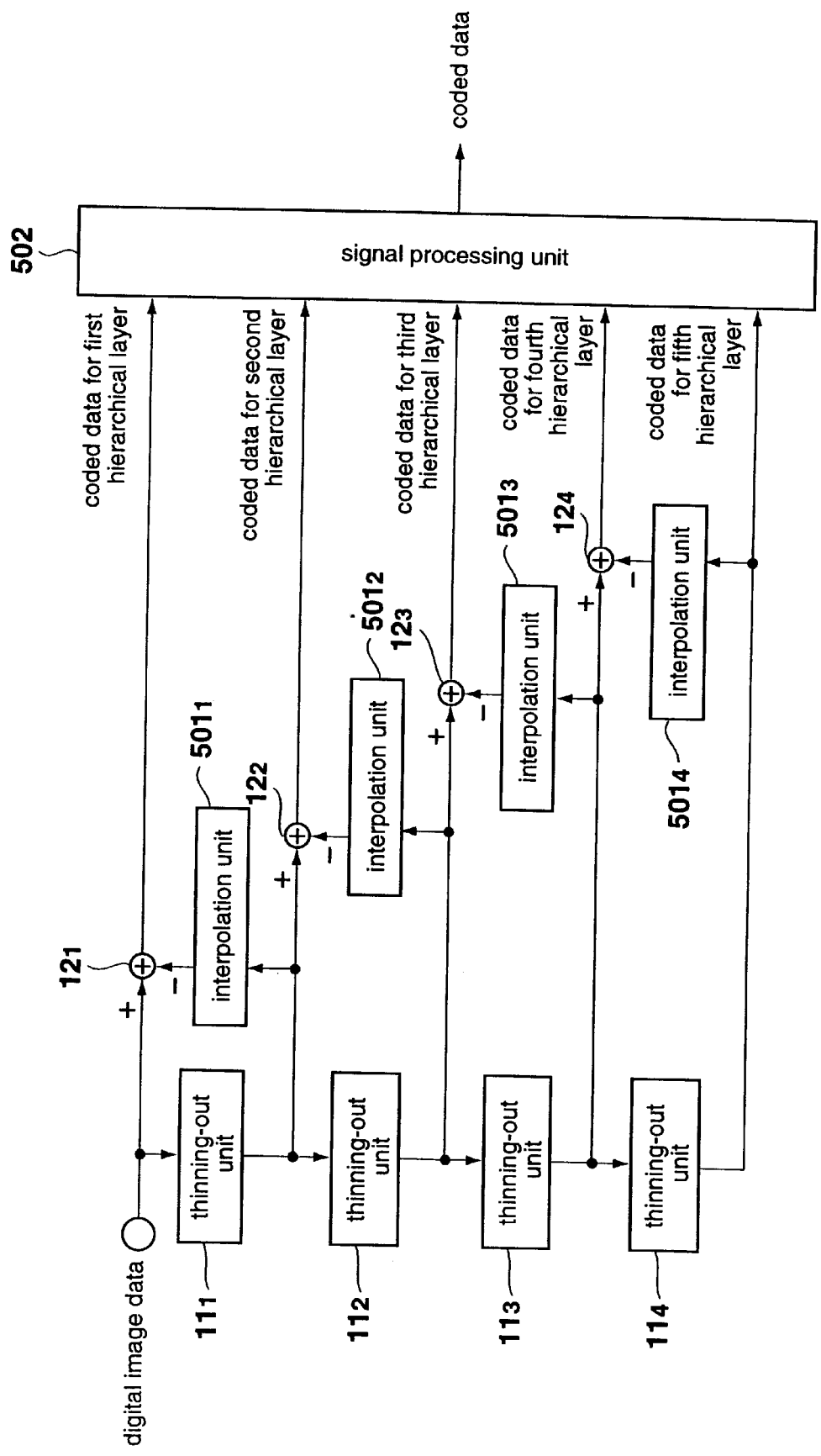
FIG. 28 is a block view showing an example configuration of the image coding device for carrying out related hierarchical coding.

In this case, the signal processing unit 71 extracts hierarchical information included in the coded data together with the predictive difference values and supplies this data to the control unit 401. As shown in FIG. 27, in step S401, the control unit 401 receives the hierarchical information from the signal processing unit 71. In step S402, the signal processing unit 71 is controlled so that the predictive difference values are output to the corresponding arithmetic units (any one of arithmetic units $73_1$ to $73_4$) based on this hierarchical information, and the process is complete.

In this case, when the predictive difference value is supplied to the arithmetic units $73_1$ to $73_4$, these predictive difference values and the predictive difference values are added and the results are output as the decoded image. When the predictive difference values are not supplied, the predictive difference values are output without modification as the decoded image, i.e. the predictive difference values and the predictive difference values for hierarchical layers of an estimation remainder of greater than or equal to the threshold value $\vartheta$ are added and a decoded image having so-called corrected predictive difference values is generated. On the other hand, the small predictive difference values of hierarchical layers having predictive difference value smaller than the threshold value $\vartheta$ are ignored and the predictive difference values are output as the decoded image.

The above description has been in the context of an image processing system. However, in addition to the case of coding for example, a standard format television signal such as an NTSC format signal etc., this kind of image processing system would be particularly effective for coding, for example, a television signal etc. for a so-called high-vision method where there is a large amount of data. In those embodiments, although each process is carried out for one frame, each process may be carried out for one field, for two frames or more than one frame.

In the described embodiments, block coding is carried out taking an image for one frame as the object but it is also possible to have a configuration where blocks are gathered together from, for example, pixels in the same position in a plurality of frames occurring in succession in a time series.

Further, in the described embodiments, the square sum of the error is used as the error information but, for example, the absolute value sums of the errors or powers of three or more of the errors can also be used. Which is used as error information can be decided based on, for example, convergence.

Moreover, in the described embodiments, image data for the second to fifth hierarchical layers is generated by simply thinning-out image data for the first to fourth hierarchical layers by ⅓ in the horizontal direction and ⅓ in the vertical direction at the thinning-out units 111 to 114, i.e. pixels are extracted centered about a 3×3 (horizontal×vertical) block. However, the image data for the second to fifth hierarchical layers can also be generated by, for example, calculating an average value for the 3×3 pixel block and taking this average value as the pixel value for the pixel at the center of the 3×3 pixels.

Still further, in the described embodiments, corrected data is obtained by directly correcting image data for the fifth hierarchical layer at the correcting unit 21 but the corrected data can also be generated, for example, in the following way. That is, image data for, for example, the fourth hierarchical layer may be divided into blocks of, for example, N pixels, and the N pixels are multiplied by a prescribed coefficient so as to give a sum. This value is then taken as a representative value for the block and an image comprising this representative value is taken as the image for the fifth hierarchical layer. In this case, the correction at the correcting unit 21 can be carried out by, for example, causing prescribed coefficients to change.

In the described embodiments, the image is coded to the fifth hierarchical layer but the number of hierarchical layers is by no means limited to five.

Further, the estimation error for the predicted value for the image for the first hierarchical layer is used as error information at the transmitting apparatus 1 but, for example, predictive difference values for the predicted values for images for each of the hierarchical layers can also be obtained with the total value then being used as the error information.

Moreover, in the described embodiments, the corrected data for the image for the fifth hierarchical layer is obtained by making the predictive difference value for the predicted value for the image for the first hierarchical layer less than the threshold value $\epsilon$. However, it is also possible to obtain corrected data for the image for a lower order hierarchical layer by making the predictive difference value for the predicted value for the image for the upper order hierarchical layer less than a prescribed value between neighboring upper order and lower order hierarchical layers.

What is claimed is:

1. An apparatus for performing a hierarchical coding of an image data to generate coded image data, comprising means for forming an image data of a second hierarchy having a number of pixels which is smaller than that of an image data of a first hierarchy;

means for correcting the image data of the second hierarchy and generating a corrected data;

means for predicting the image data of the first hierarchy in accordance with the corrected data and generating a predicted data of the first hierarchy having a plurality of predicted pixels;

means for calculating predictive error of the predicted data of the first hierarchy with respect to the image data of the first hierarchy;

means for determining suitability of the corrected data in accordance with the predicted error;

means for generating a difference data between the image data of the first hierarchy and the predicted data of the first hierarchy, in accordance with the determined suitability, the difference data having a plurality of difference values; and means for outputting the corrected data and the difference data as the coded image data.

2. An apparatus according to claim 1, wherein said predicting means comprises:

means for generating class information for the corrected data; and means for generating the predicted pixels in accordance with the class information.

3. An apparatus according to claim 1, wherein said predicting means comprises:

means for reading the predictive coefficients based upon the corrected data; and means for generating the predicted data of the first hierarchy based upon the corrected data and the predictive coefficients.

4. An apparatus according to claim 1, wherein said predicting means comprised:

means for generating class information using a plurality of pixels of the corrected data.

means for generating predictive cooefficients for each class using the image data of the first hierarchy and the corrected data; and means of generating the predicted pixels of the first hierarchy using the predictive coefficients corresponding to the class information and the corrected data.

5. An apparatus according to the claim 4, further comprising:

means for outputting the corrected data and the difference data as the coded image data, wherein said means for outputting outputs the image data of the second hierarchy with the predictive coefficients for each class.

6. An apparatus according to claim 1, wherein said predicting means comprises:

a memory for storing predictive coefficients for each class;

means for generating class information using a plurality of pixels of the corrected data; and means for reading the predictive coefficients corresponding to the class information from the memory and generating the predicted pixels of the first hierarchy using the read predictive coefficients and the corrected data.

7. An apparatus according to claim 6, wherein said predictive coefficients for each class stored in said memory are generated using an image data for learning.

8. An apparatus according to claim 7, further comprising:

means for outputting the corrected data and the difference data as the coded image data, wherein said means for outputting outputs the image data of the second hierarchy with the predictive coefficients for each class.

9. An apparatus according to claim 1, wherein said correcting means comprises a memory storing corrective values to correct the image data of the second hierarchy; and said correcting means corrects the image data of the second hierarchy using the correction values.

10. An apparatus according to claim 1, further comprising:

means for outputting the corrected data and the difference data as the coded image data, wherein said determining means determines suitability of the corrected data by detecting whether the predictive error is less than a prescribed threshold value; and said means for outputting outputs the corrected data as the coded data in response to the predictive error being less than the prescribed threshold value.

11. An apparatus according to claim 1, wherein said determining means determines suitability of the corrected data by determining whether the predictive error is less than a prescribed threshold value; and said difference data generating means generates the difference data when it is detected that the predictive error is less than the prescribed threshold value.

12. An apparatus according to claim 1, further comprising:

means for outputting the corrected data and the difference data as the coded image data, wherein said means for outputting output the corrected data and the difference data as the corrected data when the predictive error is less than the prescribed threshold value.

13. An apparatus for decoding data represented by a hierarchical coding of an image, comprising:

means for receiving the coded data including an optimum corrected data as an image data of a second hierarchy and also including a difference data as coded image data of a first hierarchy, image data of the second hierarchy having a number of pixels which is smaller than that of an image data of a first hierarchy;

means for predicting the image data of the first hierarchy from the optimum corrected data and generating a predicted data of the first hierarchy; and means for decoding the image data of the first hierarchy by adding the predicted data of the first hierarchy to the difference data, said coded data generated by the steps of:

forming the image data of the second hierarchy having the number of pixels smaller that the number of pixels of the image data of the first hierarchy;

correcting the image data of the second hierarchy and generating a corrected data;

predicting the image data of the first hierarchy in accordance with the corrected data and generating a predicting data of the first hierarchy having a plurality of predicted pixels;

calculating a predictive error of the predicted data of the first hierarchy with respect to the image data of the first hierarchy;

determining suitability of the corrected data in accordance with the predictive error; and generating a difference data between the image data of the first hierarchy and the predicted data of the first hierarchy, in accordance with a determined result, the difference data having a plurality of difference values.

14. An apparatus according to claim 13, wherein said predicting means comprises:

means of generating class information of the corrected data as the image data of the second hierarchy; and means for producing the predicted data of the first hierarchy in accordance with the class information.

15. An apparatus according to claim 13, wherein said coded data includes predictive coefficients to produce the image data of the first hierarchy; and said predicting means comprises means for producing the predicted data of the first hierarchy using the predictive coefficients and the corrected data as the image data of the second hierarchy.

16. An apparatus according to claim 13, wherein said coded data includes predictive coefficients for each class to produce the image data of the first hierarchy, and said predicting means comprises:

means for generating class information using a plurality of pixels of the corrected data as the image data of the second hierarchy; and means for producing the predicted data of the first hierarchy using the predictive coefficients corresponding to the class information and the corrected data as the image data of the second hierarchy.

17. An apparatus according to claim 13, wherein said predicting means comprises:

memory storing predictive coefficients for each class; of pixels of the corrected data as the image data of the second hierarchy; and means for producing the predicted data of the first hierarchy using the predictive coefficients corresponding to the class information and the corrected data as the image data of the second hierarchy.

18. An apparatus according to claim 17, wherein said predictive coefficients for each class stored in said memory are generated using an image data for learning.

19. A method of performing a hierarchical coding of an image data to generate coded image data, comprising the steps of:

forming an image data of a second hierarchy having a number of pixels which is smaller than that of an image data of a first hierarchy;

correcting the image data of the second hierarchy and generating a corrected data; predicting the image data of the first hierarchy in accordance with the corrected data and generating a predicted data of the first hierarchy having a plurality of predicted pixels;

calculating a predictive error of the predicted data of the first hierarchy with respect to the image data of the first hierarchy;

determining suitability of the corrected data in accordance with the predictive error; and generating a difference data between the image data of the first hierarchy and the predicted data of the first hierarchy, in accordance with the determined suitability, the difference data having a plurality of difference values.

20. A method according to claim 19, wherein said predicting step comprises the steps of:

generating class information for the corrected data; and generating the predicted pixels in accordance with the class information.

21. A method according to claim 19, wherein said predicting step comprises the steps of:

generating predictive coefficients based upon the corrected data; and generating the predicted data of the first hierarchy based upon the corrected data and the predictive coefficients.

22. A method according to claim 19, wherein said predicting step comprises the steps of:

generating class information using a plurality of pixels of the corrected data;

generating predictive coefficients for each class using the image data of the first hierarchy and the corrected data; and generating the predicted pixels of the first hierarchy using the predictive coefficients corresponding to the class information and the corrected data.

23. A method according to claim 22, further comprising the step of:

outputting the corrected data and the difference data as the coded image data, wherein said outputting step outputs the image data of the second hierarchy with the predictive coefficients for each class.

24. A method according to claim 19, wherein said predicting step comprises the steps of:

generating class information using a plurality of pixels of the corrected data; and reading, from a memory storing predictive coefficients for each class, predictive coefficients corresponding to the generated class information; and generating the predicted pixels of the first hierarchy using the read predictive coefficients and the corrected data.

25. An apparatus according to claim 24, wherein said predictive coefficients for each class stored in said memory are generated using an image data for learning.

26. A method according to claim 25, further comprising the step of:

outputting the corrected data and the difference data as the coded image data, wherein said outputting step outputs the image data of the second hierarchy with the predictive coefficients for each class.

27. A method according to claim 19, wherein said correcting step corrects the image data of the second hierarchy using the correction values read from a memory that stores correction values.

28. A method according to claim 19, further comprising the step of:

outputting the corrected data and the difference data as the coded image data, wherein said determining step determines suitability of the corrected data by detecting whether the predictive error is less than a prescribed threshold value; and said outputting step outputs the corrected data as the coded data in response to the predictive error being less than the prescribed threshold value.

29. A method according to claim 19, wherein said determining step determines suitability of the corrected data by determining whether the predictive error is less than a prescribed threshold value; and said difference data generating step generates the difference data when it is detected that the predictive error is less than the prescribed threshold value.

30. A method according to claim 19, further comprising the step of:

outputting the corrected data and the difference data as the coded image data, wherein said outputting step outputs the corrected data and the difference data as the corrected data when the predictive error is less than the prescribed threshold value.

31. A method for decoding data represented by a hierarchical coding of an image, comprising the steps of:

receiving the coded data including an optimum corrected data as an image data of a second hierarchy and also including a difference data as coded image data of a first hierarchy, image data of the second hierarchy having a number of pixels which is smaller than that of an image data of a first hierarchy;

predicting the image data of the first hierarchy from the optimum corrected data and generating a predicted data of the first hierarchy; and decoding the image data of the first hierarchy by adding the predicted data of the first hierarchy to the difference data, said coded data generated by the steps of:

forming the image data of the second hierarchy having the number of pixels smaller than the number of pixels of the image data of the first hierarchy;

correcting the image data of the second hierarchy and generating a corrected data;

predicting the image data of the first hierarchy in accordance with the corrected data and generating a predicted data of the first hierarchy having a plurality of predicted pixels;

calculating a predictive error of the predicted data of the first hierarchy with respect to the image data of the first hierarchy;

determining suitability of the corrected data in accordance with the predictive error; and generating a difference data between the image data of the first hierarchy and the predicted data of the first hierarchy, in accordance with a determined result, the difference data having a plurality of difference values.

32. A method according to claim 31, wherein said predicting step comprises the steps of:

generating class information of the corrected data as the image data of the second hierarchy; and producing the predicted data of the first hierarchy in accordance with the class information.

33. A method according to claim 31, wherein said coded data includes predictive coefficients to produce the image data of the first hierarchy; and said predicting step comprises a step of producing the predicted data of the first hierarchy using the predictive coefficients and tho corrected data as the image data of the second hierarchy.

34. A method according to claim 31, wherein said coded data includes predictive coefficients for each class to produce the image data of the first hierarchy, and said predicting step comprises the steps of:

generating class information using a plurality of pixels of the corrected data as the image data of the second hierarchy; and producing the predicted data of the first hierarchy using the predictive coefficients corresponding to the class information and the corrected data as the image data of the second hierarchy.

35. A method according to claim 31, wherein said predicting step comprises the steps of:

generating class information using a plurality of pixels of the corrected data as the image data of the second hierarchy; and means for producing the predicted data of the first hierarchy using predictive coefficients read from a memory, the memory storing predictive coefficients for each class, corresponding to the class information and the corrected data as the image data of the second hierarchy.

36. A method according to claim 35, wherein said predictive coefficients for each class stored in said memory are generated using an image data for learning.

37. A method of transmitting coded image data having a hierarchical coding, comprising the steps of:

forming an image data of a second hierarchy having a number of pixels which is smaller than that of an image data of a first hierarchy;

correcting the image data of the second hierarchy and generating a corrected data;

predicting the image data of the first hierarchy in accordance with the corrected data and generating a predicted data of the first hierarchy having a plurality of predicted pixels;

calculating a predictive error of the predicted data of the first hierarchy with respect to the image data of the first hierarchy;

determining suitability of the corrected data in accordance with the predictive error;

generating a difference data between the image data of the first hierarchy and the predicted data of the first hierarchy, in accordance with the determined suitability, the difference data having a plurality of difference values; and transmitting the corrected data and the difference data as the coded image data.

38. A method according to claim 37, wherein said predicting step comprises the step of:

generating class information for the corrected data; and generating the predicted pixels in accordance with the class information.

39. A method according to claim 37, wherein said predicting step comprises the steps of:

generating predictive coefficients based upon the corrected data; and generating the predicted data of the first hierarchy based upon the corrected data and the predictive coefficients.

40. A method according to claim 37, wherein said predicting step comprises the steps of:

generating class information using a plurality of pixels of the corrected data;

generating predictive coefficients for each class using the image data of the first hierarchy and the corrected data; and generating the predicted pixels of the first hierarchy using the predictive coefficients corresponding to the class information and the corrected data.

41. A method according to claim 40, wherein said transmitting step transmits the image data of the second hierarchy with the predictive coefficients for each class.

42. A method according to claim 37, wherein said predicting step comprises the steps of:
generating class information using a plurality of pixels of the corrected data; and
reading, from a memory storing predictive coefficients for each class, predictive coefficients corresponding to the generated class information; and
generating the predicted pixels of the first hierarchy using the read predictive coefficients and the corrected data.

43. An apparatus according to claim 42, wherein said predictive coefficients for each class stored in said memory are generated using an image data for learning.

44. A method according to claim 43, wherein said transmitting step transmits the image data of the second hierarchy with the predictive coefficients for each class.

45. A method according to claim 37, wherein
said correcting step corrects the image data of the second hierarchy using the correction values read from a memory that stores correction values.

46. A method according to claim 37, wherein
said determining step determines suitability of the corrected data by detecting whether the predictive error is less than a prescribed threshold value; and
said transmitting step transmits the corrected data as the coded data in response to the predictive error being less than the prescribed threshold value.

47. A method according to claim 37, wherein
said determining step determines suitability of the corrected data by determining whether the predictive error is less than a prescribed threshold value; and
said difference data generating step generates the difference data when it is detected that the predictive error is less than the prescribed threshold value.

48. A method according to claim 37, wherein
said transmitting step transmits the corrected data and the difference data as the corrected data when the predictive error is less than the prescribed threshold value.

49. A recording medium having recorded thereon coded image data encoded by the steps of:
forming an image data of a second hierarchy having a number of pixels which is smaller than that of an image data of a first hierarchy;
correcting the image data of the second hierarchy and generating a corrected data;
predicting the image data of the first hierarchy in accordance with the corrected data and generating a predicted data of the first hierarchy having a plurality of predicted pixels;
calculating a predictive error of the predicted data of the first hierarchy with respect to the image data of the first hierarchy;
determining suitability of the corrected data in accordance with the predictive error;
generating a difference data between the image data of the first hierarchy and the predicted data of the first hierarchy, in accordance with the determined suitability, the difference data having a plurality of difference values, wherein
the corrected data and the difference data are recorded as the coded image data.

50. A recording medium as in claim 49, wherein the predicting step comprises the step of:
generating class information for the corrected data; and
generating the predicted pixels in accordance with the class information.

51. A recording medium as in claim 49, wherein said predicting step comprises the steps of:
generating predictive coefficients based upon the corrected data; and
generating the predicted data of the first hierarchy based upon the corrected data and the predictive coefficients.

52. A recording medium as in claim 49, wherein said predicting step comprises the steps of:
generating class information using a plurality of pixels of the corrected data;
generating predictive coefficients for each class using the image data of the first hierarchy and the corrected data; and
generating the predicted pixels of the first hierarchy using the predictive coefficients corresponding to the class information and the corrected data.

53. A recording medium as in claim 52, wherein said outputting step outputs the image data of the second hierarchy with the predictive coefficients for each class.

54. A recording medium as in claim 49, wherein said predicting step comprises the steps of:
generating class information using a plurality of pixels of the corrected data; and
reading, from a memory storing predictive coefficients for each class, predictive coefficients corresponding to the generated class information; and
generating the predicted pixels of the first hierarchy using the read predictive coefficients and the corrected data.

55. A recording medium according to claim 54, wherein said predictive coefficients for each class stored in said memory are generated using an image data for learning.

56. A recording medium as in claim 55, wherein said outputting step outputs the image data of the second hierarchy with the predictive coefficients for each class.

57. A recording medium as in claim 49, wherein
said correcting step corrects the image data of the second hierarchy using the correction values read from a memory that stores correction values.

58. A recording medium as in claim 49, wherein
said determining step determines suitability of the corrected data by detecting whether the predictive error is less than a prescribed threshold value; and
said outputting step outputs the corrected data as the coded data in response to the predictive error being less than the prescribed threshold value.

59. A recording medium as in claim 49, wherein said determining step determines suitability of the corrected data by determining whether the predictive error is less than a prescribed threshold value; and
said difference data generating step generates the difference data when it is detected that the predictive error is less than the prescribed threshold value.

60. A recording medium as in claim 49, wherein said outputting step outputs the corrected data and the difference data as the corrected data when the predictive error is less than the prescribed threshold value.

61. A transmitting method for transmitting coded image data encoded by the steps of:
forming an image data of a second hierarchy having a number of pixels which is smaller than that of an image data of a first hierarchy;
correcting the image data of the second hierarchy and generating a corrected data;
predicting the image data of the first hierarchy in accordance with the corrected data and generating a predicted data of the first hierarchy having a plurality of predicted pixels;

calculating a predictive error of the predicted data of the first hierarchy with respect to the image data of the first hierarchy;

determining suitability of the corrected data in accordance with the predictive error;

generating a difference data between the image data of the first hierarchy and the predicted data of the first hierarchy, in accordance with the determined suitability, the difference data having a plurality of difference values, wherein the corrected data and the difference data are transmitted as the coded image data.

62. A transmitting method as in claim 61, wherein the predicting step comprising the step of:

generating class information for the corrected data; and generating the predicted pixels in accordance with the class information.

63. A transmitting method as in claim 61, wherein said predicting step comprises the steps of:

generating predictive coefficients based upon the corrected data; and generating the predicted data of the first hierarchy based upon the corrected data and the predictive coefficients.

64. A transmitting method as in claim 61, wherein said predicting step comprises the steps of:

generating class information using a plurality of pixels of the corrected data;

generating predictive coefficients for each class using the image data of the first hierarchy and the corrected data; and generating the predicted pixels of the first hierarchy using the predictive coefficients corresponding to the class information and the corrected data.

65. A transmitting method as in claim 64, wherein said coded data includes the image data of the second hierarchy with the predictive coefficients for each class.

66. A transmitting method as in claim 61, wherein said predicting step comprises the steps of:

generating class information using a plurality of pixels of the corrected data; and reading, from a memory storing predictive coefficients for each class, predictive coefficients corresponding to the generated class information; and generating the predicted pixels of the first hierarchy using the read predictive coefficients and the corrected data.

67. A transmitting method according to claim 66, wherein said predictive coefficients for each class stored in said memory are generated using an image data for learning.

68. A transmitting method as in claim 67, wherein said coded data includes the image data of the second hierarchy with the predictive coefficients for each class.

69. A transmitting method as in claim 61, wherein said correcting step corrects the image data of the second hierarchy using the correction values read from a memory that stores correction values.

70. A transmitting method as in claim 61, wherein said determining step determines suitability of the corrected data by detecting whether the predictive error is less than a prescribed threshold value; and said coded data includes the corrected data as the coded data in response to the predictive error being less than the prescribed threshold value.

71. A transmitting method as in claim 61, wherein said determining step determines suitability of the corrected data by determining whether the predictive error is less than a prescribed threshold value; and said difference data generating step generates the difference data when it is detected that the predictive error is less than the prescribed threshold value.

72. A transmitting method as in claim 61, wherein said coded data includes the corrected data and the difference data as the corrected data when the predictive error is less than the prescribed threshold value.

73. The apparatus of claim 1, further comprising:

means for outputting the corrected data and the difference data as the coded image data.

74. The apparatus of claim 13, wherein said generation of coded data further comprises the step of:

outputting the corrected data as the coded image data of the second hierarchy and the difference data as the coded image data of the first hierarchy.

75. The method of claim 19, further comprising the step of:

outputting the corrected data and the difference data as the coded image data.

76. The method of claim 31, wherein said generation of coded data further comprises the step of:

outputting the corrected data as the coded image data of the second hierarchy and the difference data as the coded image data of the first hierarchy.

* * * * *